(12) United States Patent
Meyers et al.

(10) Patent No.: US 6,754,674 B2
(45) Date of Patent: Jun. 22, 2004

(54) METHOD AND APPARATUS FOR CREATION AND MAINTENANCE OF INCIDENT CRISIS RESPONSE PLANS

(75) Inventors: Edmund Meyers, Woodlyn, PA (US); Terence Ting, Royersford, PA (US); Arthur Benning, Jr., Ambler, PA (US); Karl Pyatt, Trappe, PA (US)

(73) Assignee: Strohl Systems Group, Inc., King of Prussia, PA (US)

( * ) Notice: Subject to any disclaimer, the term of this patent is extended or adjusted under 35 U.S.C. 154(b) by 219 days.

(21) Appl. No.: 09/759,055

(22) Filed: Jan. 12, 2001

(65) Prior Publication Data

US 2002/0065855 A1 May 30, 2002

Related U.S. Application Data

(60) Provisional application No. 60/245,749, filed on Nov. 3, 2000.

(51) Int. Cl.[7] .............................................. G06F 17/30
(52) U.S. Cl. ...................... 707/104.1; 707/10; 707/102; 705/9; 700/266
(58) Field of Search ............................. 707/102, 104.1, 707/201, 3–4, 103, 202, 203, 10; 705/7–11, 9; 715/505, 517

(56) References Cited

U.S. PATENT DOCUMENTS 5,724,255 A * 3/1998 Smith et al. ................. 700/266
5,726,884 A * 3/1998 Sturgeon et al. ................ 705/9
5,787,429 A * 7/1998 Nikolin, Jr. .................. 707/10
6,161,113 A * 12/2000 Mora et al. .................. 715/505
6,341,287 B1 * 1/2002 Sziklai et al. ............... 707/102

* cited by examiner

Primary Examiner—Shahid Alam
(74) Attorney, Agent, or Firm—Woodcock Washburn LLP

(57) ABSTRACT

A client station receives input data from a user relating to a particular crisis incident. The client station includes user interface software elements adapted to guide a user through the process of creating, maintaining and distributing relevant crisis response information for the incident specified. The interface includes displayed menus of selectable, hierarchically organized options and sub-options which guide the user through the relevant processes. Apart from manual data entry, the system allows importation of existing data files to fill in required entry fields using mapping methodology. Upon being presented with one screen interface, the user is given a choice of expert pre-specified crisis plan templates with which to produce and print a finished response plan for the specified incident. The user input data is forwarded to a server, and integrated with the specified template in a master data store into comprehensive, coherent crisis response stored at a user data store 1504. The completed, integrated crisis response data at the user data store is adapted to generate useful reports relating to the crisis incident selected by the user. Report(s) generated by the system for the selected crisis incident include a complete crisis response plan, with predetermined response scripts, texts, tasks, materials, methodologies, objectives, and/or evaluation criteria.

16 Claims, 155 Drawing Sheets

Faculty/Staff Workbook

Planet Demo School
*Publication Date: 4/26/00*

*PLANet Terms of Service Agreement*

IMPORTANT: The tasks contained in the PLANet workbooks and scripts should not be undertaken by a school without careful review and consideration of the school's environment, including but not limited to campus, geography, proximity to known hazards, community relationships, service providers, and requirements imposed upon the school by various authorities. For example, requirements imposed upon schools may differ from jurisdiction to jurisdiction and it is the school's responsibility to understand all legal and regulatory requirements that may affect the school and govern its response to a critical incident. Also, it is the school's responsibility to thoroughly investigate and record its relationship with or reliance on the school's service providers in the appropriate scripts. PLANet materials are presented as a "best practices" guidelines. Strohl Systems assumes no liability for errors or omissions hereunder, including the requirements of any specific jurisdiction or regulatory authority.

Figure 5b

Faculty/Staff Workbook

Planet Demo School
Publication Date: 4/26/00

What Is The PLANet Faculty/Staff Workbook?

This workbook is a great way to start building your Critical Incident Response Plan! By answering a series of questions, you will collect the information you need to put together a comprehensive and effective plan. It allows you to work outside of PLANet to make decisions, and then shows you how to enter the information into PLANet.

*Be sure to customize the supplied scripts to your environment and requirements. Be sure to record your service providers in the appropriate roles.*

How Do I Use This Workbook?

This workbook contains pages that are very much like the faculty/staff entry screen in PLANet. You will duplicate and complete these pages for each faculty and staff member, writing information in each field. Once the workbook is complete, data entry people will transfer what you collect here into PLANet using the instructions provided.

What Should The Administrator And/Or Planning Team Do?

First, review this entire workbook carefully to get a good feel for the questions you'll need to answer. Decide how you want to make these decisions - is one person primarily responsible or do you want to get a planning team together to make group decisions?

General background information appears in the introduction to each section. Read this material carefully before moving on. When you are asked to answer a question or make a decision, instructions to guide you appear in the white boxes at the top of the page. Complete the sections below, making notes and changes as needed.

Notice the approved by fields at the bottom of the page. Once you have completed the workbook, the plan administrator should review and approve each decision. Just initial and date to confirm.

Once this workbook is approved, you should give it to the data entry staff who will be entering information into PLANet.

What Should The Data Entry Staff Do?

Following the step-by-step instructions in the gray boxes to the left of the page, the data entry people will enter your hand-written information in the work area into PLANet. These steps are written specifically to show you how to open and use PLANet to enter that specific information, so there's no need to read the introduction or other areas.

Follow the workbook page by page until all the information collected by the planning team is entered into PLANet. Then let the plan coordinator know your work is complete.

Note: It is possible to follow this workbook while you are logged on to PLANet and simply enter the information as you go, but chances are you'll want time to meet and brainstorm about the decision you need to make.

Figure 5c

How to Use the PLANet Workbooks

(Instructions for Planning Team)

This section tells the planning team what they need to do in the workspace area.

(Workspace)

In this area you will find questions you need to answer and information you need to review to build your plan.

You should write the answers and make your changes directly in this workspace so you can hand the workbook over to data entry staff to enter it into PLANet.

(Instructions for Entering Information into PLANet)

Once the Planning Team has entered information or made changes in the workspace, the person who will enter the information into PLANet will use the instructions in this area.

They show step-by-step instructions needed to enter the workbook.

(Approval Area)

(Approval Area)

Figure 5d

Faculty/Staff Workbook

Planet Demo School
Publication Date: 4/26/00

Collect Faculty/Staff Information

Your plan begins with people, those you assign to roles and those you'll need to contact if an incident takes place. This workbook guides you through collecting personal information about each faculty and staff member.

What Faculty Information Do I Need?

To ensure your plan has complete information, you'll need basic details like job title, home address and phone, any additional means of contacting the person (like a cell phone or pager). Remember that the person may not be on campus when the incident takes place, so you may need to be able to contact them at home.

How Do I Get Faculty Information Into PLANet?

The quickest way to get faculty and staff information is to import it from another source. If you already have some type of file like an Access database or an Excel spreadsheet with faculty information, you can use the import tool to bring the details into PLANet quickly. There are two benefits to importing. First, you'll save yourself the time of having to enter those people. Second, you can simply select them when you are assigning people to roles.

If you don't have a file to import, you should use the following pages to write down all the requested information, then hand this packet to the data entry person who will be adding information to PLANet. They will use the instructions in the gray panel to enter what you've added.

The page looks very much like the faculty/staff screen in PLANet. Just enter the appropriate information in each field. Any field marked with * means you MUST enter something in that field, but it's a good idea to fill in as many of the fields as you can. The more information you have, the better.

Can I Change Or Enter New Faculty And Staff Later?

Sure, you may want to change a faculty/staff information later, or a new teacher may join the staff. You can use this workbook at any time to collect the information for the new staff.

Figure 5e

Faculty/Staff Workbook

Planet Demo School
*Publication Date: 4/26/00*

Field Definitions

Below is a list of fields with their definitions.

Figure 5f

Faculty/Staff Workbook

Planet Demo School
*Publication Date: 4/26/00*

\* Required Fields

Faculty/Staff ID: \*

First Name: \*   Last Name: \*

Title:

Address 1:

Address 2:

City:   State:   Zip:

Emergency Contact:   Emergency Contact Phone:

Telephone Numbers

Home:   On Crisis Contact List?: ☐

Pager/PIN:

Cellular:

Alternate:

Alt. Desc:

Current Status/Assignments

Status:   Grade/Dept.:

Building:   Room/Homeroom:

Approved By: _____   Date: _____

How to Add Faculty/Staff to PLANet
1.
2.
3.

Initials: _____   Date Entered: _____

Figure 5g

Roles Workbook

Planet Demo School
Publication Date: 4/26/00

*PLANet Terms of Service Agreement*

IMPORTANT: The tasks contained in the PLANet workbooks and scripts should not be undertaken by a school without careful review and consideration of the school's environment, including but not limited to campus, geography, proximity to known hazards, community relationships, service providers, and requirements imposed upon the school by various authorities. For example, requirements imposed upon schools may differ from jurisdiction to jurisdiction and it is the school's responsibility to understand all legal and regulatory requirements that may affect the school and govern its response to a critical incident. Also, it is the school's responsibility to thoroughly investigate and record its relationship with or reliance on the school's service providers in the appropriate scripts. PLANet materials are presented as a "best practices" guidelines. Strohl Systems assumes no liability for errors or omissions hereunder, including the requirements of any specific jurisdiction or regulatory authority.

Figure 7b

Roles Workbook

Planet Demo School
Publication Date: 4/26/00

What Is The PLANet Roles Workbook?

This workbook is a great way to start building your Critical Incident Response Plan! By answering a series of questions, you will collect the information you need to build a comprehensive and effective plan. It allows you to work outside of PLANet to make decisions, and then shows you how to enter the information into PLANet.

*Be sure to customize the supplied scripts to your environment and requirements. Be sure to record your service providers in the appropriate roles.*

How Do I Use This Workbook?

This workbook is for your planning team or plan coordinator to make decisions about who should respond to incidents at your school and what jobs they'll perform. The planning team will review these decisions and write the information directly onto the pages in this workbook. Once the workbook is complete, data entry people will transfer what you collect here into PLANet using the instructions provided.

What Should The Administrator And/Or Planning Team Do?

First, review this entire workbook carefully to get a good feel for the questions you'll need to answer. Decide how you want to fill in the workbook - is one person primarily responsible or do you want to get a planning team together to make group decisions?

General background information appears in the introduction to each section. Read this material carefully before moving on. When you are asked to answer a question or make a decision, instructions to guide you appear in the white boxes at the top of the page. Complete the sections below, making notes and changes as needed.

Notice the approved by fields at the bottom of the page. Once you have completed the workbook, the plan administrator should review and approve each decision. Just initial and date to confirm.

Once this workbook is approved, you should give it to the data entry staff who will be entering information into PLANet.

What Should The Data Entry Staff Do?

Following the step-by-step instructions in the gray boxes to the left of the page, the data entry people will enter the hand-written information in the work area into PLANet. These steps are written specifically to show you how to open and use PLANet to enter that information, so there's no need to read the introduction or other areas.

Follow the workbook page by page until all the information entered by the planning team is entered into PLANet. Then let the plan coordinator know your work is complete.

Note: It is possible to follow this workbook while you are logged on to PLANet and simply enter the information as you go, but chances are you'll want time to meet and brainstorm about the decisions you need to make.

Figure 7c

How to Use the PLANet Workbooks

(Instructions for Planning Team)

This section tells the planning team what they need to do in the workspace area.

(Workspace)

In this area you will find questions you need to answer and information you need to review to build your plan.

You should write the answers and make your changes directly in this workspace so you can hand the workbook over to data entry staff to enter it into PLANet.

(Instructions for Entering Information into PLANet)

Once the Planning Team has entered information or made changes in the workspace, the person who will enter the information into PLANet will use the instructions in this area.

They show step-by-step instructions needed to enter the workbook.

(Approval Area)

(Approval Area)

Figure 7d

Roles Workbook
Planet Demo School
Publication Date: 4/26/00

Defining Roles For Your Incident Response Team

Your response to a critical incident begins with people. Assigning qualified faculty or staff to deal with specific problems is a key to making your plan effective. In this section of the PLANet workbook you will review the roles in your incident response plan and assign people to fill them.

What Are Roles?

Roles are positions on your Incident Response Team, and these positions are associated with the list of tasks to perform for each incident. When you assign a member of your faculty or staff to a role, you are making that person responsible for performing that step when responding to a problem that occurs at your school.

For example, if a bomb threat is phoned in, the task of securing the school grounds and verifying that all students are a safe distance from the school is assigned to the Safe Schools Coordinator. The person you assign to fill this role - as well as his/her backup - should be the person on your faculty or staff who is best suited for such tasks.

This workbook gives you all the details you need to decide who is best qualified for each position on the Incident Response Team, as well as instructions on how to enter those selections into PLANet.

How Do I Decide Who Should Fill Each Role?

This workbook is designed to teach you about each role and let you review your staff to determine which person is best suited to fill each role. This packet includes the following:

- an organizational chart that shows the inter-relationship between the roles,
- detailed description of each role, including the responsibilities of the role, qualifications required, and job titles of those most likely to fill that position in your plan,
- a working chart where you list the primary and backup assignments for each role,
- instructions on how to enter faculty and staff information into PLANet, and
- additional guidelines on forming an effective incident response team Be sure to review and approve the assignments before entering them into PLANet. Follow the instructions in this workbook as a step-by-step approach.

Figure 7e

Roles Workbook

Planet Demo School
Publication Date: 4/26/00

Once I've Assigned People To Roles, How Do I Get Them Into My Plan?

You need to make sure you have all the details you need about each person you've assigned. This includes personal information like address, phone number, and job title, so that if you have to contact them during non-school hours you can do so. Collect and record that information on the form in this workbook (duplicate that page as much as necessary).

Once you have completed, reviewed, and approved the assignments, deliver this workbook to the people who will be entering information into PLANet. Using the instructions in the gray boxes to the left, they should enter your hand-written assignments.

What Do I Do Next?

Using a separate workbook, you'll review and enter additional details for the Incidents you may face. You'll see the specific tasks the people filling roles have to perform. When your plan is complete, print it and assemble your Incident Response Team to review these assignments. Make sure that team members are aware of their responsibilities and comfortable with the tasks they may need to perform. Conduct periodic drills to test the readiness of your team members, and be prepared to make adjustments to your roles as needed.

Figure 7f

Roles Workbook

Planet Demo School
Publication Date: 4/26/00

Instructions: Review the Role description below. Consider which members of your faculty and staff best meet these qualifications and record the names in the space provided. You will want to select both a primary and backup person to staff this role.

Incident Manager
*Crisis Responsibilities Overview*

The person(s) filling this role will have the following general responsibilities

- Authority to activate school crisis response plan
- Manage all triage phases of the incident; augment triage decisions based on student risk profiles
- Ensure that all key roles are staffed
- Distribute responsibilities to designees if required by the situation (e.g., Public Information Officer, local authority coordination, etc.)
- Responsible for accurate transmission of on-going incident information and post-incident information to the Incident District Liaison
- In collaboration with the Safe Schools Coordinator, verifies the accuracy of all information regarding cause and extent of injuries and accuracy of all information regarding decedents including official pronouncement and causes of death.
- Notify local authorities of the incident
- Notify state and federal authorities of the incident
- Notify parents of the incident
- Inform victim's parent(s) or care taker(s) of any hospitalization or death

*Potential Sources of Staffing*

Consider these position titles and their normal responsibilities when evaluating who should be assigned to this PLANet Role.

| Sample Titles | Normal Responsibilities |
|---|---|
| School Administrator | Directs all primary school functions including curriculum, scheduling, staffing, student census, legal and all other school policies, and school board-parent body interface. |
| School Principal | |
| Building Administrator | |
| Headmaster | |
| Asst. Principal | Assists the Principal with the oversight of primary school functions and may specifically oversee school safety-security and student discipline. |
| Asst. Administrator | |
| Asst. Headmaster | |
| Asst. Bldg. Administrator | |

Approved By: _____ Date: _____

Figure 7h

Roles Workbook

Planet Demo School
Publication Date: 4/26/00

Instructions: Review the Role description below. Consider which members of your faculty and staff best meet these qualifications and record the names in the space provided. You will want to select both a primary and backup person to staff this role.

Incident Manager
*Special Considerations*

This PLANet role may require additional experience or special skills you should consider when assigning school or district personnel.

- Prior experience with critical incidents and training in School Based Critical Incident Stress Management
- Established relationships with local authorities, most especially law enforcement, including the district attorney's office, the fire department, the hospital emergency room personnel, and the mental health center.

Name(s) of person(s) for this role: _____

Approved By: _____ Date: _____

Figure 7i

Roles Workbook

How to Assign Faculty/Staff to a Role
1. Log on to PLANet.
2.
3.

Initials: _____  Date Entered: _____

---

Planet Demo School
*Publication Date: 4/26/00*

Instructions: Use the following chart to collect the names of the faculty/staff you selected from the previous pages as the primary and backup assignment for each role.

| Role | Faculty/Staff Assigned to Role |
|---|---|
| Clinical Staff | _____ |
| Food Services Coordinator | _____ |
| Incident Clinical Coordinator | _____ |
| Incident Data Coordinator | _____ |
| Incident Dispatcher | _____ |
| Incident District Liaison | _____ |
| Incident Facilities Officer | _____ |
| Incident Manager | _____ |
| Incident Medical Officer | _____ |
| Incident PIO | _____ |

Approved By: _____  Date: _____

*Copyright Stroh Systems 2000*

Figure 7j

Incident Workbook

Planet Demo School
Publication Date: 4/27/00

PLANet Terms of Service Agreement

*IMPORTANT:* The tasks contained in the PLANet workbooks and scripts should not be undertaken by a school without careful review and consideration of the school's environment, including but not limited to campus, geography, proximity to known hazards, community relationships, service providers, and requirements imposed upon the school by various authorities. For example, requirements imposed upon schools may differ from jurisdiction to jurisdiction and it is the school's responsibility to understand all legal and regulatory requirements that may affect the school and govern its response to a critical incident. Also, it is the school's responsibility to thoroughly investigate and record its relationship with or reliance on the school's service providers in the appropriate scripts. PLANet materials are presented as a "best practices" guidelines. Strohl Systems assumes no liability for errors or omissions hereunder, including the requirements of any specific jurisdiction or regulatory authority.

Figure 9b

Incident Workbook

Planet Demo School
Publication Date: 4/27/00

What Is The PLANet Incident Workbook?

This workbook is a great way to start building your Critical Incident Response Plan! By answering a series of questions, you will collect the information you need to put together a comprehensive and effective plan. It allows you to work outside of PLANet to make decisions, and then shows you how to enter the information into PLANet.

*Be sure to customize the supplied scripts to your environment and requirements. Be sure to record your service providers in the appropriate roles.*

How Do I Use This Workbook?

This workbook contains the details, or script, of each incident you selected. The planning team will review these scripts and decide whether to add, change, or delete details in the script, marking these changes in the workbook. Once the workbook is complete, data entry people will transfer what you collect here into PLANet using the instructions provided.

What Should The Administrator And/Or Planning Team Do?

First, review this entire workbook carefully to get a good feel for the questions you'll need to answer. Decide how you want to complete this workbook - is one person primarily responsible or do you want to get a planning team together to make group decisions?

General background information appears in the introduction to each section. Read this material carefully before moving on. When you are asked to answer a question or make a decision, instructions to guide you appear in the white boxes at the top of the page. Complete the sections below, making notes and changes as needed.

Notice the approved by fields at the bottom of the page. Once you have completed the workbook, the plan administrator should review and approve each decision. Just initial and date to confirm.

Once this workbook is approved, you should give it to the data entry staff who will be entering information into PLANet.

What Should The Data Entry Staff Do?

Following the step-by-step instructions in the gray boxes to the left of the page, the data entry people will enter the hand-written information in the work area into PLANet. These steps are written specifically to show you how to open and use PLANet to enter that information, so there's no need to read the introduction or other areas.

Follow the workbook page by page until all the information collected by the planning team is entered into PLANet. Then let the plan coordinator know your work is complete.

Note: It is possible to follow this workbook while you are logged on to PLANet and simply enter the information as you go, but chances are you'll want time to meet and brainstorm about the decisions you need to make.

Why Are The Words "Working Draft" On The Page?

What you have in front of you is NOT your Critical Incident Response Plan. It is a workbook designed to collect the information you need. Until you review and approve all of the information you enter, no part of your plan is finalized. The incident scripts contained here are considered recommendations until you make the changes and additions you need and mark them as approved.

Figure 9c

How to Use the PLANet Workbooks

(Instructions for Planning Team)

This section tells the planning team what they need to do in the workspace area.

(Workspace)

In this area you will find questions you need to answer and information you need to review to build your plan.

You should write the answers and make your changes directly in this workspace so you can hand the workbook over to data entry staff to enter it into PLANet.

(Instructions for Entering Information into PLANet)

Once the Planning Team has entered information or made changes in the workspace, the person who will enter the information into PLANet will use the instructions in this area.

They show step-by-step instructions needed to enter the workbook.

(Approval Area)

(Approval Area)

Figure 9d

Incident Workbook

Planet Demo School
Publication Date: 4/27/00

Reviewing And Customizing Your Incident Response Scripts

Finding qualified and prepared faculty and staff to respond to a critical incident is only part of your response plan. In the Roles Workbook, you decided who these people will be. In this workbook, you'll review and customize the tasks they will perform during an incident.

What Are Incident Response Scripts?

Incident Response Scripts contain the information you need and the steps you should take if a critical incident occurs at your school. These steps, called tasks, are assigned to the people filling roles on your response team. This script guides you through the incident response with detailed directions so that each person can perform his or her assigned steps.

If outside resources like the local fire department or crisis counselors are needed, you can record that information here. This workbook records all the necessary information in one place so you have it at your fingertips if an incident occurs.

How Do I Review, Revise And Approve A Script?

The tasks in a response script have been compiled by Robert D. Macy, the Executive Director of the Arbour Foundation and Director of Community Services for the Trauma Center in Boston. He has 19 years of expertise in Crisis and Trauma and is a nationally recognized authority in the field.

However, these tasks should be customized to meet your specific needs. While these tasks reflect a common approach by similar schools across the country and form a basic framework, no script can fully consider all of your unique circumstances and special needs until you update it.

Your planning team or plan administrator should carefully read through the entire script, then examine each task in detail. If you wish to keep the task as is or delete it, check the appropriate box to the right of the task. If you want to make changes to it, check "Modify" and write your changes in the work space.

Continue through all of the included tasks. If you decide you want to add a task to the script, use the blank add task to record the order, description, category, and roles assigned. Copy this page for each task you want to add.

Be sure to review and approve the changes before entering them into PLANet. Follow the instructions in this workbook as a step-by-step approach.

Once I've Revised A Script, How Do I Get The Changes Into PLANet?

Once you have completed, reviewed, and approved the assignments, deliver this workbook to the data entry people who will be entering information into PLANet. Using the instructions in the gray boxes to the left, they should enter your hand-written changes and notify you when they are complete.

What Do I Do Next?

After you have completed both the Roles and Incident Workbooks and the changes are entered, you can print and review your plan in PLANet. Assemble your Incident Response Team to review these assignments. Make sure that team members are aware of their responsibilities and comfortable with the tasks they may need to perform. Conduct periodic drills to test the readiness of your team members, and be ready to make adjustments to your plan as needed.

Incident Workbook
Bomb Explosion and Fire at School Action Plan

Planet Demo School
Publication Date: 4/27/00

Faculty/Staff Assigned to Roles

| Name | Role | Home | Pager/PIN | Cellular |
|---|---|---|---|---|
| LORRAINE COYLE | Incident Manager | 697-565-8894 | | |
| JAMES HAVLICK | Safe Schools Coordinator | 697-642-3656 | | 697-484-6524 |
| KATHRYN STOCK | Incident Medical Officer | 697-326-4469 | | |

Incident Script

| Order | Estimated Duration (Hours) | Task Description | | Role Title |
|---|---|---|---|---|
| 1 | | Immediately call 911... | | Incident Dispatcher |
| | | | | Safe Schools Coordinator |
| | | | | JAMES HAVLICK |
| 2 | | Alert the Incident Manager ... | | Safe Schools Coordinator |
| | | | | JAMES HAVLICK |
| 3 | | Immediately initiate ... | | Incident Manager |
| | | | | LORRAINE COYLE |
| | | | | Safe Schools Coordinator |
| | | | | JAMES HAVLICK |
| 4 | | Prepare ... | | Incident Medical Officer |
| | | | | KATHRYN STOCK |
| | | | | Medical Staff |
| 5 | | Notify: | | Incident Manager |
| | | | | LORRAINE COYLE |

Incident Workbook
Bomb Explosion and Fire at School

Planet Demo School
*Publication Date: 4/27/00*

How to Change Incident Tasks and Roles
1. Log on to PLANet.
2.
3.

2  Alert the Incident Manager ....

☐ Modify
☐ Delete
☐ Keep As Is

*Roles Assigned to Task (see Roles Appendix for descriptions of each role.*
☒ Safe Schools Coordinator
     JAMES HAVLICK
☐

How to Delete a Task
1.
2.

Initials: _____  Date Entered: _____          Approved By: _____  Date: _____

Incident Workbook
Roles Appendix

Planet Demo School
Publication Date: 4/27/00

| | |
|---|---|
| Clinical Staff | Guidance or Student Assistance Professional responsible for on-going student counseling for academic and emotional issues. |
| Food Services Coordinator | Person(s) responsible for ordering and/or preparing food for school occupants. |
| Incident Clinical Coordinator | Assist school administration in evaluating and delivering prevention, incident and post incident counseling to students and staff. Coordinate the use of all internal and external counseling services in support of the safe schools program. Coordinates the activities of those staff assigned to the Clinical Staff role. |
| Incident Data Coordinator | This person is responsible for the currency and access to all student census, medical, psychiatric and attendance records to support the school's critical incident response plan. |
| Incident Dispatcher | Provides administrative support to the Incident Manager and assists Safe Schools Coordinator as required. |
| Incident District Liaison | This role is responsible for maintaining the flow of information, status, issues and concerns associated with a crisis or incident response at this school to and from the School District. |
| Incident Facilities Officer | The person and staff responsible for the building structure, internal systems and maintenance |
| Incident Manager | The on-site authority for a given school, the Administrator is responsible for the crisis and incident response process and for coordinating information with the school district office where applicable. |
| Incident Medical Officer | Directs the delivery of medical and/or nursing services within the school and with Emergency Services personnel called to the site. Coordinates the activities of the Medical Staff during incident response. |

Figure 9k

Incident Workbook

Planet Demo School
Publication Date: 4/27/00

Collect Associated Resource Information

The heart of your incident response plan is the set of incidents that can take place and the faculty/staff that fill response roles. But chances are you'll need the help of other people and resources to ensure the safety of the school population. In this part of the workbook you'll provide that information.

What Other Resources Do I Need?

PLANet contains suggested resources that you're likely to need. But these are generic listings and you need to provide more specific information. For example, the resource organization "Local Electric Utility" should be replaced with a specific name, phone number, and contact person for your electric supplier.

In the pages that follow, you will add specific detail to these pre-defined resources.

- Resource Organizations are the groups outside of your school that you're likely to call on in case of an emergency. They perform Services that are important to your incident response. For example, if a student commits suicide, you'll may need to contact grief counselors to meet with his classmates.

- Supplies can be anything from a first-aid kit needed to attend to injured students to sawhorses and bullhorns for crowd control.

- Locations are places outside the main school building that are required for meetings, evacuations, and other off-site activities. Perhaps a park across the street from the school is a safe place for students to gather if a bomb threat has been phoned in.

- Vital Records may be blueprints of your building, or a detailed list of bus routes with riders. These are documents or records that exist in some form outside of your plan.

Figure 91

Incident Workbook

Planet Demo School
*Publication Date: 4/27/00*

Field Definitions

Below is a list of fields with their definitions.

Figure 9m

Incident Workbook
Bomb Explosion and Fire at School
Incident Services

How to Revise Services and Resource Organizations
1. Log on to PLANet.
2.
3.

How to Remove an Assigned Service
1.
2.
3.

Initials: _____  Date Entered: _____

---

Planet Demo School
Publication Date: 4/27/00

☐ Modify
☐ Delete
☐ Keep As Is

*Required Fields

Service Description: Local Police Department *
Service Lead Time: _____  Agreement/Contract: ☐

Resource ID: S1234000016 *
Resource Organization: Local Police Department *
Address 1: _____
Address 2: _____
City: _____  State: _____  Zip + 4: _____  Contract?: ☐
Main Phone: 911  Fax: _____
Emergency Phone: 911
Web/E-mail: _____
Category: Law Enforcement  Contact Ref.: _____
Product/Service: Local Police

Representative Contact Info
Name: _____
Position: _____
Location: _____
Work Phone: _____  Home Phone: _____
Beeper/Cell: _____
Other Phone: _____  Rep Email: _____

Approved By: _____  Date: _____

Incident Workbook
Bomb Explosion and Fire at School
Incident Supplies

How to Revise Supplies
1. Log on to PLANet.
2.
3.

How to Remove Assigned Supplies
1.
2.
3.

Planet Demo School
Publication Date: 4/27/00

* Required Fields

☐ Modify
☐ Delete
☐ Keep As Is

Description: Radio
Category: Communications Equip.    Quantity on Hand: 6
Storage Location: Rear of Mainten    Minimum Quantity: 3
Agreement/Contract: [x]
Resource ID: S1234000064 *
Resource Organization: Equipment Rental Vendor *
Address 1:
Address 2:
City:                State:        Zip + 4:
Main Phone: 402-447-3487    Fax:
Emergency Phone:
Web/E-mail:
Category: Repair/Restoration    Contact Ref:
Product/Service: Equipment Rental Representative Contact Info
Name:
Position:
Location:
Work Phone:                Home Phone:
Beeper/Cell:
Other Phone:                Rep Email:

Initials: _____ Date Entered: _____    Approved By: _____ Date: _____

Incident Workbook
Bomb Explosion and Fire at School
Incident Locations

Planet Demo School
Publication Date: 4/27/00

How to Revise a Location
1. Log on to PLANet.
2.
3.

| | | | | * Required Fields | | |
|---|---|---|---|---|---|---|
| Location Type: | | | | | | ☐ Modify |
| Alternate Site: ☐ | Command Center: ☒ | Storage: ☐ | Staging/Assembly: ☐ * | | | ☐ Delete |
| Site Name: | School Administration | | | * | | ☐ Keep As Is |
| Room/Area Name: | Room 10 | | | | | |
| Address 1: | 432 Oak Lane | | | | | |
| Address 2: | Building B | | | | | |
| City: | Boot | State: PA | Zip: 26061 | Zip Ext: 2660 | | |
| Telephone: | 206-388-4700 | | | | | |
| Directions: | Turn onto the main access road for Middle/High school complex. Buil | | | | | |
| Site Contact Information | | | | | | |
| Contact Person: | Joyce Ballinger | Work Phone: 206-388-4751 | | | | |
| Home Phone: | 206-432-3542 | | | | | |

How to Remove an Assigned Location
1.
2.

Approved By: _____ Date: _____

Initials: _____ Date Entered: _____

Incident Workbook
Bomb Explosion and Fire at School
Incident Vital Records

Planet Demo School
Publication Date: 4/27/00

* Required Fields

How to Revise a Vital Record
1. Log on to PLANet.
2.
3.

| | | |
|---|---|---|
| Record Name: | Building Floor Plan (with room designations) * | ☐ Modify ☐ Delete ☐ Keep As Is |
| Department | Maintenance * | |
| Media Type: | Paper | |
| Form Number: | B-435-0025 | Original Source: Main Office |
| Location: | School Administration | Last Sent Offsite: September |
| Alternate Source | Main Office | |

How to Remove an Assigned Vital Record
1.
2.

| | | |
|---|---|---|
| Record Name: | Building Blueprints * | ☐ Modify ☐ Delete ☐ Keep As Is |
| Department | Maintenance * | |
| Media Type: | Paper | |
| Form Number: | B-335-0001 | Original Source: Township |
| Location: | School Administration | Last Sent Offsite: Never |
| Alternate Source | Township | |

Initials: _____ Date Entered: _____   Approved By: _____ Date: _____

Incident Workbook

Planet Demo School
Publication Date: 4/27/00

Associate Documents With An Incident Script

PLANet comes with a series of pre-defined documents that are useful if certain incidents take place. For example, the Bomb Threat script has a record sheet that lets you note specific details about the incident for reporting to authorities.

Can I Create My Own Documents?

Yes. The PLANet text editor lets you write your own documents to include with Incident scripts. Suppose your school has a specific incident reporting form that you want to use. You can create the form in PLANet and link it to the desired incident. If that document exists in a file like a Microsoft Word document you can cut and paste it into the text editor.

How Do I Add My Own Documents?

1. Log on to PLANet.
2. From the main menu, select Build My Plan.
3. Select Step 3: Add Incidents to My Plan.
4. Select Enter a Completed Incident Workbook.
5. Select the Incident from the list and click the Enter Incident button.
6. Select Edit Documents.
7. Click the New Document button.
8. Type a name for the document and click the OK button.
9. You can now begin entering the text for the document.
10. Click the X button to Save and Close the document.
11. Repeat Steps 7 to 10 for each document you want to add.
12. Click Close.

Figure 9v

SAMPLE INCIDENT SPECIFIC DOCUMENT

Any incident specific documents would appear here. These could include any documents that would be needed before, during or after an incident has occurred.

Figure 9w

Student Workbook

Planet Demo School
Publication Date: 4/26/00

PLANet Terms of Service Agreement

*IMPORTANT:* The tasks contained in the PLANet workbooks and scripts should not be undertaken by a school without careful review and consideration of the school's environment, including but not limited to campus, geography, proximity to known hazards, community relationships, service providers, and requirements imposed upon the school by various authorities. For example, requirements imposed upon schools may differ from jurisdiction to jurisdiction and it is the school's responsibility to understand all legal and regulatory requirements that may affect the school and govern its response to a critical incident. Also, it is the school's responsibility to thoroughly investigate and record its relationship with or reliance on the school's service providers in the appropriate scripts. PLANet materials are presented as a "best practices" guidelines. Strohl Systems assumes no liability for errors or omissions hereunder, including the requirements of any specific jurisdiction or regulatory authority.

Figure 11b

Student Workbook

Planet Demo School
Publication Date: 4/26/00

What Is The PLANet Student Workbook?

This workbook is a great way to build your Critical Incident Response Plan! By answering a series of questions, you will collect the information you need to build a comprehensive and effective plan. It allows you to work outside of PLANet to make decisions, and then shows you how to enter the information and build your plan.

*Be sure to customize the supplied scripts to your environment and requirements. Be sure to record your service providers in the appropriate roles.*

How Do I Use This Workbook?

This workbook contains pages that are very much like the student entry screen in PLANet. You will duplicate and complete these pages for each student, writing information in each field. Once the workbook is complete, data entry people will transfer what you collect here into PLANet using the instructions we have provided.

What Should The Administrator And/Or Planning Team Do?

First, review this entire workbook carefully to get a good feel for the questions you'll need to answer. Decide how you want to make these decisions - is one person primarily responsible or do you want to get a planning team together to make group decisions?

General background information appears in the introduction to each section. Read this material carefully before moving on. When you are asked to answer a question or make a decision, instructions to guide you appear in the white boxes at the top of the page. Complete the sections below, making notes and changes as needed.

Notice the approved by fields at the bottom of the page. Once you have completed the workbook, the plan administrator should review and approve each decision. Just initial and date to confirm.

Once this workbook is approved, you should give it to the data entry staff who will be entering information into PLANet.

What Should The Data Entry Staff Do?

Following the step-by-step instructions in the gray boxes to the left of the page, the data entry people will enter your hand-written information in the work area into PLANet. These steps are written specifically to show you how to open and use PLANet to enter that specific information, so there's no need to read the introduction or other areas.

Follow the workbook page by page until all the information collected by the planning team is entered into PLANet. Then let the plan coordinator know your work is complete.

Note: It is possible to follow this workbook while you are logged on to PLANet and simply enter the information as you go, but chances are you'll want time to meet and brainstorm about the decision you need to make.

Figure 11c

How to Use the PLANet Workbooks

(Instructions for Planning Team)

This section tells the planning team what they need to do in the workspace area.

(Instructions for Entering Information into PLANet)

Once the Planning Team has entered information or made changes in the workspace, the person who will enter the information into PLANet will use the instructions in this area.

They show step-by-step instructions needed to enter the workbook.

(Workspace)

In this area you will find questions you need to answer and information you need to review to build your plan.

You should write the answers and make your changes directly in this workspace so you can hand the workbook over to data entry staff to enter it into PLANet.

*(Approval Area)*

*(Approval Area)*

Figure 11d

Student Workbook

Planet Demo School
Publication Date: 4/26/00

Collect Student Information

This workbook guides you through collecting all the information you need to include students in your plan.

What Student Information Do I Need?

You'll need the name, address and phone number of each student. You'll also want the name of the student's parent or guardian, and should note if there are any special medical considerations (asthma, epilepsy, or other conditions that require a special care plan). Basically you'll want to have everything you'd need to know if some type of problem affects the student.

How Do I Get Student Information Into PLANet?

Use the following section to write down all the requested information about each student. The page looks very much like the student screen in PLANet. Just enter the appropriate information in each field (some of the fields already have information that you can change if you'd like). Any field marked with * means you MUST enter something in that field, but it's a good idea to fill in as many of the fields as you can. The more information you have, the better.

When you have completed the workbook, hand it to the data entry person who will be adding information to PLANet. They will use the instructions in the gray panel to enter what you've added.

Figure 11e

Student Workbook
Planet Demo School
Publication Date: 4/26/00

Field Definitions

Below is a list of fields with their definitions.

Faculty/Staff Call Chain Workbook

Planet Demo School
*Publication Date: 4/26/00*

*PLANet Terms of Service Agreement*

*IMPORTANT: The tasks contained in the PLANet workbooks and scripts should not be undertaken by a school without careful review and consideration of the school's environment, including but not limited to campus, geography, proximity to known hazards, community relationships, service providers, and requirements imposed upon the school by various authorities. For example, requirements imposed upon schools may differ from jurisdiction to jurisdiction and it is the school's responsibility to understand all legal and regulatory requirements that may affect the school and govern its response to a critical incident. Also, it is the school's responsibility to thoroughly investigate and record its relationship with or reliance on the school's service providers in the appropriate scripts. PLANet materials are presented as a "best practices" guidelines. Strohl Systems assumes no liability for errors or omissions hereunder, including the requirements of any specific jurisdiction or regulatory authority.*

Figure 12b

Faculty/Staff Call Chain Workbook

Planet Demo School
Publication Date: 4/26/00

What Is the PLANet Call Chain Workbook?

This workbook helps you create an effective way to pass vital information to all members of your academic and non-academic staff. It allows you to work outside of PLANet to construct an effective calling chain, and then shows you how to enter the information into PLANet.

*Be sure to customize the supplied scripts to your environment and requirements. Be sure to record your service providers in the appropriate roles.*

How Do I Use This Workbook?

This workbook is divided into two sections. The first section is for your planning team or plan coordinator to decide how to map out the calling chain for your school. The second section is for collecting the "Who calls Who" decisions.

The planning team will review their call chain design and write information directly into the workbook. Once the workbook is complete, data entry personnel will transfer the information to PLANet using the instructions provided.

It is possible to follow this workbook while you are logged on to PLANet. You could simply enter the information as you go, but chances are you'll want time to meet and brainstorm your approach and record your decisions without having to enter information during the same session.

You may also use this workbook to review and update your school's current call chain as faculty and staff assignments change, or as personnel join or leave the school. This workbook will also report your most recent PLANet information, so it will be easy to make changes.

What Should The Administrator And/Or Planning Team Do?

Review this entire workbook carefully to get a feel for the call chain design process. Then, decide how you want to fill in the workbook. Will one person be responsible for building the call chain or do you want to assemble a planning team to make the designations?

General, background information appears in the introduction to each section. Read this material carefully before moving on. The top of each page includes a white box with instructions to guide you through the decisions you'll be asked to make. Complete the sections below the instruction boxes, making notes and changes as needed.

Notice the "Approved by" fields at the bottom of the page. Once you have completed this workbook, the plan administrator should review and approve each decision. Just initial and date the entry to confirm.

Once this workbook is approved, the plan administrator should give it to the data entry staff who will be entering the information into PLANet.

What Should The Data Entry Staff Do?

Following the step-by-step instructions in the gray boxes to the left of the page, the data entry people will enter the hand-written information in the work area into PLANet. These steps are written specifically to show you how to open and use PLANet to enter that information, so there's no need to read the introduction or other areas.

Follow the workbook page by page until all the information collected by the planning team is entered into PLANet. Then let the plan coordinator know your work is complete.

Figure 12c

How to Use the PLANet Workbooks

(Instructions for Planning Team)

This section tells the planning team what they need to do in the workspace area.

(Workspace)

In this area you will find questions you need to answer and information you need to review to build your plan.

You should write the answers and make your changes directly in this workspace so you can hand the workbook over to data entry staff to enter it into PLANet.

(Instructions for Entering Information into PLANet)

Once the Planning Team has entered information or made changes in the workspace, the person who will enter the information into PLANet will use the instructions in this area.

They show step-by-step instructions needed to enter the workbook.

(Approval Area)

(Approval Area)

Figure 12d

Faculty/Staff Call Chain Workbook

Planet Demo School
Publication Date: 4/26/00

What Is A Call Chain?

In a call chain, members of the school staff agree to receive and place calls to one another. Call chains are normally used to pass time sensitive information to many people in the quickest possible time.

This can be especially useful during non-school hours when an important message must be delivered to the entire staff. *It could be used to notify school staff of a required meeting scheduled before school day begins, to alert them to an unanticipated school closure, or to pass on important information concerning the school's response to an off-campus critical incident.*

How Do I Design A Call Chain?

The basic components of a call chain are:

- Initiator - This person is responsible for beginning the notification process at the direction of school or district administration and places calls to the first tier of Recipients.
- Recipient with Calling Responsibilities - These staff members receive information from the next higher tier of the call chain then place their assigned calls, starting the next tier of contacts. This process is repeated until all calling responsibilities are complete -- the message is passed through the faculty and staff.
- Recipient without Calling Responsibilities - These staff members are in the final tier of the call chain and do not have any assigned calls to place.

A call chain's speed when executed is determined by the number of tiers in the call chain and the number of calls each Recipient must place. In general, a call chain is efficient if it limits the number of assigned calls to 3 or 4 per Recipient.

Note: The chain of calls can be broken if any "Recipient with Calling Responsibilities" cannot be reached by his/her caller. Therefore, each Recipient with Calling Responsibilities <u>must</u> be prepared to place calls on behalf of any Recipient who cannot be contacted.

How Do I Organize Call Chain Responsibilities?

Your call chain could be used to pass information or to initiate action. The plan administrator or the planning team should consider striking a balance between staff members who "need-to-know" and those that "need-to-act" when making call assignments. In general, those staff members who will be needed to take action are assigned to calling tiers earlier rather than later in the call chain.

Appendix A of this workbook lists all the faculty and staff members currently in PLANet. Using this list, the plan administrator and/or the planning team should identify the staff member who will initiate the call chain and which staff members the call chain initiator will contact. Once the decision is made, transfer the names to the Call Chain Worksheet using the word START to identify the chain's initiator. Your first calling tier will be complete at this point.

Now focus on one of the staff members that will receive a call from the Initiator and assign his or her contact responsibilities. Then, transfer those assignments to the Call Chain Worksheet. Repeat this process for each of the Initiator's contacts until you have completed the second tier of your call chain.

Follow these steps until you have made assignments for all callers on all tiers (i.e. all faculty and staff are included in the call chain).

Figure 12e

Faculty/Staff Call Chain Workbook

Planet Demo School
Publication Date: 4/26/00

What If A Current Faculty Or Staff Members Is Not In Appendix A?

Your plan may not have the most current staff information. If a large percentage of the staff is missing, consider importing the most current staff list and re-publishing this workbook before making call chain assignments.

If only a few staff member's names are missing, use the Call Chain Worksheet to list the missing names so the call chain design process can be completed. The name and contact information for any missing staff members must be entered in PLANet before their call chain assignments can be entered. Duplicate the Faculty/Staff Information Worksheet in Appendix B of this workbook for each missing staff member and complete the staff record in preparation for the data entry process. Attach completed copies of the Faculty/Staff Information Worksheet to the completed workbook.

How Do I Verify Workbook Results?

Printing the PLANet report titled Faculty/Staff Call Chain is the best way to check your work. It lists each caller and his/her calling assignments including all the off-hours contact information you've included. You may also republish this workbook to review calling assignments without contact numbers.

To print the report:
1. Log onto Planet.
2. Click on Update My Plan from the Main Menu.
3. Click on Manage My Resources.
4. Click on Faculty/Staff listed on the right side of the screen under "Reports".
5. Click on the report title - Faculty/Staff Call Chain.

Figure 12f

Faculty/Staff Call Chain Workbook

Planet Demo School
Publication Date: 4/26/00

Data Entry Instructions
1. Log on to PLANet.
2. Select Build My Plan.
3. Select Optional Step: Add Other Plan Details.
4. Select Design a Faculty/Staff Call Chain.
5. Select Enter a Completed Call Chain Workbook.
6. Select the name of the faculty or staff memeber that appears in the first column on the workspace to the left. This person will be the one placing the call(s).
7. Click Select Faculty/Staff button.
8. Click the box next to the name(s) of the people the person in Step 6 will be calling.
9. Click Finish.
10. Repeat Steps 6 to 9 for each faculty and staff memeber that must call someone.

Instructions: In the workspace below, enter the name of the person who will call each listed faculty or staff memeber. Write "Start" next to the person who will make the first call.

| | | |
|---|---|---|
| DORIS WILKINSON | calls: | CHARLES BONNEY |
| JAMES HAVLICK | calls: | JONATHON WINDHAM |
| KIMBERLY ERRICKSON | calls: | JAMES HAVLICK |
| KIMBERLY ERRICKSON | calls: | MARVIN MILLER |
| LORRAINE COYLE | calls: | LORI HUNTER |
| LORRAINE COYLE | calls: | DORIS WILKINSON |
| CHARLES BONNEY | calls: | SHELLEY MEANS |
| SCOTT BANKER | calls: | LORRAINE COYLE |
| SCOTT BANKER | calls: | KIMBERLY ERRICKSON |
| SCOTT BANKER | calls: | KATHRYN STOCK |
| | calls: | SCOTT BANKER |
| | calls: | KAREN BELLIS |

Initials: _____ Date Entered: _____

Approved By: _____ Date: _____

Figure 12g

Faculty/Staff Call Chain Workbook
Appendix A: Faculty/Staff ID

Planet Demo School
Publication Date: 4/26/00

| Name | Staff ID | Name | Staff ID | Name | Staff ID |
|---|---|---|---|---|---|
| SCOTT BANKER | STAFF9001 | | | | |
| KAREN BELLIS | STAFF9016 | | | | |
| CHARLES BONNEY | STAFF9003 | | | | |
| LORRAINE COYLE | STAFF9005 | | | | |
| KIMBERLY BRRICKSON | STAFF9006 | | | | |
| JAMES HAVLICK | STAFF9010 | | | | |
| LORI HUNTER | STAFF9011 | | | | |
| SHELLEY MEANS | STAFF9012 | | | | |
| MARVIN MILLER | STAFF9013 | | | | |
| KATHRYN STOCK | STAFF9007 | | | | |
| DORIS WILKINSON | STAFF9014 | | | | |
| JONATHON WINDHAM | STAFF9015 | | | | |

Figure 12h

Faculty/Staff Call Chain Workbook
Appendix B: Faculty/Staff Information

How to Add Faculty/Staff to PLANet
1. Log on to PLANet.
2. From the Main Menu, select Build My Plan.
3. Select Step 1: Enter My Faculty and Staff Into PLANet.
4. Select Enter a Completed Faculty/Staff Workbook.
5. Select Enter Faculty/Staff Workbook.
6. Click New.
7. Enter the name and personal information of the faculty or staff member as recorded here.
8. Click Save.
9. Repeat Steps 6 to 8 for each faculty or staff member you want to define.
10. Click Close.

Planet Demo School
Publication Date: 4/26/00

*Required Fields

Faculty/Staff ID:
First Name: *
Last Name: *
Title:
Address 1:
Address 2:
City:          State:     Zip:     Zip Ext:
Emergency Contact:        Emergency Contact Phone:

Telephone Numbers
Home:                On Crisis Contact List?: ☐
Pager/PIN:
Cellular:
Alternate:
Alt. Desc.:

Current Status/Assignments
Status:              Grade/Dept.:
Building:            Room/Homeroom:

Initials: _____  Date Entered: _____
Approved By: _____  Date: _____

Figure 12i

Resource Organizations Workbook

Planet Demo School
Publication Date: 4/26/00

PLANet Terms of Service Agreement

*IMPORTANT: The tasks contained in the PLANet workbooks and scripts should not be undertaken by a school without careful review and consideration of the school's environment, including but not limited to campus, geography, proximity to known hazards, community relationships, service providers, and requirements imposed upon the school by various authorities. For example, requirements imposed upon schools may differ from jurisdiction to jurisdiction and it is the school's responsibility to understand all legal and regulatory requirements that may affect the school and govern its response to a critical incident. Also, it is the school's responsibility to thoroughly investigate and record its relationship with or reliance on the school's service providers in the appropriate scripts. PLANet materials are presented as a "best practices" guidelines. Strohl Systems assumes no liability for errors or omissions hereunder, including the requirements of any specific jurisdiction or regulatory authority.*

Figure 13b

Resource Organizations Workbook

Planet Demo School
Publication Date: 4/26/00

What Is The PLANet Resource Organization Workbook?

This workbook is a great way to start building your Critical Incident Response Plan! By answering a series of questions, you will collect the information you need to build a comprehensive and effective plan. It allows you to work outside of PLANet to make decisions, and then shows you how to enter the information into PLANet.

*Be sure to customize the supplied scripts to your environment and requirements. Be sure to record your service providers in the appropriate roles.*

How Do I Use This Workbook?

This workbook contains pages that are very much like the resources entry screen in PLANet. You will duplicate and complete these pages for each community resource, writing information in each field and making changes as needed. Once the workbook is complete, data entry people will transfer what you collect here into PLANet using the instructions provided.

What Should The Administrator And/Or Planning Team Do?

First, review this entire workbook carefully to get a good feel for the questions you'll need to answer. Decide how you want to fill in the workbook - is one person primarily responsible or do you want to get a planning team together to make group decisions?

General background information appears in the introduction to each section. Read this material carefully before moving on. When you are asked to answer a question or make a decision, instructions to guide you appear in the white boxes at the top of the page. Complete the sections below, making notes and changes as needed.

Notice the approved by fields at the bottom of the page. Once you have completed the workbook, the plan administrator should review and approve each decision. Just initial and date to confirm.

Once this workbook is approved, you should give it to the data entry staff who will be entering information into PLANet.

What Should The Data Entry Staff Do?

Following the step-by-step instructions in the gray boxes to the left of the page, the data entry people will enter the hand-written information in the work area into PLANet. These steps are written specifically to show you how to open and use PLANet to enter that information, so there's no need to read the introduction or other areas.

Follow the workbook page by page until all the information entered by the planning team is entered into PLANet. Then let the plan coordinator know your work is complete.

Note: It is possible to follow this workbook while you are logged on to PLANet and simply enter the information as you go, but chances are you'll want time to meet and brainstorm about the decisions you need to make.

Figure 13c

How to Use the PLANet Workbooks

(Instructions for Planning Team)

This section tells the planning team what they need to do in the workspace area.

(Workspace)

In this area you will find questions you need to answer and information you need to review to build your plan.

You should write the answers and make your changes directly in this workspace so you can hand the workbook over to data entry staff to enter it into PLANet.

(Instructions for Entering Information into PLANet)

Once the Planning Team has entered information or made changes in the workspace, the person who will enter the information into PLANet will use the instructions in this area.

They show step-by-step instructions needed to enter the workbook.

(Approval Area)

(Approval Area)

Figure 13d

Resource Organizations Workbook

Planet Demo School
Publication Date: 4/26/00

Collecting Contact Information For Community Resources

This workbook guides you through collecting specific information about outside groups and people you may need to help your school respond to an incident.

What Are Community Resources?

Community resources are organizations like the local police and fire departments whose help will be important when responding to the incidents that take place at your school. When you reviewed incident scripts, you provided specific information like phone numbers for the resources that were specific to each incident.

But PLANet contains a large number of additional resources that are not assigned to incidents. You will use this workbook to review the list of resources, provide specific information, and decide whether you want to assign any of them to the incidents in your plan.

What Resource Information Do I Need?

You'll need the name, address and phone number of each organization, as well as the name of the contact people there, if any. You'll also may want to investigate to determine if you have a contract or agreement with organizations of this type.

How Do I Get Resource Information Into PLANet?

Use the following section to write down all the requested information about each resource. The page looks very much like the resources screen in PLANet. Just enter the appropriate information in each field (some of the fields already have information that you can change if you'd like). Any field marked with * means you MUST enter something in that field, but it's a good idea to fill in as many of the fields as you can. The more information you have, the better.

When you have completed the workbook, hand it to the data entry person who will be adding information to PLANet. They will use the instructions in the gray panel to enter what you've added.

Can I Add New Resources?

Yes! Suppose there are special organizations in your community that you want to include in your plan. You can add them to PLANet and then select them for an incident script.

Figure 13e

Resource Organizations Workbook

Planet Demo School
Publication Date: 4/26/00

Field Definitions

Below is a list of fields with their definitions.

Figure 13f

Resource Organizations Workbook

How to Revise Resource Organizations

1. Log on to PLANet.
2.
3.

Planet Demo School
*Publication Date: 4/26/00*

* Required Fields

☐ Modify
☐ Delete
☐ Keep As Is

Resource ID: S1234000016 *
Resource Organization: Local Police Department *

Address 1:
Address 2:
City:                    State:      Zip + 4:
Main Phone: 911
Emergency Phone:              Fax:
Web/E-mail:                            Contract?: ☐
Category: Law Enforcement
Product/Service: Local Police         Contact Ref:

Representative Contact Info
Name:
Position:
Location:
Work Phone:                Home Phone:
Beeper/Cell:
Other Phone:               Rep Email:

How to Delete a Resource Organization

1.
2.

Initials: _____ Date Entered: _____   Approved By: _____ Date: _____

Planet Demo School

*Plan Title*
School Incident Response Plan

*Publication Date: 4/27/00*

| | |
|---|---|
| Publisher | Jane Doe |
| Plan Administrator | John Smith |
| | 500 N Gulph Road |
| | Suite 500 |
| | King Of Prussia, PA 19406 |
| Main Phone | 610-768-4120 |

Figure 16

Table of Contents

| | |
|---|---|
| Plan Overview | 1 |
| Faculty/Staff Crisis Contacts | 2 |
| Faculty/Staff Assigned to Roles | 3 |
| Incidents | 4 |
|     Bomb Explosion and Fire at School | 4 |
|     Bomb Threat | 8 |

Figure 17

SAMPLE

Safe Schools Plan Overview
*- managing a critical incident-*

Introduction

The purpose of a set of critical incident response procedures is to help <OUR> school deal with any number of situations. These procedures are to be followed for any event at the school regardless of whether or not the incident occurs during the school day or at an evening function. Examples of incidents or threat situations may be as follows:

- Intruder with a weapon coming into school
- Intruder with a weapon who takes a hostage and becomes barricaded
- Intruder with an explosive device
- An explosive device
- Fire
- Toxic spill or severe weather event The administration and the staff need to react to the situation with the appropriate response. If the situation warrants, evacuation of the building may be necessary, or it may call for the students to remain in their classes. Two factors need to be dealt with by all staff:

- The immediate situation causing the crisis
- The safety of the rest of the students and staff on school grounds Our number one priority will be the safety and/or evacuation of the students and staff not directly involved in the situation. The administration and the staff will relinquish control of the situation to local authorities as soon as they arrive at the school site. It is our responsibility to initiate appropriate and immediate action necessary to assist the local authorities in regaining control of the situation.

General Incident Response Guidelines

Faculty/Staff Crisis Contacts  Planet Demo School
*Publication Date: 4/27/00*

SCOTT BANKER
- Home: 697-388-1642
- Pager/PIN: 800-SKY-PAGE/515-4488
- Cellular: 697-287-4486
- Alternate: 697-548-9917
- Alt. Desc: Spouse Work #

LORRAINE COYLE
- Home: 697-565-8894
- Cellular: 697-484-6524
- Alternate: 978-752-4621
- Alt. Desc: Weekend Retreat

JAMES HAVLICK
- Home: 697-642-3656

CHARLES BONNEY
- Home: 215-483-0260
- Cellular: 215-693-7264

KIMBERLY ERRICKSON
- Home: 203-323-1725
- Pager/PIN: 203-948-6362
- Cellular: 203-948-5588

SHELLEY MEANS
- Home: 697-558-2968
- Cellular: 697-664-9183

Planet Demo School - Confidential    2

Figure 19

Faculty/Staff Assigned to Roles      Planet Demo School
*Publication Date: 4/27/00*

Incident Clinical Coordinator
   SHELLEY MEANS     Title: Psychologist

Incident Data Coordinator
   CHARLES BONNEY     Title: Guidance Counselor

Incident Facilities Officer
   DORIS WILKINSON     Title: Administrative Assistant

Incident Manager
   LORRAINE COYLE     Title: English Teacher

Incident Medical Officer
   KATHRYN STOCK     Title: Computer Science Teacher

Incident PIO
   KIMBERLY ERRICKSON     Title: Science Teacher

Safe Schools Coordinator
   JAMES HAVLICK     Title: Assistant Principal

Figure 20

Incident Action Plan  Planet Demo School
Publication Date: 4/27/00

Bomb Explosion and Fire at School (Threats/Acts of Violence)

*An explosive device has been detonated causing an explosion and/or fire in or on school premises.*

Faculty/Staff Assigned to Roles

| Name | Role | Home | Pager/PIN | Cellular |
|---|---|---|---|---|
| LORRAINE COYLE | Incident Manager | 697-565-8894 | | 697-484-6524 |
| JAMES HAVLICK | Safe Schools Coordinator | 697-642-3656 | | |
| KATHRYN STOCK | Incident Medical Officer | 697-326-4469 | | |

Incident Script

| Order | Task Description | Assigned Roles with Faculty/Staff |
|---|---|---|
| 1 | Immediately call 911... | Incident Dispatcher<br>Safe Schools Coordinator<br>JAMES HAVLICK |
| 2 | Alert the Incident Manager ... | Safe Schools Coordinator<br>JAMES HAVLICK |
| 3 | Immediately initiate ... | Incident Manager<br>LORRAINE COYLE<br>Safe Schools Coordinator<br>JAMES HAVLICK |
| 4 | Prepare ... | Incident Medical Officer<br>KATHRYN STOCK<br>Medical Staff |
| 5 | Notify:<br>·<br>·<br>· | Incident Manager<br>LORRAINE COYLE |

Strohl Systems copywritten material adapted by Planet Demo School with permission Planet Demo School - Confidential

Figure 21

Incident Resource Requirements

Planet Demo School
*Publication Date: 4/27/00*

| Bomb Explosion and Fire at School (Threats/Acts of Violence) |
|---|

Locations
Command Center
School Administration (Room 10)
432 Oak Lane
Building B
Boot, PA                    26061-2660
Telephone:          206-388-4700
Directions:           Turn onto the main access road for Middle/High school complex. Building is on the left.
Contact Person:   Joyce Ballinger
Home Phone:      206-432-3542
Work Phone:       206-388-4751

Staging/Assembly
Football Field (High School Varsity Field)
435 Oak Lane
Boot, PA               26061-2660
Directions:          Located on the South end of the High School campus.

Services
External Facility Cleaning Firm
Aggreement/Contract?:  YES
Service Lead Time:      1
Vendor Name:              Service Master

Local Police Department
Aggreement/Contract?:  NO
Vendor Name:              Local Police Department

Supplies
Bullhorn
Category:         Safety Equip         Storage Location:  Principals Office
Quantity on Hand:  3                       Stock Agreement:  No
Minimum Quantity:  3

Radio
Category:         Communications Equip    Storage Location:  Rear of Mainten
Quantity on Hand:  6                       Stock Agreement:  Yes
Minimum Quantity:  3

Vital Records
Building Blueprints
Department:    Maintenance           Media Type:        Paper            Form Number:  B-335-0001
Location:        School Administration   Last Sent Offsite:  Never
Origin Source:  Township             Alternate Source:  Township Planet Demo School - Confidential

Figure 22

Incident Resource Requirements

Planet Demo School
*Publication Date: 4/27/00*

Bomb Explosion and Fire at School (Threats/Acts of Violence)

Building Floor Plan (with room designations)

| | | | | | |
|---|---|---|---|---|---|
| Department: | Maintenance | Media Type: | Paper | Form Number: | B-435-0025 |
| Location: | School Administration | Last Sent Offsite: | September | | |
| Origin Source: | Main Office | Alternate Source: | Main Office | | |

Figure 23

SAMPLE INCIDENT SPECIFIC DOCUMENT

Any incident specific documents would appear here. These could include any documents that would be needed before, during or after an incident has occurred.

Planet Demo School - Confidential

Figure 24

Incident Action Plan

Planet Demo School
Publication Date: 4/27/00

Bomb Threat (Threats/Acts of Violence)

*School receives Bomb Threat via telephone, fax, internet or written communication.*

Faculty/Staff Assigned to Roles

| Name | Role | Home | Pager/PIN | Cellular |
|---|---|---|---|---|
| LORRAINE COYLE | Incident Manager | 697-565-8894 | | 697-484-6524 |
| JAMES HAVLICK | Safe Schools Coordinator | 697-642-3656 | | |

Incident Script

| Order | Task Description | Assigned Roles with Faculty/Staff |
|---|---|---|
| 1 | If threat is issued via telephone then:<br><br>a) log all words used in threat,<br>b) gender of the caller,<br>c) background sounds of the caller, and<br>d) attempt to keep the caller engaged for as long as possible. | Incident Dispatcher<br>Incident Manager<br>  LORRAINE COYLE<br>Safe Schools Coordinator<br>  JAMES HAVLICK |
| 2 | Contact local 911 and relay threat information. Request a call trace. | Incident Dispatcher |
| 3 | If threat is issued via Internet, fax, US Postal Service or other written means then preserve any hard/soft copy evidence of threat content and contact local 911. School-based personnel should not attempt to act as a detectives or federal investigators. | Incident Dispatcher<br>Incident Manager<br>  LORRAINE COYLE<br>Safe Schools Coordinator<br>  JAMES HAVLICK |
| 4 | Request the 911 operator to stay on the line and be ready to dispatch necessary response units trained to handle explosive device searches and defusings, as required by the local fire department, the state police and the ATF. | Incident Dispatcher |
| 5 | Maintaining safe distances, scan school grounds and buildings for out of the ordinary objects or packages and report anything unusual to the Incident Dispatcher. | Incident Security Officer<br>Safe Schools Coordinator<br>  JAMES HAVLICK |
| 6 | Based on your school's bomb threat evacuation protocol, as developed in collaboration with your local fire department, determine when to activate your evacuation plan. | Incident Manager<br>  LORRAINE COYLE<br>Safe Schools Coordinator<br>  JAMES HAVLICK |

Strohl Systems copywritten material adapted by Planet Demo School with permission Planet Demo School - Confidential

Figure 25

Incident Resource Requirements

Planet Demo School
*Publication Date: 4/27/00*

> Bomb Threat (Threats/Acts of Violence)

Services

Local Police Department
Agreement/Contract?: NO
Vendor Name: Local Police Department

Vital Records

Building Floor Plan (with room designations)
| | | | |
|---|---|---|---|
| Department: Maintenance | Media Type: Paper | Form Number: B-435-0025 |
| Location: School Administration | Last Sent Offsite: September | |
| Origin Source: Main Office | Alternate Source: Main Office | |

Figure 26

Bomb Threat Call

Call received by: _____

Date reported: _____ Time: _____

Exact words of caller: _____

_____

_____

_____

_____

Bomb Threat Call Checklist

1. When is the bomb going to explode? _____
2. Where did you place the bomb? _____
3. What does the bomb look like? _____
4. What kind of bomb is it? _____
5. What will cause the bomb to explode? _____
6. Did you place the bomb? _____
7. Why did you place the bomb? _____
8. What is your name? _____
9. Where are you calling from? _____

Identifying Information

- Disposition of caller's voice: _____
- Sex of caller: _____
- Accent (if detectable): _____
- Did the voice sound like an adult? _____ Child? _____
- Background Sounds: _____

- Threatening language: _____

Attributes by Faculty/Staff      Planet Demo School
*Publication Date: 4/25/00*

| Employee Name | Attribute Descriptio |
|---|---|
| SCOTT BANKER | Speaks Vietnamese |
| | Trained as Media Spokesperson |
| | Has a School District Laptop |
| | Certified in Advanced School CISM |
| | Lives < 2 miles from school |
| KAREN BELLIS | Special Education Certified |
| | Certified in Basic School CISM |
| CHARLES BONNEY | SAP Qualified |
| | Safety Trained |
| | Guidance Counselor |
| | Owns a cellular phone |
| | Lives < 2 miles from school |
| LORRAINE COYLE | Trained as Media Spokesperson |
| | Knows Sign Language |

Figure 28

Attributes by Faculty/Staff  Planet Demo School
*Publication Date: 4/25/00*

| Employee Name | Attribute Descriptio |
|---|---|
| SCOTT BANKER | Speaks Vietnamese |
| | Trained as Media Spokesperson |
| | Has a School District Laptop |
| | Certified in Advanced School CISM |
| | Lives < 2 miles from school |
| KAREN BELLIS | Special Education Certified |
| | Certified in Basic School CISM |
| CHARLES BONNEY | SAP Qualified |
| | Safety Trained |
| | Guidance Counselor |
| | Owns a cellular phone |
| | Lives < 2 miles from school |
| LORRAINE COYLE | Trained as Media Spokesperson |
| | Knows Sign Language |

Figure 29

Faculty/Staff by Attribute

Planet Demo School
*Publication Date: 4/25/00*

| Description | Employee Name |
|---|---|
| Certified in Advanced School CISM | SCOTT BANKER |
| Certified in Basic School CISM | KAREN BELLIS |
| Guidance Counselor | CHARLES BONNEY |
| Has a School District Laptop | SCOTT BANKER |
| Knows Sign Language | LORRAINE COYLE |
| Lives < 2 miles from school | SCOTT BANKER<br>CHARLES BONNEY |
| Owns a cellular phone | CHARLES BONNEY |
| Safety Trained | CHARLES BONNEY |
| SAP Qualified | CHARLES BONNEY |
| Speaks Vietnamese | SCOTT BANKER |
| Special Education Certified | KAREN BELLIS |
| Trained as Media Spokesperson | SCOTT BANKER<br>LORRAINE COYLE |

Planet Demo School - Confidential

Figure 30

Faculty/Staff by Name

Planet Demo School
*Publication Date: 4/25/00*

SCOTT BANKER
Principal
18 FERN HILL ROAD
APT 335
KINNETT, PA 26328-2110
Status: Administrator
Grade/Dept.: N/A
Building: High School
Room/Homeroom: ADM6

On Crisis Contact List?: YES
Home: 697-388-1642
Pager/PIN: 800-SKY-PAGE/515-4488
Cellular: 697-287-4486
Alternate: 697-548-9917
Alt. Desc: Spouse Work #
Emergency Contact: Winona Banker
Emergency Contact Phone: 697-548-9917

KAREN BELLIS
Special Education
1241 LONGMEADOW ROAD

BOOT, PA 26061
Status: Teacher-F/T
Grade/Dept.: Special Ed
Building: High School
Room/Homeroom: D-09

On Crisis Contact List?: NO
Home: 697-558-1939
Pager/PIN: 587-339-4569
Cellular: 281-448-9932
Alternate: 602-559-4275
Alt. Desc: Vacation Home
Emergency Contact: Warren Bellis
Emergency Contact Phone: 281-545-9289

CHARLES BONNEY
Guidance Counselor
112 MOSCIA LANE

WARD, PA 26083
Status: Guidance Couns.
Grade/Dept.: Pupil Services
Building: High School
Room/Homeroom: ADM-04

On Crisis Contact List?: YES
Home: 215-483-0260

Cellular: 215-693-7264

Emergency Contact: Clyde James
Emergency Contact Phone: 215-483-0260

LORRAINE COYLE
English Teacher
P.O.BOX 1543

MEDINA, PA 26063-6441
Status: Teacher-F/T
Grade/Dept.: G-10
Building: High School
Room/Homeroom: B-12

On Crisis Contact List?: YES
Home: 697-565-8894

Cellular: 697-484-6524
Alternate: 978-752-4621
Alt. Desc: Weekend Retreat
Emergency Contact: Frank Coyle
Emergency Contact Phone: 697-359-4867

KIMBERLY ERRICKSON
Science Teacher
11 FORDHAM AVE

NEW CASTLE, DE 26320-4677
Status: Teacher-F/T
Grade/Dept.: G-9
Building: High School
Room/Homeroom: B-17

On Crisis Contact List?: YES
Home: 203-323-1726
Pager/PIN: 203-948-6362
Cellular: 203-948-5588

Emergency Contact: John & Marie Errickson
Emergency Contact Phone: 203-948-5927

Planet Demo School - Confidential          1

Figure 31

Faculty/Staff Call Chain

Planet Demo School
Publication Date: 4/25/00

| | Home | Pager/PIN | Cellular | Alternate<br>Alt. Desc |
|---|---|---|---|---|
| SCOTT BANKER calls: | | | | |
| KATHRYN STOCK | 697-326-4469 | | | |
| KIMBERLY ERRICKSON | 203-323-1726 | 203-948-6362 | 203-948-5588 | |
| LORRAINE COYLE | 697-565-8894 | | 697-484-6524 | 978-752-4621<br>Weekend Retreat |
| | | | | |
| CHARLES BONNEY calls: | | | | |
| SHELLEY MEANS | 697-558-2968 | | 697-864-9183 | |
| | | | | |
| LORRAINE COYLE calls: | | | | |
| DORIS WILKINSON | 697-869-8180 | | | 697-845-6222<br>2nd home line |
| LORI HUNTER | 697-431-4550 | | | |
| | | | | |
| KIMBERLY ERRICKSON calls: | | | | |
| MARVIN MILLER | 697-497-2570 | | | |
| JAMES HAVLICK | 697-642-3656 | | | |
| | | | | |
| JAMES HAVLICK calls: | | | | |
| JONATHON WINDHAM | 697-429-2408 | | | |
| | | | | |
| DORIS WILKINSON calls: | | | | |
| CHARLES BONNEY | 215-483-0260 | | 215-693-7264 | |

Planet Demo School - Confidential

Figure 32

Faculty/Staff Crisis Contacts

Planet Demo School
*Publication Date: 4/25/00*

SCOTT BANKER
Home: 697-388-1642
Pager/PIN: 800-SKY-PAGE/515-4488
Cellular: 697-287-4486
Alternate: 697-548-9917
Alt. Desc: Spouse Work #

LORRAINE COYLE
Home: 697-565-8894
Cellular: 697-484-6524
Alternate: 978-752-4621
Alt. Desc: Weekend Retreat

JAMES HAVLICK
Home: 697-642-3656

CHARLES BONNEY
Home: 215-483-0260
Cellular: 215-693-7264

KIMBERLY ERRICKSON
Home: 203-323-1726
Pager/PIN: 203-948-6362
Cellular: 203-948-5588

SHELLEY MEANS
Home: 697-558-2968
Cellular: 697-664-9183

Figure 33

Incident Action Plan

Planet Demo School
*Publication Date: 4/27/00*

| Bomb Explosion and Fire at School (Threats/Acts of Violence) |
|---|

*An explosive device has been detonated causing an explosion and/or fire in or on school premises.*

Faculty/Staff Assigned to Roles

| Name | Role | Home | Pager/PIN | Cellular |
|---|---|---|---|---|
| LORRAINE COYLE | Incident Manager | 697-565-8894 | | 697-484-6524 |
| JAMES HAVLICK | Safe Schools Coordinator | 697-642-3656 | | |
| KATHRYN STOCK | Incident Medical Officer | 697-326-4469 | | |

Incident Script

| Order | Task Description | Assigned Roles with Faculty/Staff |
|---|---|---|
| 1 | Immediately call 911... | Incident Dispatcher<br>Safe Schools Coordinator<br>JAMES HAVLICK |
| 2 | Alert the Incident Manager ... | Safe Schools Coordinator<br>JAMES HAVLICK |
| 3 | Immediately initiate ... | Incident Manager<br>LORRAINE COYLE<br>Safe Schools Coordinator<br>JAMES HAVLICK |
| 4 | Prepare ... | Incident Medical Officer<br>KATHRYN STOCK<br>Medical Staff |
| 5 | Notify:<br>.<br>.<br>. | Incident Manager<br>LORRAINE COYLE |

Strohl Systems copywritten material adapted by Planet Demo School with permission

Planet Demo School - Confidential

Figure 34

Incident Action Plan by Role

Planet Demo School
*Publication Date: 4/27/00*

| Bomb Threat (Threats/Acts of Violence) |
|---|

*School receives Bomb Threat via telephone, fax, internet or written communication.*

Incident Dispatcher

Incident Script  *Note: The Order listed below reflects the overall order in the Incident.*

| Order | Estimated Duration (Hours) | Task Description |
|---|---|---|
| 1 | | If threat is issued via telephone then:<br><br>a) log all words used in threat,<br>b) gender of the caller,<br>c) background sounds of the caller, and<br>d) attempt to keep the caller engaged for as long as possible. |
| 2 | | Contact local 911 and relay threat information. Request a call trace. |
| 3 | | If threat is issued via Internet, fax, US Postal Service or other written means then preserve any hard/soft copy evidence of threat content and contact local 911. School-based personnel should not attempt to act as a detectives or federal investigators. |
| 4 | | Request the 911 operator to stay on the line and be ready to dispatch necessary response units trained to handle explosive device searches and defusings, as required by the local fire department, the state police and the ATF. |

Planet Demo School - Confidential

Figure 35

Incident Location Requirements

Planet Demo School
*Publication Date: 4/27/00*

---

Bomb Explosion and Fire at School (Threats/Acts of Violence)

Locations
Command Center
School Administration (Room 10)
432 Oak Lane
Building B
Boot, PA          26061-2660
Telephone:        206-388-4700
Directions:       Turn onto the main access road for Middle/High school complex. Building is on the left.
Contact Person:   Joyce Ballinger
Home Phone:       206-432-3542
Work Phone:       206-388-4751

Staging/Assembly
Football Field (High School Varsity Field)
435 Oak Lane
Boot, PA          26061-2660
Directions:       Located on the South end of the High School campus.

Planet Demo School - Confidential                              1

Figure 36

Incident Resource Requirements

Planet Demo School
*Publication Date: 4/27/00*

Bomb Explosion and Fire at School (Threats/Acts of Violence)

Locations

Command Center
School Administration (Room 10)
432 Oak Lane
Building B
Boot, PA            26061-2660
Telephone:      206-388-4700
Directions:        Turn onto the main access road for Middle/High school complex. Building is on the left.
Contact Person:  Joyce Ballinger
Home Phone:    206-432-3542
Work Phone:    206-388-4751

Staging/Assembly
Football Field (High School Varsity Field)
435 Oak Lane
Boot, PA            26061-2660
Directions:        Located on the South end of the High School campus.

Services

External Facility Cleaning Firm
Aggreement/Contract?: YES
Service Lead Time: 1
Vendor Name: Service Master

Local Police Department
Aggreement/Contract?: NO
Vendor Name: Local Police Department

Supplies

Bullhorn
Category: Safety Equip
Quantity on Hand: 3
Minimum Quantity: 3

Storage Location: Principals Office
Stock Agreement: No

Radio
Category: Communications Equip
Quantity on Hand: 6
Minimum Quantity: 3

Storage Location: Rear of Mainten
Stock Agreement: Yes

Vital Records

Building Blueprints
Department: Maintenance
Location: School Administration
Origin Source: Township Media Type: Paper
Last Sent Offsite: Never
Alternate Source: Township Form Number: B-335-0001

Planet Demo School - Confidential

Figure 37

Incident Services Requirement

Planet Demo School
Publication Date: 4/27/00

| Bomb Explosion and Fire at School (Threats/Acts of Violence) |

Services

External Facility Cleaning Firm
Aggreement/Contract?: YES
Service Lead Time: 1
Vendor Name: Service Master

Local Police Department
Aggreement/Contract?: NO
Vendor Name: Local Police Department Planet Demo School - Confidential

Figure 38

Incident Supply Requirements

Planet Demo School
Publication Date: 4/27/00

Bomb Explosion and Fire at School (Threats/Acts of Violence)

Supplies

Bullhorn
| | | | |
|---|---|---|---|
| Category: | Safety Equip | Storage Location: | Principals Office |
| Quantity on Hand: | 3 | Stock Agreement: | No |
| Minimum Quantity: | 3 | | |

Radio
| | | | |
|---|---|---|---|
| Category: | Communications Equip | Storage Location: | Rear of Mainten |
| Quantity on Hand: | 6 | Stock Agreement: | Yes |
| Minimum Quantity: | 3 | | |

Figure 39

Incident Tasks by Role

Planet Demo School
*Publication Date: 4/27/00*

| Incident Dispatcher |
|---|

Bomb Explosion and Fire at School (Threats/Acts of Violence)

*An explosive device has been detonated causing an explosion and/or fire in or on school premises.*

| Order | Estimated Duration (Hours) | Task Description | Note: The Order listed below reflects the overall order in the incident. |
|---|---|---|---|
| 1 | | Immediately call 911... | |

Bomb Threat (Threats/Acts of Violence)

*School receives Bomb Threat via telephone, fax, internet or written communication.*

| Order | Estimated Duration (Hours) | Task Description | Note: The Order listed below reflects the overall order in the incident. |
|---|---|---|---|
| 1 | | If threat is issued via telephone then:<br><br>a) log all words used in threat,<br>b) gender of the caller,<br>c) background sounds of the caller, and<br>d) attempt to keep the caller engaged for as long as possible. | |
| 2 | | Contact local 911 and relay threat information. Request a call trace. | |
| 3 | | If threat is issued via Internet, fax, US Postal Service or other written means then preserve any hard/soft copy evidence of threat content and contact local 911. School-based personnel should not attempt to act as a detectives or federal investigators. | |
| 4 | | Request the 911 operator to stay on the line and be ready to dispatch necessary response units trained to handle explosive device searches and defusings, as required by the local fire department, the state police and the ATF. | |

Strohl Systems copywritten material adapted by Planet Demo School with permission
Planet Demo School - Confidential

Figure 40

Incident Vital Records Requirements

Planet Demo School
Publication Date: 4/27/00

Bomb Explosion and Fire at School (Threats/Acts of Violence)

Vital Records

Building Blueprints

| | | | | | | |
|---|---|---|---|---|---|---|
| Department: | Maintenance | Media Type: | Paper | Form Number: | B-335-0001 |
| Location: | School Administration | Last Sent Offsite: | Never | | |
| Origin Source: | Township | Alternate Source: | Township | | |

Building Floor Plan (with room designations)

| | | | | | | |
|---|---|---|---|---|---|---|
| Department: | Maintenance | Media Type: | Paper | Form Number: | B-435-0025 |
| Location: | School Administration | Last Sent Offsite: | September | | |
| Origin Source: | Main Office | Alternate Source: | Main Office | | |

Planet Demo School - Confidential

Figure 41

Incidents by Category

Planet Demo School
Publication Date: 4/27/00

Type: Threats/Acts of Violence
    Bomb Threat
    School receives Bomb Threat via telephone, fax, internet or written communication.
    Bomb Explosion and Fire at School
    An explosive device has been detonated causing an explosion and/or fire in or on school premises.

Figure 42

Incidents by Description  Planet Demo School
*Publication Date: 4/27/00*

Bomb Explosion and Fire at School
Type: Threats/Acts of Violence        Approved:   Yes
Summary   An explosive device has been detonated causing an explosion and/or fire in or on school premises.

Bomb Threat
Type:     Threats/Acts of Violence       Approved:   Yes
Summary   School receives Bomb Threat via telephone, fax, internet or written communication.

Figure 43

Locations by Type                                         Planet Demo School
                                                          *Publication Date: 4/25/00*

Alternate Site

Middle School (Gym)

430 Oak Lane
Boot, PA 26061-2660
Telephone:        206-388-4788
Directions:       Follow main access road for Middle/High school complex to end. Building is on right.
Contact Person:   Roger Cummings
Home Phone:       206-488-9235
Work Phone:       206-388-4789

Command Center

School Administration (Room 10)

432 Oak Lane
Building B
Boot, PA 26061-2660
Telephone:        206-388-4750
Directions:       Turn onto the main access road for Middle/High school complex. Building is on the left.
Contact Person:   Joyce Balfinger
Home Phone:       206-432-3542
Work Phone:       206-388-4751

Staging/Assembly

Football Field (High School Varsity Field)

435 Oak Lane
Boot, PA 26061-2660
Directions:       Located on the South end of the High School campus.

Storage

Storage R Us (L-256 to M-003)

42 Main Street
Boot, PA 26061-2660
Telephone:        800-328-4480
Directions:       From school campus, turn left on the Cherry Lane. At stop sign turn right onto Tree Top Road. Follow Tree Top Road to end. Turn left onto Main Street. Building is located 2 miles on left.
Contact Person:   Jerry Cross
Work Phone:       800-328-4480

*Planet Demo School - Confidential*

Figure 44

Locations Used in Incidents

Planet Demo School
*Publication Date: 4/25/00*

Football Field (High School Varsity Field)
    Bomb Explosion and Fire at School Staging/Assembly

School Administration (Room 10)
    Bomb Explosion and Fire at School

Command Center

Planet Demo School - Confidential

Figure 45

Product/Service Suppliers

Planet Demo School
*Publication Date: 4/25/00*

| | Main Phone | Fax | Emergency Phone |
|---|---|---|---|
| Product/Service: Bomb Detection/Disposal | | | |
| Bomb Squad | 800-333-5700 | 402-352-4928 | 911 |
| Product/Service: Building Advisory Group | | | |
| Building Advisory Council | 402-598-3300 | 402-598-3350 | 402-598-3398 |
| Product/Service: Cable Service | | | |
| Suburban Cable | 402-421-6602 | | |
| Product/Service: Crisis Intervention | | | |
| Local Mental Health Center | 402-335-8730 | 402-335-8729 | |
| Product/Service: District Advisory Group | | | |
| District Advisory Council | 206-388-4700 | 206-388-4725 | 206-388-4714 |
| Local School Board | | | |
| Product/Service: Equipment Rental | | | |
| Equipment Rental Vendor | 402-447-3487 | | |
| Product/Service: Facility Cleaning | | | |
| Service Master | | | |
| Product/Service: Federal Criminal Investigation | | | |
| Federal Bureau of Investigation (FBI) | 402-418-4000 | | 911 |
| Product/Service: Fire Response | | | |
| Fire Department | 911 | | 911 |
| Product/Service: First Aid Supplies/Equipment | | | |
| First Aid Supplies Vendor | 402-763-9827 | 402-763-9826 | |
| Product/Service: Home/School Assoc. | | | |
| Home & School Association | | | |
| Product/Service: Legal Assistance | | | |
| District Attorney's Office | 402-884-2398 | 402-884-2399 | |
| Product/Service: Legal Counsel | | | |
| School's Legal Counsel | 402-432-1156 | 402-432-1157 | 402-432-1155 |
| Product/Service: Local Police | | | |
| Local Police Department | 911 | | 911 |
| Product/Service: Parent Teacher Organization | | | |
| Local Parent Teacher Organization | | | |
| Product/Service: Property/Casualty | | | |
| Property/Casualty Insurer | 402-446-6218 | 402-446-6229 | |

Planet Demo School - Confidential             1

Figure 46

Resource Organization by Category

Planet Demo School
Publication Date: 4/26/00

Category: Emergency Equipment

Safety Equipment Supplier
400 North Hills Road
Suite 100
Kent, PA 26194
Web/Email:        www.safetyequip.com
Main Phone:       402-334-7400
Fax:              402-334-7411
Emergency Phone:  402-334-7400
  Jennifer Mitchel
  Position:       Customer Service Rep
  Location:       Kent
  Work Phone:     402-334-7400 ext 211
  Home Phone:     402-582-8827
  Beeper/Cell:    402-334-3364
  Other Phone:    402-334-7455
  Rep Email:      jm@safetyequip.com Contract?:        Yes
Contract Ref:     345-78-0001
Product/Service:  Safety Equipment Planet Demo School - Confidential

Figure 47

Resource Organization by Category

Planet Demo School
Publication Date: 4/26/00

Category: Emergency Services

Bomb Squad
30 Broad Avenue
Suite 332
Philadelphia, PA 19001
Web/Email: www.bsquadphila.com
Main Phone: 800-333-5700
Fax: 402-352-4928
Emergency Phone: 911
   Sgt. Michael Anderson
      Position: Sgt
      Location: Philadelphia
      Work Phone: 800-333-5700
      Rep Email: ande@bsquadphila.com Contract?: No
Product/Service: Bomb Detection/Disposal

Fire Department
703 Henderson Rd
Boot, PA 26061
Main Phone: 911
Emergency Phone: 911
   Joseph Larson
      Position: Fire Chief
      Location: Boot Product/Service: Fire Response Planet Demo School - Confidential

Figure 48

Resource Organizations by Name

Planet Demo School
*Publication Date: 4/25/00*

Bomb Squad
30 Broad Avenue
Suite 332
Philadelphia, PA 19001
Main Phone: 800-333-5700
Fax: 402-352-4928
Emergency Phone: 911
Web/Email: www.bsquadphila.com
   Sgt. Michael Anderson
    Position: Sgt
    Location: Philadelphia
    Work Phone: 800-333-5700
    Rep Email: ande@bsquadphila.com Contract?: No
Category: Emergency Services
Product/Service: Bomb Detection/Disposal

Building Advisory Council
304 Spruce Rd
Suite 3
Philadelphia, PA 66078
Main Phone: 402-598-3300
Fax: 402-598-3350
Emergency Phone: 402-598-3398
Web/Email: www.council.com
   Dean Whitman
    Position: President
    Location: Philadelphia
    Work Phone: 402-598-3328
    Home Phone: 402-367-4482
    Beeper/Cell: 402-332-4801
    Other Phone: 402-598-3300
    Rep Email: Dwhitman@council.com Contract?: Yes
Contract Ref: 334-01-66729
Category: Local Parent Org.
Product/Service: Building Advisory Group

District Advisory Council
432 Oak Lane
Building A
Boot, PA 26061-6601
Main Phone: 206-388-4700
Fax: 206-388-4725
Emergency Phone: 206-388-4714
   Howard Jonson
    Position: President
    Location: Boot
    Work Phone: 402-356-8730
    Home Phone: 206-267-8896
    Beeper/Cell: 206-267-4587

Contract?: No
Category: Local Parent Org.
Product/Service: District Advisory Group

District Attorney's Office

Main Phone: 402-884-2398
Fax: 402-884-2399

Contract?: No
Category: Municipal Government
Product/Service: Legal Assistance

Planet Demo School - Confidential     1

Figure 49

Vendor Representatives by Name   Planet Demo School
*Publication Date: 4/25/00*

Howard Jonson
District Advisory Council
Position:     President
Location:     Boot
Work Phone:   402-356-8730
Home Phone:   206-267-8696
Beeper/Cell:  206-267-4587

Dean Whitman
Building Advisory Council
Position:     President
Location:     Philadelphia
Work Phone:   402-598-3328
Home Phone:   402-367-4482
Beeper/Cell:  402-332-4801
Other Phone:  402-598-3300
Rep Email:    Dwhitman@council.com

Sgt. Michael Anderson
Bomb Squad
Position:     Sgt
Location:     Philadelphia
Work Phone:   800-333-5700
Rep Email:    ande@bsquadphila.com Planet Demo School - Confidential          1

Figure 50

Faculty/Staff Assigned to Roles  Planet Demo School
*Publication Date: 4/25/00*

Incident Clinical Coordinator
SHELLEY MEANS — Title: Psychologist

Incident Data Coordinator
CHARLES BONNEY — Title: Guidance Counselor

Incident Facilities Officer
DORIS WILKINSON — Title: Administrative Assistant

Incident Manager
LORRAINE COYLE — Title: English Teacher

Incident Medical Officer
KATHRYN STOCK — Title: Computer Science Teacher

Incident PIO
KIMBERLY ERRICKSON — Title: Science Teacher

Safe Schools Coordinator
JAMES HAVLICK — Title: Assistant Principal

Planet Demo School - Confidential

Figure 51

Faculty/Staff Role Assignments                                Planet Demo School
*Publication Date: 4/25/00*

| | | |
|---|---|---|
| CHARLES BONNEY<br>Incident Data Coordinator | Title: | Guidance Counselor |
| LORRAINE COYLE<br>Incident Manager | Title: | English Teacher |
| KIMBERLY ERRICKSON<br>Incident PIO | Title: | Science Teacher |
| JAMES HAVLICK<br>Safe Schools Coordinator | Title: | Assistant Principal |
| SHELLEY MEANS<br>Incident Clinical Coordinator | Title: | Psychologist |
| KATHRYN STOCK<br>Incident Medical Officer | Title: | Computer Science Teacher |
| DORIS WILKINSON<br>Incident Facilities Officer | Title: | Administrative Assistant |

Planet Demo School - Confidential

Figure 52

Roles by Name    Planet Demo School
*Publication Date: 4/25/00*

Clinical Staff
　Guidance or Student Assistance Professional responsible for on-going student counseling for academic and emotional issues.

Food Services Coordinator
　Person(s) responsible for ordering and/or preparing food for school occupants.

Incident Clinical Coordinator
　Assist school administration in evaluating and delivering prevention, incident and post incident counseling to students and staff. Coordinate the use of all internal and external counseling services in support of the safe schools program. Coordinates the activities of those staff assigned to the Clinical Staff role.

Incident Data Coordinator
　This person is responsible for the currency and access to all student census, medical, psychiatric and attendance records to support the school's critical incident response plan.

Incident Dispatcher
　Provides administrative support to the Incident Manager and assists Safe Schools Coordinator as required.

Incident District Liaison
　This role is responsible for maintaining the flow of information, status, issues and concerns associated with a crisis or incident response at this school to and from the School District.

Incident Facilities Officer
　The person and staff responsible for the building structure, internal systems and maintenance

Incident Manager
　The on-site authority for a given school, the Administrator is responsible for the crisis and incident response process and for coordinating information with the school district office where applicable.

Incident Medical Officer
　Directs the delivery of medical and/or nursing services within the school and with Emergency Services personnel called to the site. Coordinates the activities of the Medical Staff during Incident response.

Incident PIO
　The school's public information officer (PIO) serves as the school's spokesperson in situations where on-site media coverage is anticipated. Manages the "message" to the community via the media outlets.
　Coordinates message creation with the Incident Manager, the Incident District Liaison and district-level PIO as required.

Incident Security Officer
　Those individuals responsible for perimeter security and safety within the school.

Incident Transportation Officer
　Responsible for the normal and exceptional transportation needs of students. Manages normal routing, training of drivers in "safe schools" procedures (e.g., health risk identification & mitigation).

Planet Demo School - Confidential    1

Figure 53

Roles by Name                                                                    Planet Demo School
*Publication Date: 4/25/00*

Medical Staff
Persons qualified to provide medical and/or nursing services within the school. This role may also be filled by staff certified in First Aid techniques (at the discretion of school administration). Services provided by this role are managed by the Incident Medical Officer.

Safe Schools Coordinator
Person(s) directly responsible for implementing and maintaining the safe schools plan for crisis response. Coordinates the information flow from other active roles during an incident response and implements the instructions of the Incident Manager as needed. Ensures all issues and actions are properly recorded.

Figure 54

Roles Used in Incidents

Planet Demo School
*Publication Date: 4/27/00*

Incident Dispatcher
  Bomb Explosion and Fire at School
  Bomb Threat

Incident Manager
  Bomb Explosion and Fire at School
  Bomb Threat

Incident Medical Officer
  Bomb Explosion and Fire at School

Incident Security Officer
  Bomb Threat

Medical Staff
  Bomb Explosion and Fire at School

Safe Schools Coordinator
  Bomb Explosion and Fire at School
  Bomb Threat

Figure 55

Services by Description

Planet Demo School
Publication Date: 4/25/00

Bomb Unit - Local Fire Department
Agreement/Contract?: NO
Resource Organization: Bomb Squad

Federal Bureau of Investigation
Agreement/Contract?: NO
Resource Organization: Federal Bureau of Investigation (FBI)

Legal advice
Agreement/Contract?: YES
Resource Organization: School's Legal Counsel

Local Fire Department
Agreement/Contract?: NO
Resource Organization: Fire Department

Local Police Department
Agreement/Contract?: NO
Resource Organization: Local Police Department

Publish School Delay/Closure Info
Agreement/Contract?: YES
Resource Organization: KYW-AM

School advisor community
Agreement/Contract?: NO
Resource Organization: Home & School Association

School advisor community
Agreement/Contract?: NO
Resource Organization: District Advisory Council

State Police Department
Agreement/Contract?: NO
Resource Organization: State Police

External Facility Cleaning Firm
Agreement/Contract?: YES
Service Lead Time: 1
Resource Organization: Service Master

Insurance claim/adjustment
Agreement/Contract?: YES
Service Lead Time: 3
Resource Organization: Property/Casualty Insurer

Local District Attorney
Agreement/Contract?: NO
Resource Organization: District Attorney's Office

Local Mental Health Center
Agreement/Contract?: NO
Resource Organization: Local Mental Health Center

Publish School Delay/Closure Info
Agreement/Contract?: YES
Resource Organization: Suburban Cable

Publish School Delay/Closure Info
Agreement/Contract?: YES
Resource Organization: WPVI-ABC

School advisor community
Agreement/Contract?: NO
Resource Organization: Local Parent Teacher Organization

School advisor community
Agreement/Contract?: NO
Resource Organization: Building Advisory Council

Update school board
Agreement/Contract?: NO
Resource Organization: Local School Board Planet Demo School - Confidential

Figure 56

Services Used in Incidents

Planet Demo School
*Publication Date: 4/27/00*

External Facility Cleaning Firm     *Resource Organization:*   Service Master
    Bomb Explosion and Fire at School

Local Police Department     *Resource Organization:*   Local Police Department
    Bomb Explosion and Fire at School
    Bomb Threat

Figure 57

Accounting for Students by Curriculum Type     Planet Demo School

*Publication Date: 4/25/00*

| | Sex | Grade Level | Status | Accounted For ? |
|---|---|---|---|---|
| Curriculum: General | | | | |
| AMBROSE, KELLY LEIGH | Female | 12 | HOME SCHOOL | |
| FREIDRICH, COLLEEN | Female | 09 | ACTIVE | |
| SMITH ALAIN ROGERS | Female | 12 | ACTIVE | |
| VOGELEY BART | Male | 12 | ACTIVE | |

Planet Demo School - Confidential     1

Figure 58

Accounting for Students by Grade Level                         Planet Demo School Publication Date: 4/25/00

|  | Sex | Status | Accounted For ? |
|---|---|---|---|
| Grade Level: 09 | | | |
| BARBA, GREGORY JOHN | Male | ACTIVE | |
| BARON, WILLIAM | Male | ACTIVE | |
| BOUEN, LYNN JENNIFER | Female | ACTIVE | |
| FREIDRICH, COLLEEN | Female | ACTIVE | |
| GAGLIARDI, MARIO | Male | CO-OP | |
| LOMBARDY, FREDERICK J | Male | ACTIVE | |
| PALO, AMY | Female | ACTIVE | |
| REIGHARDT AMANDA B | Female | ACTIVE | |
| SARGENTO BRANDON BOYD | Male | ACTIVE | |
| TROUT TAMRA | Female | ACTIVE | |

Planet Demo School - Confidential

Figure 59

Accounting for Students by Location             Planet Demo School

*Publication Date: 4/25/00*

|  | Sex | Grade Level | Status | Accounted For ? |
|---|---|---|---|---|
| Bldg/Room: B-04 | | | | |
| BELLOWS, TAMARA LEIGH | Female | 10 | ACTIVE | |
| BLISS, HELEN | Female | 10 | ACTIVE | |
| MALIKOWSKI, TERESA | Female | 10 | ACTIVE | |
| MILLESS, ELLIOTT MATTHEW | Male | 10 | ACTIVE | |
| RICE SUSAN E. | Female | 10 | ACTIVE | |
| RUGER ANGEL J | Female | 10 | ACTIVE | |
| ZAWISKI KORBIN A. | Female | 10 | ACTIVE | |
| Bldg/Room: B-05 | | | | |
| AHUDA, MONA | Female | 11 | ACTIVE | |
| BAIOCCA, KAREN | Female | 11 | HOME SCHOOL | |
| BRAND, JESSE COLLIER | Male | 11 | ACTIVE | |
| PAPA MARK J. | Male | 11 | ACTIVE | |
| ROGERS JOHN PATRICK | Male | 11 | ACTIVE | |
| SEIBERT MITCHELL DAVID | Male | 11 | ACTIVE | |
| URBANA SANDRA KILLY | Female | 11 | ACTIVE | |
| ZEMMER CORREY ANN | Female | 11 | SUSPENDED | |
| Bldg/Room: B-07 | | | | |
| FREIDRICH, COLLEEN | Female | 09 | ACTIVE | |
| GAGLIARDI, MARIO | Male | 09 | CO-OP | |
| LOMBARDY, FREDERICK J | Male | 09 | ACTIVE | |
| PALO, AMY | Female | 09 | ACTIVE | |
| SARGENTO BRANDON BOYD | Male | 09 | ACTIVE | |
| Bldg/Room: B-12 | | | | |
| BARBA, GREGORY JOHN | Male | 09 | ACTIVE | |
| BARON, WILLIAM | Male | 09 | ACTIVE | |
| BOUEN, LYNN JENNIFER | Female | 09 | ACTIVE | |
| REIGHARDT AMANDA B | Female | 09 | ACTIVE | |
| TROUT TAMRA | Female | 09 | ACTIVE | |
| Bldg/Room: B-19 | | | | |
| INTERILLO, NICOLE AMIE | Female | 12 | ACTIVE | |
| JOYE, MORGAN GARRISON | Male | 12 | ACTIVE | |

Planet Demo School - Confidential       1

Figure 60

Parent/Guardian Contact Information    Planet Demo School

*Publication Date: 4/25/00*

Student Status: ACTIVE         Grade Level: 09

| | | |
|---|---|---|
| AHUDA, MONA<br>3013 FARMHOUSE LANE<br>APARTMENT 5A<br>BOOT, PA 26061 | Parent/Guardian:<br>Home Phone:<br><br>Work Phone:<br>Cell/Beeper:<br>Alt Phone 1:<br>Alt Phone 2: | AHUDA, KRISTAN<br>697-558-3390<br><br>203-888-6425<br>603-887-2345<br>697-845-6658<br>697-845-6659 |
| BARBA, GREGORY JOHN<br>14 BISHOPS DRIVE<br>ASTON, PA 26692 | Parent/Guardian:<br>Home Phone:<br>Work Phone:<br>Alt Phone 1: | BARBA, JOHN<br>697-358-5721<br>216-618-3618<br>697-255-7954 |
| BARON, WILLIAM<br>5 CLARK CIRCLE<br>BOOT, PA 26061 | Parent/Guardian:<br>Home Phone:<br>Work Phone:<br>Alt Phone 1: | BARON, LAWRENCE<br>697-358-3710<br>203-554-9493<br>697-658-6738 |
| BOUEN, LYNN JENNIFER<br>3810 ROTHERFIELD LANE<br>CHAD RIVER, PA 26313 | Parent/Guardian:<br>Home Phone:<br>Work Phone:<br>Cell/Beeper: | BOUEN, THOMAS<br>697-558-3820<br>697-223-7419<br>302-646-8217 |
| FREIDRICH, COLLEEN<br>3143 WILLIAM ROAD<br>BOOT, PA 26061 | Parent/Guardian:<br>Home Phone:<br>Work Phone: | FREIDRICH, PATRICIA<br>697-055-9170<br>697-343-6754 |
| LOMBARDY, FREDERICK J<br>5 BONNIE LANE<br>MEDINA, PA 26063 | Parent/Guardian:<br>Home Phone:<br>Work Phone:<br>Alt Phone 1: | LOMBARDY, ROBERT<br>697-035-8441<br>697-253-8615<br>203-776-2548 |
| PALO, AMY<br>71 CLAYTON PARK DRIVE<br>GLEN HILLS, PA 26382 | Parent/Guardian:<br>Home Phone:<br>Work Phone: | PALO, JAMES<br>0358 36770<br>697-335-9547 |
| REIGHARDT AMANDA B<br>39 PARK LANE<br>GLEN HILLS, PA 26382 | Parent/Guardian:<br>Home Phone:<br>Work Phone:<br>Alt Phone 1: | REIGHARDT, JOHAS<br>697-045-4810<br>203-448-6697<br>203-445-6719 |
| SARGENTO BRANDON BOYD<br>1754 BETHEL ROAD<br>BOOT, PA 26061 | Parent/Guardian:<br>Home Phone:<br>Work Phone:<br>Alt Phone 1: | SARGENTO, MONICA<br>697-049-4278<br>697-551-9439<br>203-771-3539 |

Planet Demo School - Confidential

Figure 61

Students by Bus & Route - AM            Planet Demo School

*Publication Date: 4/25/00*

| Bus/Route | Student Name | Bus Stop |
|---|---|---|
| 2H/ 010 | BAIOCCA, KAREN | 2 |
| | MCLAUGHLIN, MARY MARGARET | 3 |
| | LOMBARDY, FREDERICK J | 3 |
| 32H/ 015 | FREIDRICH, COLLEEN | 2 |
| | ROGERS JOHN PATRICK | 2 |
| | GAGLIARDI, MARIO | 3 |
| | SMITH ALAIN ROGERS | 4 |
| | BARBA, GREGORY JOHN | 4 |
| 37H/ 040 | ZEMMER CORREY ANN | 2 |
| | RUGER ANGEL J | 2 |
| | INTERILLO, NICOLE AMIE | 2 |
| | BELLOWS, TAMARA LEIGH | 3 |
| | BOUEN, LYNN JENNIFER | 4 |
| 39H/ 012 | BARON, WILLIAM | 1 |
| | BLISS, HELEN | 1 |
| | VOIGHT ROSS | 1 |
| | TROUT TAMRA | 2 |
| | SARGENTO BRANDON BOYD | 4 |
| | MILLESS, ELLIOTT MATTHEW | 4 |
| 39H/ 014 | AMBROSE, KELLY LEIGH | 1 |
| | SEIBERT MITCHELL DAVID | 2 |
| | PALO, AMY | 5 |
| | PAPA MARK J. | 6 |
| | BRAND, JESSE COLLIER | 6 |
| 48H/ 025 | URBANA SANDRA KILLY | 1 |
| | REIGHARDT AMANDA B | 3 |
| | ZAWISKI KORBIN A. | 3 |
| | MALIKOWSKI, TERESA | 4 |
| | VOGELEY BART | 5 |
| 50H/ 020 | RICE SUSAN E. | 2 |
| | AHUDA, MONA | 2 |
| | JOYE, MORGAN GARRISON | 5 |

Planet Demo School - Confidential

Figure 62

Students by Bus & Route - PM           Planet Demo School

*Publication Date: 4/25/00*

| Bus/Route: 14H/ 086 | Student Name | Bus Stop |
|---|---|---|
| | LOMBARDY, FREDERICK J | 1 |
| | BAIOCCA, KAREN | 2 |
| | MCLAUGHLIN, MARY MARGARET | 2 |
| Bus/Route: 18H/ 060 | Student Name | Bus Stop |
| | REIGHARDT AMANDA B | 1 |
| | URBANA SANDRA KILLY | 2 |
| | MALIKOWSKI, TERESA | 2 |
| | ZAWISKI KORBIN A. | 2 |
| | VOGELEY BART | 5 |
| Bus/Route: 21H/ 060 | Student Name | Bus Stop |
| | RICE SUSAN E. | 2 |
| | JOYE, MORGAN GARRISON | 2 |
| | AHUDA, MONA | 3 |
| Bus/Route: 34H/ 020 | Student Name | Bus Stop |
| | SMITH ALAIN ROGERS | 2 |
| | GAGLIARDI, MARIO | 2 |
| | BARBA, GREGORY JOHN | 3 |
| | ROGERS JOHN PATRICK | 3 |
| | FREIDRICH, COLLEEN | 4 |
| Bus/Route: 47H/ 110 | Student Name | Bus Stop |
| | AMBROSE, KELLY LEIGH | 1 |
| | VOIGHT ROSS | 1 |
| | BARON, WILLIAM | 2 |
| | PAPA MARK J. | 2 |
| | SEIBERT MITCHELL DAVID | 2 |
| | MILLESS, ELLIOTT MATTHEW | 2 |
| | PALO, AMY | 3 |
| | SARGENTO BRANDON BOYD | 3 |
| | BLISS, HELEN | 3 |
| | TROUT TAMRA | 4 |
| | BRAND, JESSE COLLIER | 5 |
| Bus/Route: 50H/ 060 | Student Name | Bus Stop |
| | ZEMMER CORREY ANN | 2 |
| | RUGER ANGEL J | 2 |
| | INTERILLO, NICOLE AMIE | 3 |
| | BELLOWS, TAMARA LEIGH | 4 |
| | BOUEN, LYNN JENNIFER | 4 |

Planet Demo School - Confidential

Figure 63

Students by Name             Planet Demo School

*Publication Date: 4/25/00*

| AHUDA, MONA (STU6091) | | | Female |
|---|---|---|---|
| 3013 FARMHOUSE LANE | | Bldg/Room: | B-05 |
| APARTMENT 5A | | Grade Level: | 09 |
| BOOT, PA 26061 | | Curriculum: | Regular |
| Parent/Guardian: | AHUDA, KRISTAN | Status: | ACTIVE |
| Home Phone: | 697-558-3390 | Transportation Type: | Drives |
| Work Phone: | 203-888-6425 | A.M. Bus #: | 50H |
| Cell/Beeper: | 603-887-2345 | P.M. Bus #: | 21H |
| Alt Phone 1: | 697-845-6658 | Bus Route - AM: | 020 |
| Alt Phone 2: | 697-845-6659 | Bus Route - PM: | 060 |
| Emergency Care Plan: | No | Bus Stop - AM: | 2 |
| Other: | Student Safety Officer | Bus Stop - PM: | 3 |

| AMBROSE, KELLY LEIGH (STU6004) | | | Female |
|---|---|---|---|
| 170 SUNSET VIEW DRIVE | | Bldg/Room: | HOME |
| | | Grade Level: | 12 |
| GLEN HILLS, PA 26382 | | Curriculum: | General |
| Parent/Guardian: | AMBROSE, MOIRA | Status: | HOME SCHOOL |
| Home Phone: | 697-046-7960 | Transportation Type: | N/A |
| Work Phone: | 697-555-5593 | A.M. Bus #: | 39H |
| | | P.M. Bus #: | 47H |
| Alt Phone 1: | 203-848-3256 | Bus Route - AM: | 014 |
| | | Bus Route - PM: | 110 |
| | | Bus Stop - AM: | 1 |
| | | Bus Stop - PM: | 1 |

| BAIOCCA, KAREN (STU2903) | | | Female |
|---|---|---|---|
| 353 SMITHBRIDGE ROAD | | Bldg/Room: | B-05 |
| | | Grade Level: | 11 |
| GLEN HILLS, PA 26382 | | Curriculum: | Regular |
| Parent/Guardian: | BAIOCCA, MATTHEW | Status: | HOME SCHOOL |
| Home Phone: | 697-055-8185 | Transportation Type: | Bussed |
| Work Phone: | 203-444-6493 | A.M. Bus #: | 2H |
| | | P.M. Bus #: | 14H |
| Alt Phone 1: | 697-567-1682 | Bus Route - AM: | 010 |
| | | Bus Route - PM: | 086 |
| | | Bus Stop - AM: | 2 |
| | | Bus Stop - PM: | 2 |

| BARBA, GREGORY JOHN (STU4692) | | | Male |
|---|---|---|---|
| 14 BISHOPS DRIVE | | Bldg/Room: | B-12 |
| | | Grade Level: | 09 |
| ASTON, PA 26692 | | Curriculum: | Regular |
| Parent/Guardian: | BARBA, JOHN | Status: | ACTIVE |
| Home Phone: | 697-358-5721 | Transportation Type: | Bussed |
| Work Phone: | 216-618-3818 | A.M. Bus #: | 32H |
| | | P.M. Bus #: | 34H |
| Alt Phone 1: | 697-255-7954 | Bus Route - AM: | 015 |
| | | Bus Route - PM: | 020 |
| | | Bus Stop - AM: | 4 |
| | | Bus Stop - PM: | 3 |

Figure 64

Students by Transportation Type

Planet Demo School
*Publication Date: 4/25/00*

Transportation Type: Bussed
Grade Level/Bldg/Room: 09/B-07

| | Bus Number | Bus Route | Bus Stop |
|---|---|---|---|
| FREIDRICH, COLLEEN | 32H- AM | 015- AM | 2- AM |
| | 34H- PM | 020- PM | 4- PM |
| GAGLIARDI, MARIO | 32H- AM | 015- AM | 3- AM |
| | 34H- PM | 020- PM | 2- PM |
| LOMBARDY, FREDERICK J | 2H- AM | 010- AM | 3- AM |
| | 14H- PM | 086- PM | 1- PM |
| PALO, AMY | 39H- AM | 014- AM | 5- AM |
| | 47H- PM | 110- PM | 3- PM |
| SARGENTO BRANDON BOYD | 39H- AM | 012- AM | 4- AM |
| | 47H- PM | 110- PM | 3- PM |

Grade Level/Bldg/Room: 09/B-12

| | Bus Number | Bus Route | Bus Stop |
|---|---|---|---|
| BARBA, GREGORY JOHN | 32H- AM | 015- AM | 4- AM |
| | 34H- PM | 020- PM | 3- PM |
| BARON, WILLIAM | 39H- AM | 012- AM | 1- AM |
| | 47H- PM | 110- PM | 2- PM |
| REIGHARDT AMANDA B | 48H- AM | 025- AM | 3- AM |
| | 18H- PM | 060- PM | 1- PM |
| TROUT TAMRA | 39H- AM | 012- AM | 2- AM |
| | 47H- PM | 110- PM | 4- PM |

Grade Level/Bldg/Room: 10/B-04

| | Bus Number | Bus Route | Bus Stop |
|---|---|---|---|
| BLISS, HELEN | 39H- AM | 012- AM | 1- AM |
| | 47H- PM | 110- PM | 3- PM |
| MALIKOWSKI, TERESA | 48H- AM | 025- AM | 4- AM |
| | 18H- PM | 060- PM | 2- PM |
| MILLESS, ELLIOTT MATTHEW | 39H- AM | 012- AM | 4- AM |
| | 47H- PM | 110- PM | 2- PM |
| RICE SUSAN E. | 50H- AM | 020- AM | 2- AM |
| | 21H- PM | 060- PM | 2- PM |
| RUGER ANGEL J | 37H- AM | 040- AM | 2- AM |
| | 50H- PM | 060- PM | 2- PM |
| ZAWISKI KORBIN A. | 48H- AM | 025- AM | 3- AM |
| | 18H- PM | 060- PM | 2- PM |

Planet Demo School - Confidential

Figure 65

Students with Emergency Care Plans  Planet Demo School

*Publication Date: 4/25/00*

Student Status: ACTIVE

| | | | | |
|---|---|---|---|---|
| BLISS, HELEN | | | Parent/Guardian: | BLISS, WILLIAM |
| Grade Level: | 10 | Female | Home Phone: | 697-558-1730 |
| | | | Work Phone: | 697-338-7549 |
| | | | Cell/Beeper: | 697-453-8003 |
| | | | Alt Phone 1: | 697-558-1885 |
| | | | Alt Phone 2: | 697-558-4458 |
| MALIKOWSKI, TERESA | | | Parent/Guardian: | MALIKOWSKI, HORACE |
| Grade Level: | 10 | Female | Home Phone: | 697-358-2230 |
| | | | Work Phone: | 697-556-4500 x3544 |
| PALO, AMY | | | Parent/Guardian: | PALO, JAMES |
| Grade Level: | 09 | Female | Home Phone: | 0358 36770 |
| | | | Work Phone: | 697-335-9547 |
| ROGERS JOHN PATRICK | | | Parent/Guardian: | ROGERS, MELVIN |
| Grade Level: | 11 | Male | Home Phone: | 697-558-3240 |
| | | | Work Phone: | 413-658-7000 x9898 |
| | | | Alt Phone 1: | 203-558-6174 |

Student Status: CO-OP

| | | | | |
|---|---|---|---|---|
| GAGLIARDI, MARIO | | | Parent/Guardian: | GAGLIARDI, ANTHONY |
| Grade Level: | 09 | Male | Home Phone: | 697-559-0720 |
| | | | Work Phone: | 302-814-9550 x.6568 |

Planet Demo School - Confidential

Figure 66

Supplies by Category　　　　　　　　　　　　　　　　　　　　　　Planet Demo School
*Publication Date: 4/25/00*

Communications Equip

First Aid Kit
Quantity on Hand:　10　　　　　Storage Location:　Health Center
Minimum Quantity:　5　　　　　Stock Agreement:　Yes

Radio
Quantity on Hand:　6　　　　　Storage Location:　Rear of Mainten
Minimum Quantity:　3　　　　　Stock Agreement:　Yes

Flood Preparation

Carpentry Tools
　　　　　　　　　　　　　　　Storage Location:　Maintenance
　　　　　　　　　　　　　　　Stock Agreement:　No

Plywood (window/door protection)
Quantity on Hand:　20　　　　 Storage Location:　Maintenance
Minimum Quantity:　20　　　　 Stock Agreement:　No

Sand Bags
Quantity on Hand:　100　　　　Storage Location:　Maintenance
Minimum Quantity:　50　　　　 Stock Agreement:　No

Shovel
Quantity on Hand:　10　　　　 Storage Location:　Maintenance
Minimum Quantity:　5　　　　　Stock Agreement:　No

Water Pump
Quantity on Hand:　10　　　　 Storage Location:　Maintenance
Minimum Quantity:　10　　　　 Stock Agreement:　No

Safety Equip

Bullhorn
Quantity on Hand:　3　　　　　Storage Location:　Principals Office
Minimum Quantity:　3　　　　　Stock Agreement:　No

Cordon Tape - DO NOT CROSS
　　　　　　　　　　　　　　　Storage Location:　Rear of Mainten
　　　　　　　　　　　　　　　Stock Agreement:　No

Duct Tape
　　　　　　　　　　　　　　　Storage Location:　Maintenance
　　　　　　　　　　　　　　　Stock Agreement:　No Planet Demo School - Confidential

Figure 67

Supplies by Description

Planet Demo School
*Publication Date: 4/25/00*

Bullhorn
Category: Safety Equip
Quantity on Hand: 3
Minimum Quantity: 3

Storage Location: Principals Office
Stock Agreement: No

Carpentry Tools
Category: Flood Preparation

Storage Location: Maintenance
Stock Agreement: No

Cordon Tape - DO NOT CROSS
Category: Safety Equip

Storage Location: Rear of Mainter
Stock Agreement: No

Duct Tape
Category: Safety Equip

Storage Location: Maintenance
Stock Agreement: No

First Aid Kit
Category: Communications Equip
Quantity on Hand: 10
Minimum Quantity: 5

Storage Location: Health Center
Stock Agreement: Yes

Plywood (window/door protection)
Category: Flood Preparation
Quantity on Hand: 20
Minimum Quantity: 20

Storage Location: Maintenance
Stock Agreement: No

Radio
Category: Communications Equip
Quantity on Hand: 6
Minimum Quantity: 3

Storage Location: Rear of Mainten
Stock Agreement: Yes

Sand Bags
Category: Flood Preparation
Quantity on Hand: 100
Minimum Quantity: 50

Storage Location: Maintenance
Stock Agreement: No

Shovel
Category: Flood Preparation
Quantity on Hand: 10
Minimum Quantity: 5

Storage Location: Maintenance
Stock Agreement: No

Water Pump
Category: Flood Preparation
Quantity on Hand: 10
Minimum Quantity: 10

Storage Location: Maintenance
Stock Agreement: No

Planet Demo School - Confidential

Figure 68

Supplies by Location

Planet Demo School
*Publication Date: 4/25/00*

Health Center

First Aid Kit
Category: Communications Equip  Stock Agreement: Yes
Quantity on Hand: 10
Minimum Quantity: 5

Maintenance

Carpentry Tools
Category: Flood Preparation  Stock Agreement: No

Duct Tape
Category: Safety Equip  Stock Agreement: No

Plywood (window/door protection)
Category: Flood Preparation  Stock Agreement: No
Quantity on Hand: 20
Minimum Quantity: 20

Sand Bags
Category: Flood Preparation  Stock Agreement: No
Quantity on Hand: 100
Minimum Quantity: 50

Shovel
Category: Flood Preparation  Stock Agreement: No
Quantity on Hand: 10
Minimum Quantity: 5

Water Pump
Category: Flood Preparation  Stock Agreement: No
Quantity on Hand: 10
Minimum Quantity: 10

Principals Office

Bullhorn
Category: Safety Equip  Stock Agreement: No
Quantity on Hand: 3
Minimum Quantity: 3

Rear of Mainten

Cordon Tape - DO NOT CROSS
Category: Safety Equip  Stock Agreement: No

Planet Demo School - Confidential

Figure 69

Supplies Used in Incidents             Planet Demo School
*Publication Date: 4/27/00*

Bullhorn          Resource Organization:    Safety Equipment Supplier
    Bomb Explosion and Fire at School

Radio          Resource Organization:    Equipment Rental Vendor
    Bomb Explosion and Fire at School

Figure 70

Vital Records by Department               Planet Demo School
                                          *Publication Date: 4/26/00*

Maintenance

Building Blueprints
| | | | |
|---|---|---|---|
| Media Type: | Paper | Form Number: | B-335-0001 |
| Location | School Administration | Last Sent Offsite: | Never |
| Original Source | Township | Alternate Source: | Township |

Building Floor Plan (with room designations)
| | | | |
|---|---|---|---|
| Media Type: | Paper | Form Number: | B-435-0025 |
| Location | School Administration | Last Sent Offsite: | September |
| Original Source | Main Office | Alternate Source: | Main Office |

School Engineering Plans
| | | | |
|---|---|---|---|
| Media Type: | Paper | Form Number: | BP-335-0025 |
| Location | School Administration | | |
| Original Source | Township | Alternate Source: | Township |

School Hazardous Materials List
| | | |
|---|---|---|
| Media Type: | Electronic | |
| Location | School Administration | |

School Telecommunications Plan
| | | | |
|---|---|---|---|
| Media Type: | Paper | Form Number: | BP-335-8790 |
| Location | School Administration | | |
| Original Source | Network Company | | |

Medical/Nursing

Counseling Service Contract
| | | | |
|---|---|---|---|
| Media Type: | Paper | Form Number: | MS-44-0899 |
| Location | School Administration | Last Sent Offsite: | 08-01-99 |
| Original Source | Legal | | |

Student Emergency Medical Information
| | | | |
|---|---|---|---|
| Media Type: | Electronic | | |
| Location | | Last Sent Offsite: | Weekly |
| Original Source | Health Center | | |

Students with special health needs (descriptions)
| | | | |
|---|---|---|---|
| Media Type: | Electronic | | |
| Location | | Last Sent Offsite: | Weekly |
| Original Source | Health Center | | |

School Admin

Student Schedules
| | | | |
|---|---|---|---|
| Media Type: | Electronic | | |
| Location | | Last Sent Offsite: | Every Semester |
| Original Source | Grade Office | | |

Planet Demo School - Confidential

Figure 71

Vital Records by Name      Planet Demo School
*Publication Date: 4/26/00*

Building Blueprints
| | | | | | |
|---|---|---|---|---|---|
| Department: | Maintenance | Media Type: | Paper | Form Number: | B-335-0001 |
| Location | School Administration | Last Sent Offsite: | Never | | |
| Original Source | Township | Alternate Source: | Township | | |

Building Floor Plan (with room designations)
| | | | | | |
|---|---|---|---|---|---|
| Department: | Maintenance | Media Type: | Paper | Form Number: | B-435-0025 |
| Location | School Administration | Last Sent Offsite: | September | | |
| Original Source | Main Office | Alternate Source: | Main Office | | |

Bus Route Descriptions
| | | | | | |
|---|---|---|---|---|---|
| Department: | Transportation | Media Type: | Paper | Form Number: | BUSR-0899 |
| Location | School Administration | Last Sent Offsite: | August | | |
| Original Source | Bus Service | Alternate Source: | Bus Company | | |

Capital Assets Inventory
| | | | |
|---|---|---|---|
| Department: | School Admin. | Media Type: | Electronic |
| Location | School Administration | Last Sent Offsite: | Weekly |

Counseling Service Contract
| | | | | | |
|---|---|---|---|---|---|
| Department: | Medical/Nursing | Media Type: | Paper | Form Number: | MS-44-0899 |
| Location | School Administration | Last Sent Offsite: | 08-01-99 | | |
| Original Source | Legal | | | | |

Faculty/Staff Portraits
| | | | |
|---|---|---|---|
| Department: | School Admin. | Media Type: | Paper |
| Location | School Administration | | |
| Original Source | Portrait Studio | | |

School Engineering Plans
| | | | | | |
|---|---|---|---|---|---|
| Department: | Maintenance | Media Type: | Paper | Form Number: | BP-335-0025 |
| Location | School Administration | | | | |
| Original Source | Township | Alternate Source: | Township | | |

School Hazardous Materials List
| | | | |
|---|---|---|---|
| Department: | Maintenance | Media Type: | Electronic |
| Location | School Administration | | |

School Telecommunications Plan
| | | | | | |
|---|---|---|---|---|---|
| Department: | Maintenance | Media Type: | Paper | Form Number: | BP-335-8790 |
| Location | School Administration | | | | |
| Original Source | Network Company | | | | |

Figure 72

Vital Records Used in Incidents

*Planet Demo School*
*Publication Date: 4/27/00*

Building Blueprints  Department: Maintenance
  Bomb Explosion and Fire at School

Building Floor Plan (with room designations)  Department: Maintenance
  Bomb Threat
  Bomb Explosion and Fire at School

Figure 73

Planet Demo School

Bomb Explosion and Fire at School

*Publication Date: 4/27/00*

Publisher    Jane Doe
Plan Administrator    John Smith
500 N Gulph Road
Suite 500
King Of Prussia, PA 19406
Main Phone    610-768-4120

Figure 75a

Table of Contents

Incident Action Plan ............................................................. 1

Incident Resource Requirements ....................................... 2

Sample Document .............................................................. 4

Figure 75b

Incident Action Plan

Planet Demo School
*Publication Date: 4/27/00*

Bomb Explosion and Fire at School (Threats/Acts of Violence)

*An explosive device has been detonated causing an explosion and/or fire in or on school premises.*

Faculty/Staff Assigned to Roles

| Name | Role | Home | Pager/PIN | Cellular |
|---|---|---|---|---|
| LORRAINE COYLE | Incident Manager | 697-565-8894 | | 697-484-6524 |
| JAMES HAVLICK | Safe Schools Coordinator | 697-642-3656 | | |
| KATHRYN STOCK | Incident Medical Officer | 697-326-4469 | | |

Incident Script

| Order | Task Description | Assigned Roles with Faculty/Staff |
|---|---|---|
| 1 | Immediately call 911... | Incident Dispatcher<br>Safe Schools Coordinator<br>JAMES HAVLICK |
| 2 | Alert the Incident Manager ... | Safe Schools Coordinator<br>JAMES HAVLICK |
| 3 | Immediately initiate ... | Incident Manager<br>LORRAINE COYLE<br>Safe Schools Coordinator<br>JAMES HAVLICK |
| 4 | Prepare ... | Incident Medical Officer<br>KATHRYN STOCK<br>Medical Staff |
| 5 | Notify:<br>.<br>.<br>. | Incident Manager<br>LORRAINE COYLE |

Strohl Systems copywritten material adapted by Planet Demo School with permission Planet Demo School - Confidential

Figure 75c

Incident Resource Requirements

Planet Demo School
*Publication Date: 4/27/00*

| Bomb Explosion and Fire at School (Threats/Acts of Violence) |
|---|

Locations

Command Center
School Administration (Room 10)
432 Oak Lane
Building B
Boot, PA              26061-2660
Telephone:    206-388-4700
Directions:     Turn onto the main access road for Middle/High school complex. Building is on the left.
Contact Person:  Joyce Ballinger
Home Phone:   206-432-3542
Work Phone:    206-388-4751

Staging/Assembly
Football Field (High School Varsity Field)
435 Oak Lane
Boot, PA            26061-2660
Directions:     Located on the South end of the High School campus.

Services

External Facility Cleaning Firm
Aggreement/Contract?:  YES
Service Lead Time:     1
Vendor Name:         Service Master

Local Police Department
Aggreement/Contract?:  NO
Vendor Name:         Local Police Department

Supplies

Bullhorn
Category:            Safety Equip
Quantity on Hand:  3
Minimum Quantity:  3

Storage Location:  Principals Office
Stock Agreement:   No

Radio
Category:            Communications Equip
Quantity on Hand:  6
Minimum Quantity:  3

Storage Location:  Rear of Mainten
Stock Agreement:   Yes

Vital Records

Building Blueprints
Department:    Maintenance          Media Type:       Paper           Form Number:  B-335-0001
Location:        School Administration   Last Sent Offsite:  Never
Origin Source:  Township            Alternate Source:  Township

Figure 75d

Incident Resource Requirements

Planet Demo School
*Publication Date: 4/27/00*

| Bomb Explosion and Fire at School (Threats/Acts of Violence) |
|---|

Building Floor Plan (with room designations)

| Department: | Maintenance | Media Type: | Paper | Form Number: | B-435-0025 |
|---|---|---|---|---|---|
| Location: | School Administration | Last Sent Offsite: | September | | |
| Origin Source: | Main Office | Alternate Source: | Main Office | | |

Figure 75e

SAMPLE INCIDENT SPECIFIC DOCUMENT

Any incident specific documents would appear here. These could include any documents that would be needed before, during or after an incident has occurred.

Planet Demo School - Confidential 4

Figure 75f

METHOD AND APPARATUS FOR CREATION AND MAINTENANCE OF INCIDENT CRISIS RESPONSE PLANS

This application claims benefit of U.S. Provisional Application Serial No. 60/245,749 filed Nov. 3, 2000.

FIELD OF THE INVENTION

This invention is generally related to the field of automated preparation and maintenance of incident crisis response plans of the type kept by educational, state and local governmental institutions, or other institutions.

BACKGROUND OF THE INVENTION

In recent years, a number of high profile acts of violence and other crises have occurred in public school and other institutional settings, gaining the attention of media and large segments of the public. For this and other reasons, a large and growing number of municipalities have required that public school administrators create detailed crisis response plans and make them available in each school and district office for use during a crisis. Crisis response plans are written procedures with explicit intent to protect and sustain life, reduce emotional trauma, assist in emotional recovery from trauma, and minimize personal injury and/or damage to the school facilities in the event of a crisis incident. Given the uncertainties often facing officials responsible for the safety of large groups of people, the preparation of such crisis plans represents a sensible course of action, even in those school districts where such crisis response plans are not mandated, or in other public and private institutions.

Unfortunately, school administrators and other public officials have many duties, not the least being, creating and working with considerable amounts of paperwork—paperwork that includes creating, maintaining and publishing crisis response plans. Crisis response plans usually require the participation of a number of individuals, and require that data be gathered relating to procedures to be followed by those individuals, lists of needed supplies, contact information for outside resource organizations, lists of vital records, details of locations for evacuation purposes, and any additional documents. Thus, the preparation of a comprehensive crisis response plan often involves the use of significant time and expense which would otherwise be devoted to other projects.

In an effort to address this problem, school administrators have used generalized business software, such as word processors, spread sheets and database programs to aid in developing crisis response plans. Clearly, the use of such well known tools may enhance productivity and increase the efficiency of any project as compared with manual entry, organization and distribution of crisis data.

Unfortunately however, none of these computerized tools are specifically customized to the creation, maintenance and distribution of crisis response plans. Thus for example, none of these tools actually guide users through the plan creation process. Furthermore, while these tools each aid in the completion of particular aspects of the crisis planning process (e.g., word processors for the creation of documents and data, database packages for the storage and organization of data), they are not integrated. Accordingly, users and Information Technology professionals may expend time and effort integrating and making compatible data created in differing computing environments. Moreover, in many schools and other institutions using crisis response plans, the entire crisis response plan is not located in a central location with many additional resource documents generally located in other places. When revisions to the crisis response plans are necessary, it often requires a major effort to make the changes, all of which are done manually.

Thus, what is needed is an integrated user-friendly automated system and process customized to aid in the creation, maintenance and distribution of crisis response plans, not only for schools, but for nay institution for which response plans are appropriate.

SUMMARY OF THE INVENTION

The present invention satisfies this need. Specifically, in accordance with one embodiment of the present invention, one or more client stations is connected in a network to a server. The client stations include user interface software elements adapted to guide a user through the process of creating, maintaining and distributing relevant crisis response information for a specified crisis incident (e.g., bomb explosion). Apart from manual data entry, the system allows importation of existing data files to fill in required entry fields using mapping methodology. Upon completion, user input data is forwarded to a server. Furthermore, upon being presented with one screen interface, the user is given a choice of expert pre-specified crisis plan templates to be used to produce and print a finished response plan for the specified incident. The pre-specified template is collected from a master data store and integrated into comprehensive, coherent crisis response data stored at a user data store.

Completed, integrated crisis response data at the user data store is adapted to generate useful reports the crisis incident selected by the user. Report(s) generated by the system for the selected crisis incident include a complete crisis response plan, with predetermined response scripts, texts, tasks, materials, methodologies, objectives, and/or evaluation criteria. In other embodiments, the system features a variety of complimentary reports and organized data output, including generic, non-incident specific crisis response plans; Faculty/Staff rosters; student rosters; supply and service reports; user forms and other documents. These are available to the user for further crisis response management, administrative reporting needs and overall time saving for the user.

Once completed, the reports may be printed. In alternative embodiments, the reports are published (i.e., distributed) by giving appropriate subsets of users at client stations access to data for reports at a user data store associated with the server. Where access to report data at the user data store is granted to subsets of users, access is restricted to data paid for or intended for the users. Server software elements differentiating data by user account and password protection techniques are called for this purpose.

Thus, one advantage of the present invention is that it further automates the crisis plan creation process, thus saving school and other officials' time and effort.

Another advantage of the present invention is that it provides schools with expert developed best practice incident script templates which are coalesced with school or institution specific information provided by users, thus ensuring the completed plan comports with state of the art plan effectiveness criteria.

Another advantage of the present invention is that allows for the use of import files in connection with the data entry process, thus saving data entry time.

Another advantage of the present invention is that it allows electronic publication of output reports, thus reducing reliance on paper and improving the efficiency of report distribution.

Further advantages of the present invention are made apparent in the more detailed description below.

BRIEF DESCRIPTION OF THE DRAWINGS

FIG. 2b is a screen interface which may be used to convey the menu options depicted in FIG. 2a.

FIG. 3 is a block diagram depicting a high level overview of exemplary processes which may be performed upon user selection of corresponding sub-options of the "Build My Plan" menu option depicted in FIG. 2a.

FIGS. 5a–5g show pages of an exemplary faculty/staff workbook generated in accordance with the process depicted in FIG. 4b.

FIGS. 7a–7j show pages of an exemplary roles workbook generated in accordance with the process depicted in FIG. 6a.

FIGS. 9a–9w show pages of an exemplary incident workbook generated in accordance with the process depicted in FIG. 8b.

Figure 11G:
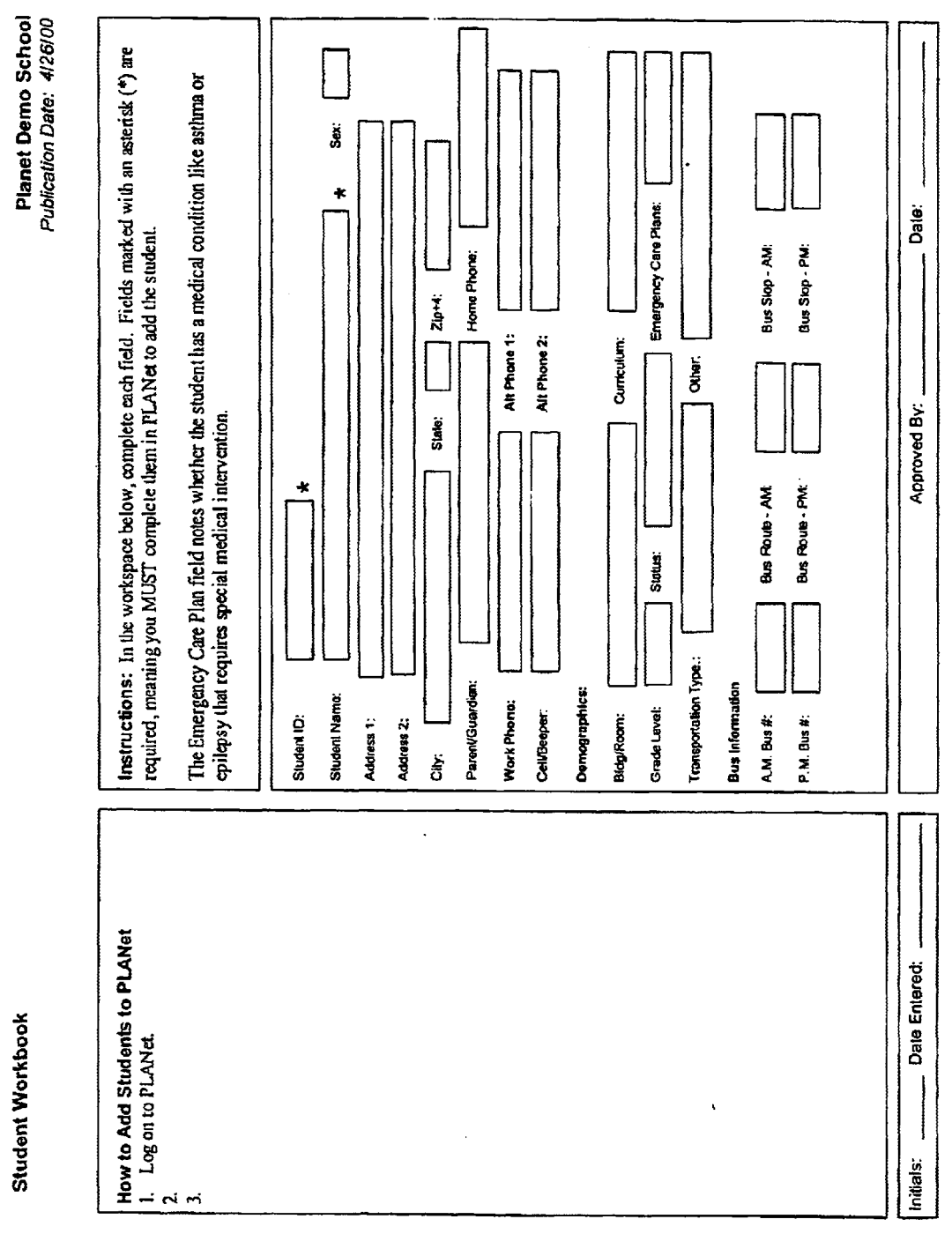

FIGS. 11a–11g show pages of an exemplary student workbook which may be used to perform the step of including student information in an incident response plan shown in FIG. 3.

FIGS. 12a–12i show pages of an exemplary faculty/staff chain workbook which may be used to perform the step of designing a faculty/staff call chain shown in FIG. 3.

FIGS. 13a–13h show pages of an exemplary resource organizations workbook which may be used to perform the step of updating community resources shown in FIG. 3.

FIG. 15a is a block diagram depicting a high level overview of an exemplary process which may be performed upon user selection of the "Manage My Incidents" sub-option under the "Update My Plan" option shown in FIG. 2a.

FIG. 15b is a block diagram depicting a high level overview of an exemplary process which may be performed upon user selection of the "Manage My Resources" sub-option under the "Update My Plan" option shown in FIG. 2a.

FIGS. 16–73 show pages of an exemplary School Incident Response Plan which, in accordance with an embodiment of the present invention, is generated upon user selection of the "Print My Plan" sub-option under the "Print My Plan" option shown in FIG. 2a.

FIG. 74 is a block diagram depicting a high level overview of an exemplary process which may be performed upon user selection of the "Print an Incident" sub-option under the "Print My Plan" option shown in FIG. 2a.

FIGS. 75a–75f show pages of an exemplary incident report which, in accordance with an embodiment of the present invention, is generated upon user selection of the "Print an Incident" sub-option under the "Print My Plan" option shown in FIG. 2a.

DETAILED DESCRIPTION OF PREFERRED EMBODIMENTS a. Exemplary Network and Computing Environment

Figure 1:
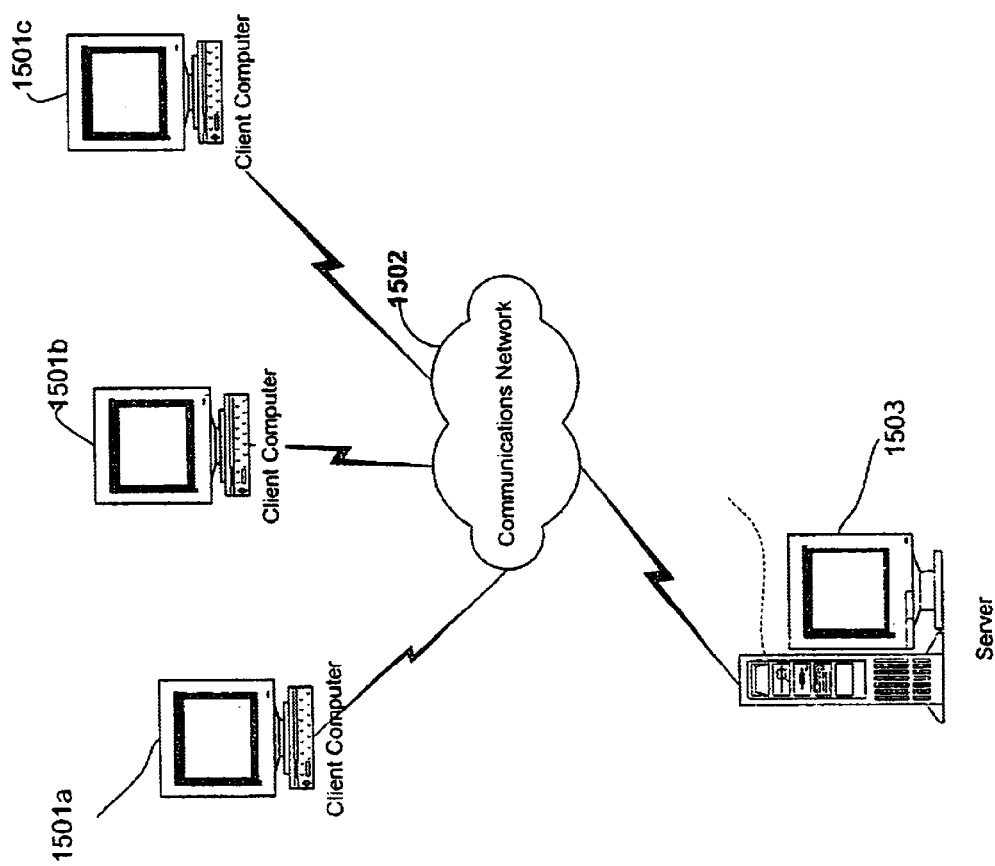
FIG. 1 shows a high level overview of a network environment in which aspects of the present invention may be implemented.

FIG. 1 shows a high level overview of a network environment in which aspects of the present invention may be implemented. One or more client stations 1501a, b, c, can be coupled via a communications network 1502 to a server(s) 1503. In accordance with conventional client/server network architecture, the client stations 1501a, b, c and server 1503 communicate using a common network protocol. In particular, the client stations 1501a, b, c send requests for data to the server 1503, which responds to the requests by returning the data specified to the client station 1501 issuing the request. Client stations 1501a, b, c can also transfer files to server. The communications network 1502 may be an intranet or extranet utilizing Internet standards and protocols, such as TCP/IP and Hyper Text Transfer Protocol (HTTP), File Transfer Protocol (FTP) and Simple Mail Transfer Protocol (SMTP), as well as other LANs and WANs. In one embodiment of the present invention, the server 1503, which can be, for example, any network class system, is a web server having a web site and software for communicating on the "World Wide Web," and information service on the Internet providing documents and links between documents. In this embodiment, a browser software element on the client station 1501a, b, c can issue data requests to web sites on web servers 1503 using HTTP protocol upon user selection of hyperlinks at the client stations 1501a, b, c.

Figure 1A:
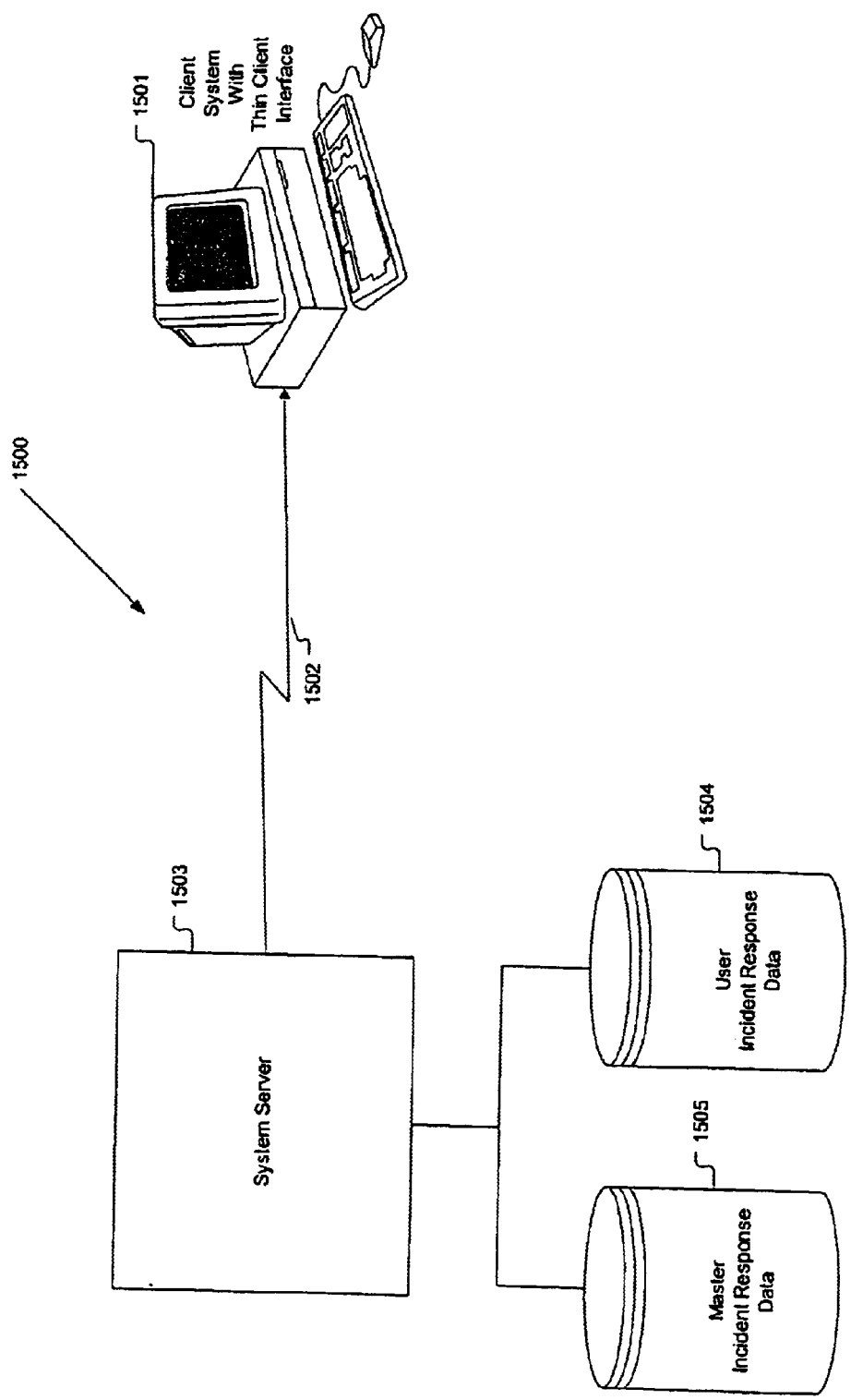
FIG. 1a is a block diagram depicting the server component shown in FIG. 1 in greater detail.

In accordance with a preferred embodiment of the present invention, FIG. 1a depicts in greater detail the components shown in FIG. 1. The server of FIG. 1a is coupled to a master data storage element 1505 and a user data storage element 1504, which are equipped with storage devices, such as disk drives. In the preferred embodiment, the client system 1501 runs relatively "thin" client networking software such as Citrix ICA Client, which causes connection to the server system 1503 in a seamless, Microsoft Window emulation display mode. A user at a client system can initiate requests for crisis related modeling data to the server system 1503 using the "thin" client. The server system 1503 is a conventional data processing system that provides access to the data at user data store 1504 and master data store 1505. The server system 1503 includes thin client software such as Citrix Metaframe for Windows (not shown) that includes database software and server software for responding to the client system 1501 with formatted screen data that emulates the Microsoft Windows environment at the client system. Such on screen functions include, for example, the capability to navigate from a process view to a data view.

In the preferred implementation described, the master data store 1505 includes database(s) of template organizational and modeling data that is used to import expert prepared template response data into a user application database on the user data store 1504. The modeling data includes definitions of processes, sub-processes, events, data elements, and procedures, as well as criteria, evidence, responsibility, and verification data. Upon completion of data entry, the user data store 1504 includes the completed user application database(s) which includes the entire user organizational and modeling data that is used to generate the customized incident response report. In addition to incident response data used to build an incident response plan, the user data store 1504 of the present described embodiment also includes workbook related information for printing workbooks which facilitate the gathering of information off-line for later entry into the application database of user store 1504. In addition, the user data store 1504 of the presently described embodiment may also include lists and rosters of raw data (i e., students, school faculty) that may be mapped in accordance with the structure of the application database and imported into that database, thus facilitating ease of data entry. Such roster data may also be used to generate complimentary reports. The application relational database on user data store 1504 is described more fully below in the "Exemplary Database Environment" section.

Figure 1B:
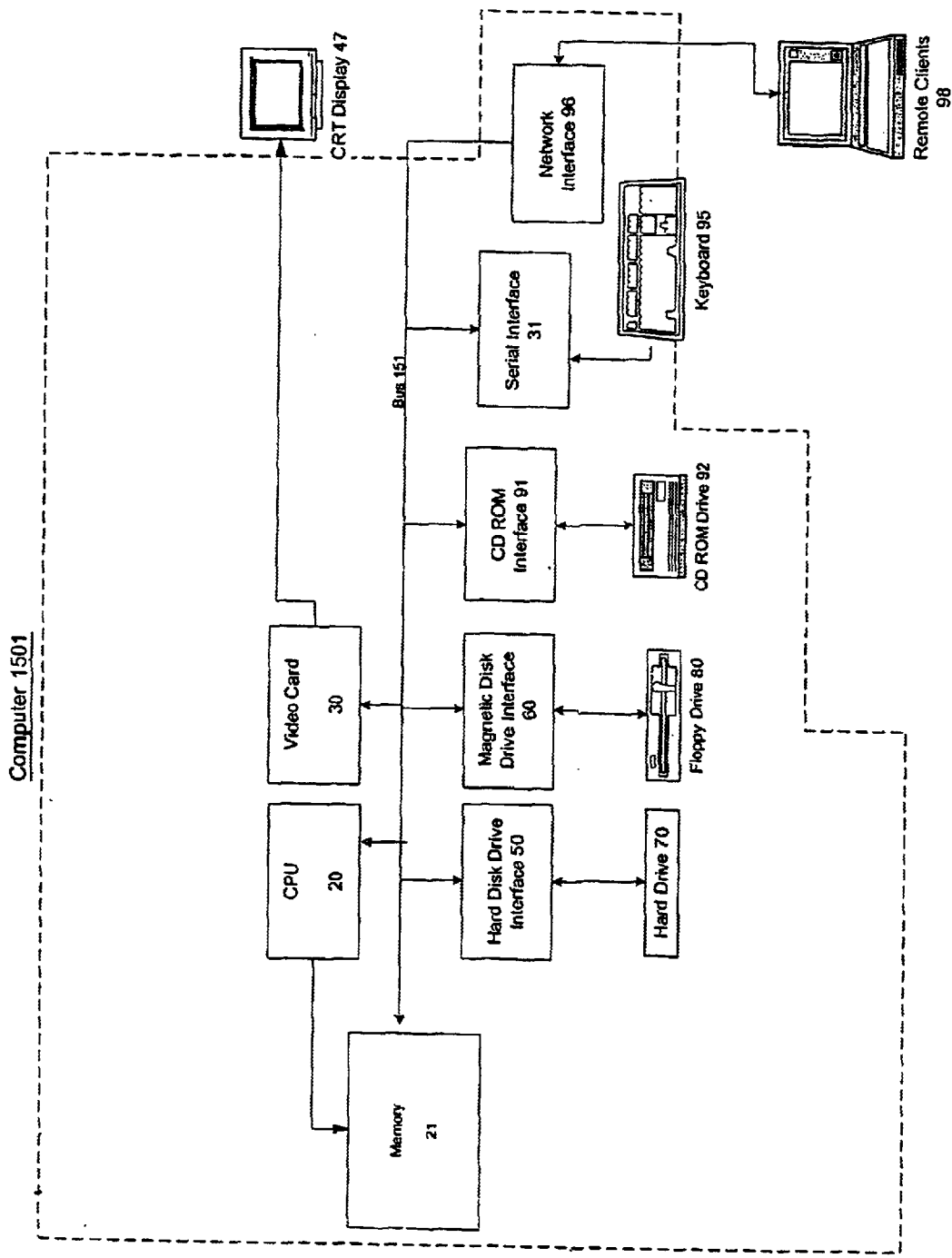
FIG. 1b is a block diagram depicting the client station components shown in FIG. 1 in greater detail.

In the presently described implementation, the databases are implemented using an ODBC-compliant database system, such as Microsoft Access. Other known database systems could also be used. FIG. 1b is a block diagram depicting in greater detail the client station 1501 in accordance with a preferred implementation of the present invention. In particular, the client station(s) 1501 includes conventional computer hardware components including a Central Processing Unit ("CPU") 20, a system memory 21, and a system bus 51 that couples the system memory 21 to CPU 20 and other computer system 20 components. The system memory 21 typically includes read only memory (ROM), random access memory (RAM) or other conventional known memory types. Instructions comprising application program modules, which include an operating system, a browser element or Citrix ICA client in the implementations noted above, are typically stored in and retrieved from memory 21 by CPU 20, which executes said instructions. A user may enter commands and other input into the computer 1501 via input devices such as a keyboard 95, mouse, scanner or other input device. A display device 47 is also coupled to the system bus 51 via a video graphics adaptor card 30. The display device 47, which may be a CRT monitor, LCD terminal or other display, includes a screen for the display of information which is visible to the user.

b. Exemplary Database Environment

Having described exemplary network and computing environments in which aspects of the present invention may be implemented, an exemplary database environment in which other aspects of the present invention may be implemented is now described. In particular, the application database stored on the user store 1504 shown in FIG. 1a is now described in greater detail. As noted above, the application database on user store 1504 is preferably implemented using an ODBC-compliant database system, such as Microsoft Access.

Figure 14A:
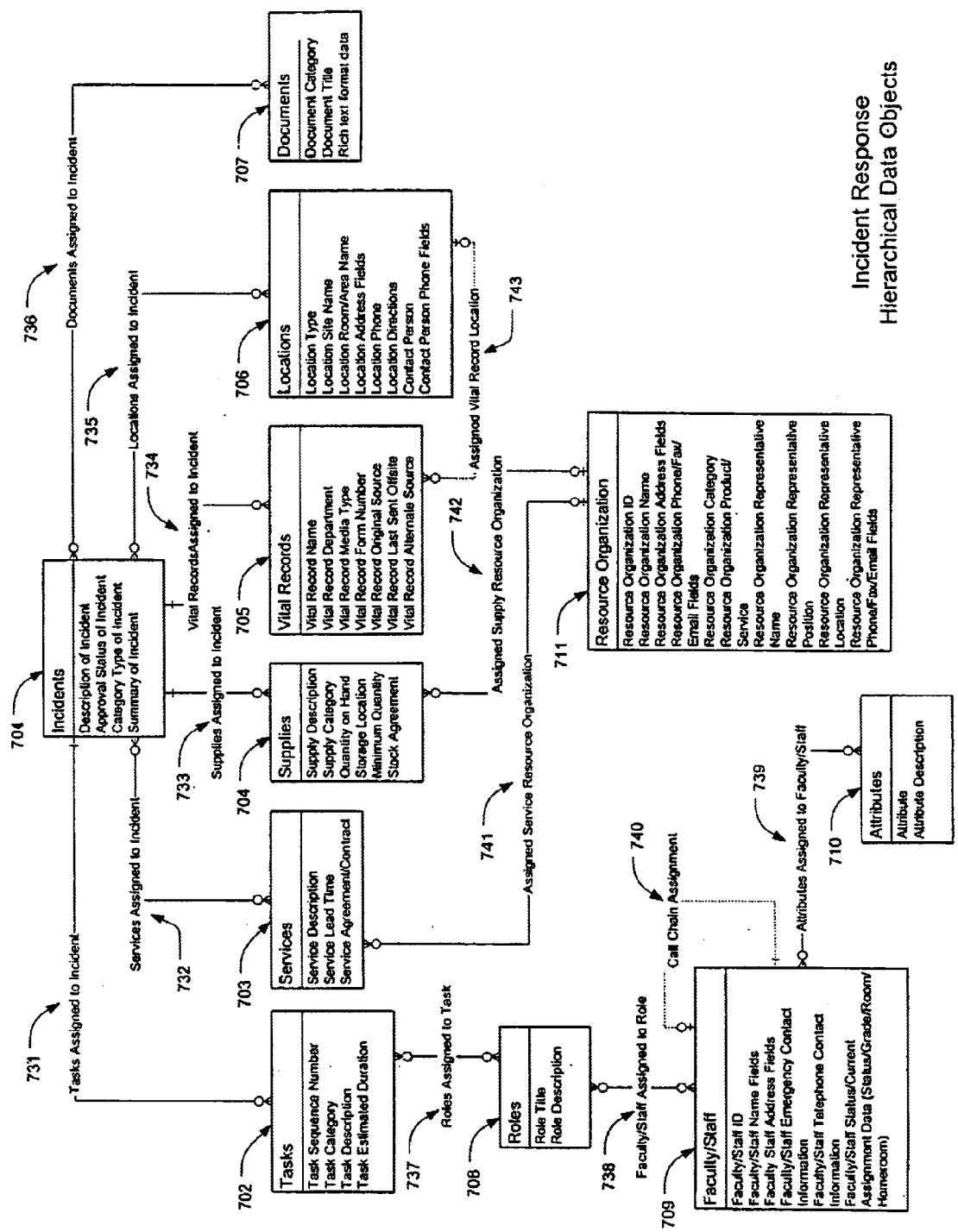
FIG. 14a is a block diagram that illustrates, in accordance with an embodiment of the present invention, data objects and hierarchical relationships among such objects used in a relational database to organize complete sets of data records having incident response data.

Turning now to FIG. 14a, it illustrates an exemplary structure and organization of the relational application database stored on the user data store 1504 shown in FIG. 1a. More specifically, FIG. 14a shows a block diagram that illustrates data objects and hierarchical relationships among such objects used in the relational application database to organize comprehensive sets of data records having incident response data. With respect to the description of this figure below, the term "data object" should be understood to mean one or more fields adapted to hold and/or organize a particular type of data content. Thus, the faculty staff data object 709 in FIG. 14a represents fields adapted to hold faculty staff data. Similarly, the incidents data object 701 in that figure depicts fields adapted to hold incidents data. Accordingly, the organization of the application database on user data store 1504 in the presently described embodiment is defined by the data objects depicted and the depicted restrictions on the relational associations amongst those objects (e.g., the association 739 between faculty/staff data object 709 and faculty/staff attributes object 710 is a many to many relationship).

At the top of the organizational hierarchy depicted in FIG. 14a is the Incidents data object 701. As depicted in FIG. 14a, the Incident data object 701 is defined by the following: (a) its one to many relational link 731 to the assigned tasks data object 702; (b) its many to many relational link 732 to the assigned services data object 703; (c) its many to many relational link 733 to the assigned supplies data object 704; (d) its many to many relational link 734 to the assigned vital records data object 705; (e) its many to many relational link 735 to the assigned locations data object 706; and (f) its many to many relational link 736 to the assigned documents data object 707.

Turning now to other data objects depicted, each task data object 702 is defined by its many to many relational link 737 to role data objects 708. Each role data object 708 is defined by its many to many relational link 738 to faculty/staff data objects 709. Each faculty/staff data object 709 is defined by its many to many relational link 739 to attributes data objects 710. Additionally, the faculty staff object 709 of the presently described embodiment can also be defined by a one to one recursive relational link 740 to another faculty/staff data object 709 to form a call chain sequence.

Turning now the remaining data objects depicted, each service data object 703 is defined by its many to one relational link 741 to resource organization data objects 711. Each supply data object 704 is defined by its many to one relational link 742 to resource organization data objects 711. Each vital record data object 705 is defined by its many to one relational link 743 to location data objects 706.

Having described an exemplary network, computing and database environments in which embodiments of the present invention may be implemented, embodiments of the present invention are now described with reference to their system features and processes underlying such features.

c. System Operation and Features—Overview

In a preferred embodiment of the present invention, a client station 1501 receives input data from a user relating to a particular crisis incident. The client station 1501 includes user interface software elements adapted to guide a user through the process of creating, maintaining and distributing relevant crisis response information. Preferably, in a manner known in the art, the interface includes a displayed menu of selectable, hierarchically organized menu options which guide the user through the relevant processes. Upon selection, each menu option results in a download from the server 1503 of a corresponding user-interface page for a sub-option, which guide the user through relevant sub-process, and so on. Upon being presented with one such interface, the user is given a choice of incident crisis plan templates with which to produce and print a finished response plan for a specified incident. Various features enhance the user friendliness of data entry into the system 1500. For example, using procedures written into software using standard importing functions, the user can import, faculty/staff and student data, from year to year. Simple editing of data imported into the new year thus ensures a user never has to repeat data entry from inception.

The user input data is forwarded to a server 1503, and integrated with a specified template at the master data store 1505 into comprehensive, coherent and crisis response data stored at the user data store 1504. The system 1500 also preferably features the ability to create and store a "library" of incident responses, thus allowing coverage of more than one type of crisis incident.

The completed, integrated crisis response data at user data store 1504 data is adapted to generate useful reports relating to the crisis incident selected by the user. Report(s) generated by the system for the selected crisis incident may include a complete crisis response plan, with predetermined response scripts, texts, tasks, materials, methodologies, objectives, and/or evaluation criteria. In addition, the system 1500 preferably features a variety of complimentary reports and organized data output, including generic, non-incident specific crisis response plans; Faculty/Staff rosters; student rosters; supply and service reports; user forms and other documents. These are available to the user for further crisis response management, administrative reporting needs and overall time saving for the user.

Preferably, the reports, including complete crisis response plans, may be printed or published (i.e., distributed) by giving appropriate subsets of users at client stations 1501a, b, c access to data at data store 1504 underlying such reports, or by forwarding such data using well known transfer protocols, such as the File Transfer Protocol where the network 1502 features Internet protocols. Where access to report data at the user data store 1504 is granted to subsets of users, access for each user is preferably restricted to data paid for or intended for the user by server 1503 software elements differentiating data by user account and by well known password protection techniques.

d. System Operation and Features—Detail

Figure 2A:
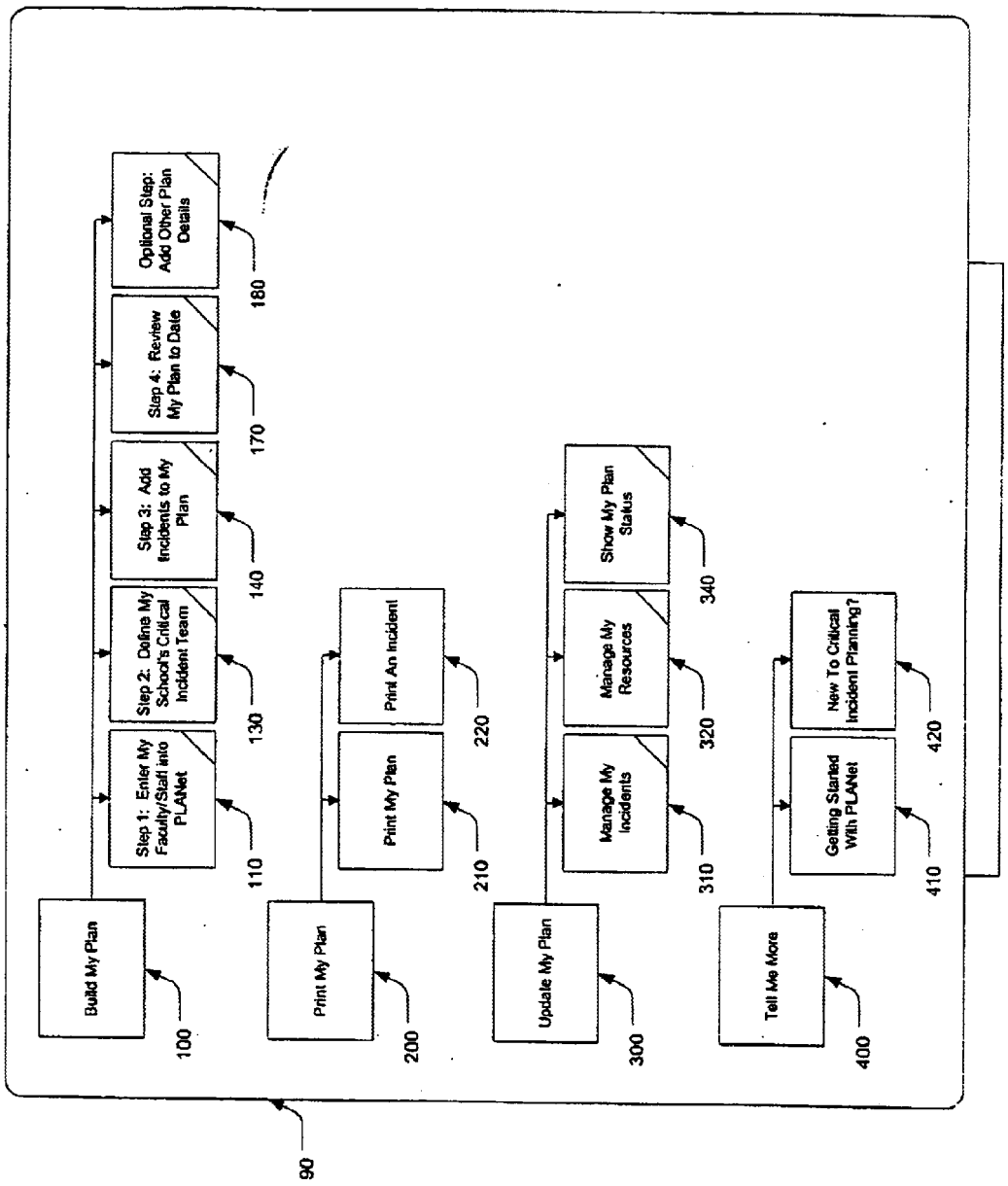
FIG. 2a is a block diagram depicting menu options and corresponding sub-options presented to a user operating an incident response system implemented in accordance with an embodiment of the present invention.

Having provided an overview of a system operating in accordance with an embodiment of the present invention, aspects of various embodiments of the present invention are now discussed in greater detail. In a preferred embodiment of the method of the present invention, a user uses an input device, such as a keyboard 95, to select incident response system software for execution by the CPU 20. Assuming the system supports multiple, unrelated users, the program presents verification and log on screens allowing a user to specify an account number using an input device, such as a keyboard 95. The incident response software causes the account number to be forwarded to the server 1503, which verifies whether the user has access to the system using verification software elements. If the user account is properly authorized, the server forwards a data page (e.g., HTML data, text data) representing a notice that a connection is established with the server 1503. The client station 1501 browser or other software element includes any graphics or text conversion software ensuring that data corresponding to the downloaded data page is ultimately viewable at the crt 47 terminal. In response, an incident response software element at the client station 1501 provides an initial interface screen with menu options, the corresponding data for which may be stored at the client station 1501 storage device 70. Turning now to FIG. 2a, it is a block diagram corresponding to such an interface screen.

Figure 2B:
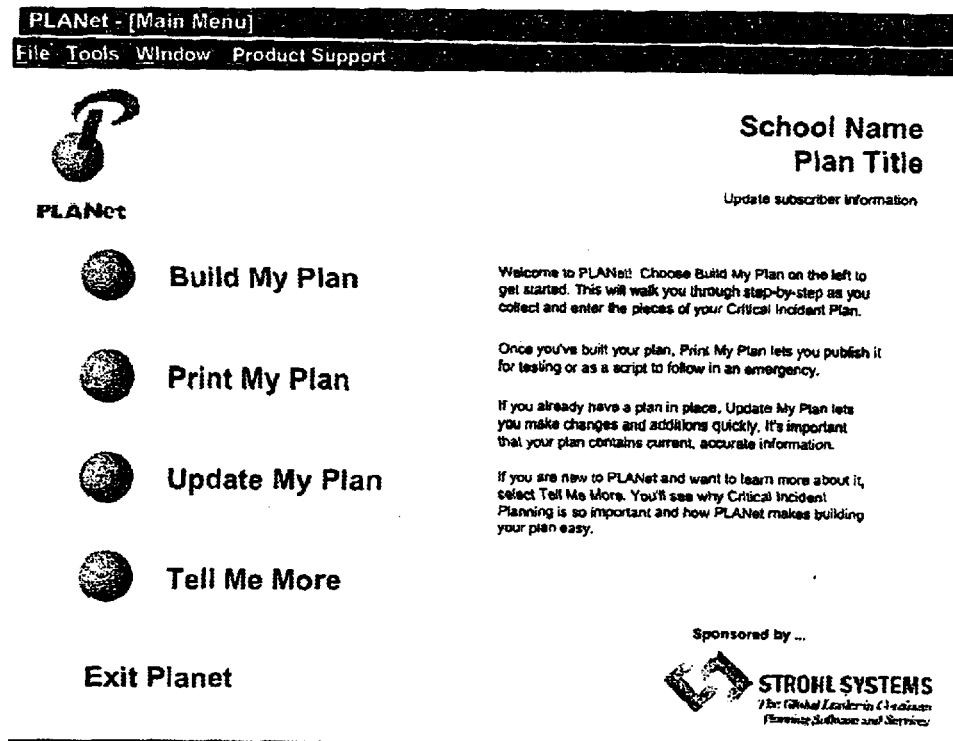

In particular, FIG. 2a is a block diagram depicting menu options and corresponding sub-options presented to a user operating an incident response system from a user station 1501a, b, c, in accordance with an embodiment of the present invention. FIG. 2b shows a typical screen interface which may be used to convey the menu options depicted in FIG. 2a on a crt terminal 47. The main menu 90 represented in FIG. 2a has displayed thereon various related options used to develop, update and print an incident response plan. The user is initially presented with four process options, "Build My Plan," "Print My Plan," "Update My Plan" and "Tell Me More," as depicted in blocks 100, 200, 300 and 400, respectively.

The process corresponding to "Build My Plan" 100 guides the user in collecting and entering into the system 1500 each part of an incident response plan. Apart from a keyboard 95, "Build My Plan" 100 can be selected with a computer based pointing device, such as a mouse, or other input device. In the present described embodiment, upon selection of this option, a user is presented with five sub-options: "Enter My Faculty Staff Info," "Define Critical Incident Team," "Add Incidents to Plan," "Review Plan to Date," and "Add Other Plan Details," represented as blocks 110, 130, 140, 170 and 180, respectively.

The process corresponding to the "Print My Plan" option 200 functions to publish (i.e., print or distribute) an incident response plan, once created by the user, for testing or for use in an emergency. Again, "Print My Plan" 200 can be selected with any user input device available. Upon selection, the user is presented with two sub-options: "Print my Plan" and "Print an Incident," represented in FIG. 2a by blocks 210 and 220, respectively.

The process corresponding to the "Update my Plan" option 300 functions to update information in the plan once it is constructed. Upon selection, the user is presented with three sub-options: "Manage My Incidents," "Manage my Resources" and "Show my Status Plan," represented in FIG. 2a by blocks 310, 320 and 340, respectively.

The process corresponding to the "Tell me more" option 400 functions to educate the user on the importance of critical incident planning. Upon selection, the user is presented with two sub-options: "Getting Started" and "New to Planning?", represented by blocks 410 and 420, respectively. When these are selected, the user is presented with help screens.

1. System Operation and Features—Detail ("Build My Plan")

Figure 3:
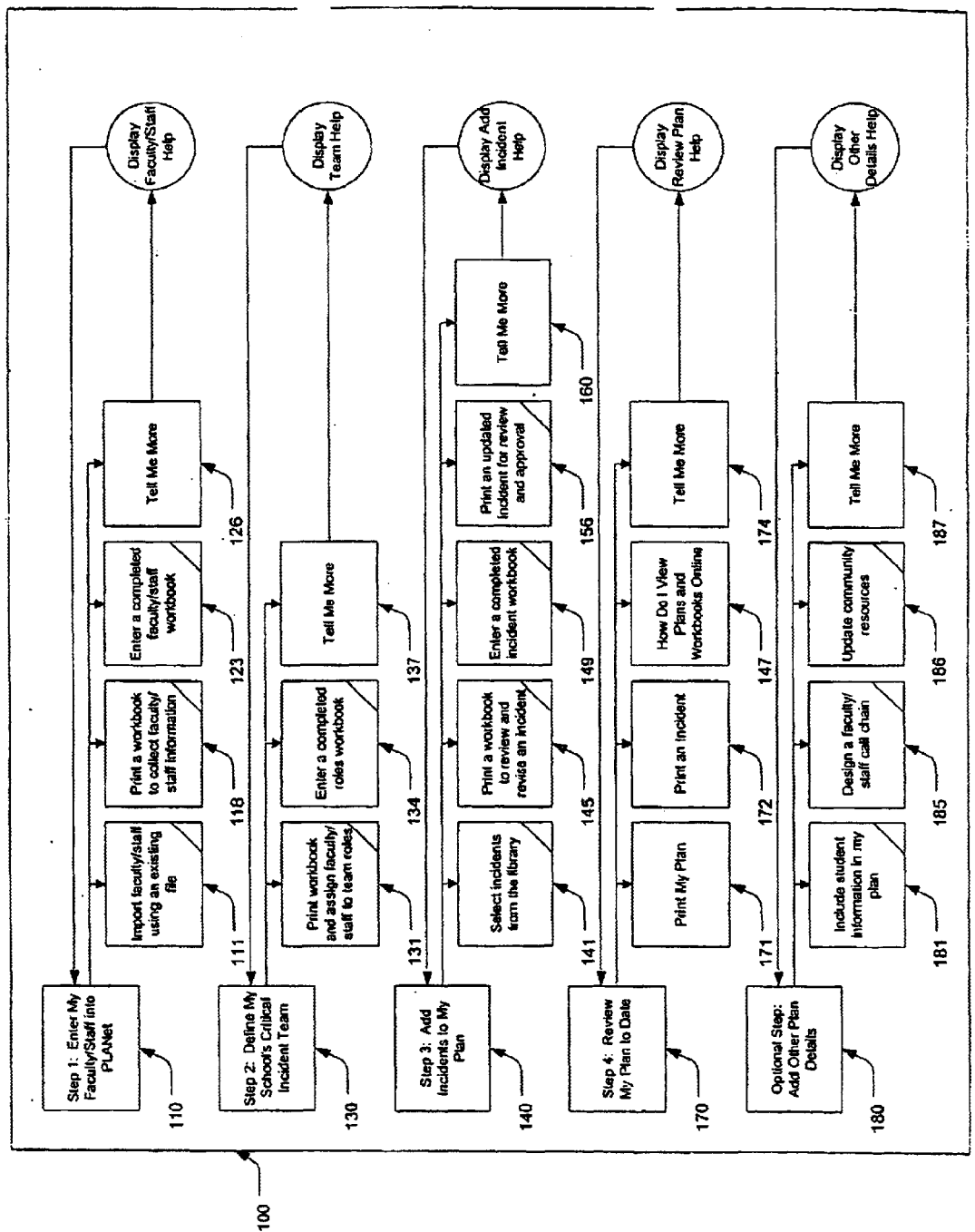

Turning now to FIG. 3, it is a block diagram depicting a high level overview of exemplary processes which may be performed upon user selection of corresponding sub-options of the "Build My Plan" menu option depicted in FIG. 2a. These processes include processes corresponding to each of the following sub-options: (1) Entering Faculty Staff Information, (2) Defining a School's Critical Incident Team; (3) Adding Incident's to a Plan; (4) Reviewing a Plan to Date; and (5) Adding other Plan Details. The processes corresponding to the sub-options in the presently described embodiment are described below in step-by-step fashion.

a. System Operation and Features—Detail ("Enter Faculty Staff Info")

Figure 4A:
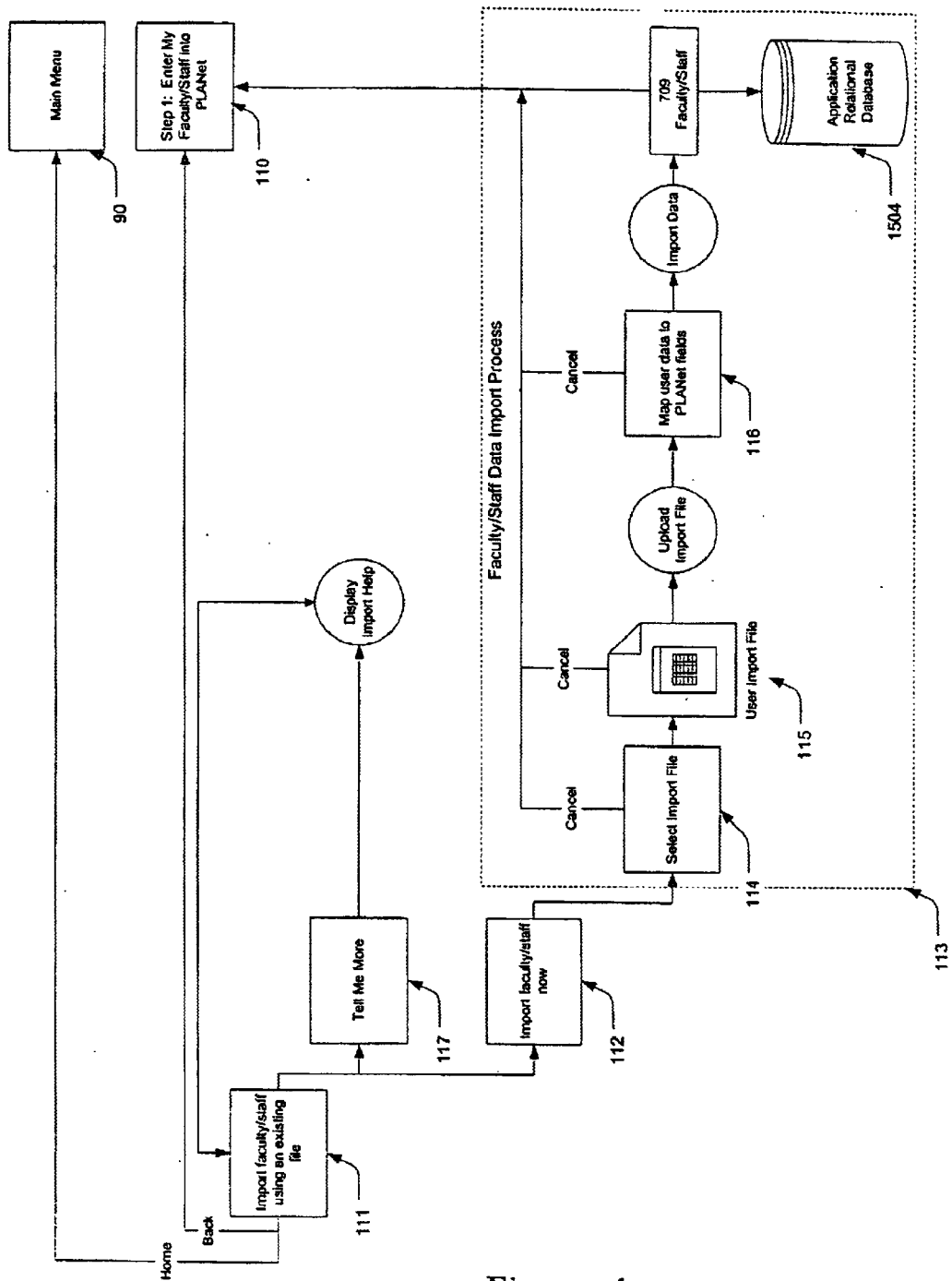
FIG. 4a is a block diagram illustrating in greater detail the step of importing faculty/staff information shown in FIG. 3.

In particular, turning now to FIG. 4a, it is a block diagram illustrating in greater detail the step of importing faculty staff information 111, a first step of the Entering Faculty Staff Information process 110 shown in FIG. 3. In particular, FIG. 4a illustrates an exemplary process for entering faculty/staff into a user data store 1504 database utilizing a data import methodology. If selected, a "Tell Me More" selection 117 displays context sensitive help. If the "Import faculty/Staff" selection 112 is selected, processing continues and a user import file is selected in step 114 at user machine 1501 (i.e., a user import file stored on the user data store 1504 or elsewhere on the server 1503 is specified and a request for same is sent to server 1503 using browser element or other network protocol interface). The selected file 115 is then downloaded in step 116 from server 1503 via network 1502 to user machine 1501. The client station 1501 then maps the fields from file 115 to Faculty Staff data object 709 fields via, for example, a GUI if the mapping is performed manually. As noted earlier, the Faculty Staff data object is a set of fields adapted to hold and/or organize faculty/staff data in a relational application database stored on the user data store 1504. The GUI used to map the imported data may include a series of pages representative of the Faculty/Staff data object 709. Where software elements are adapted to automatically perform mapping, no GUI is required. Once the data mapping is completed, in step 119, the mapped data is sent to server 1503 and is there imported into a Faculty/Staff data object 709 and stored into the application relational database at the user data store 1504.

Figure 4B:
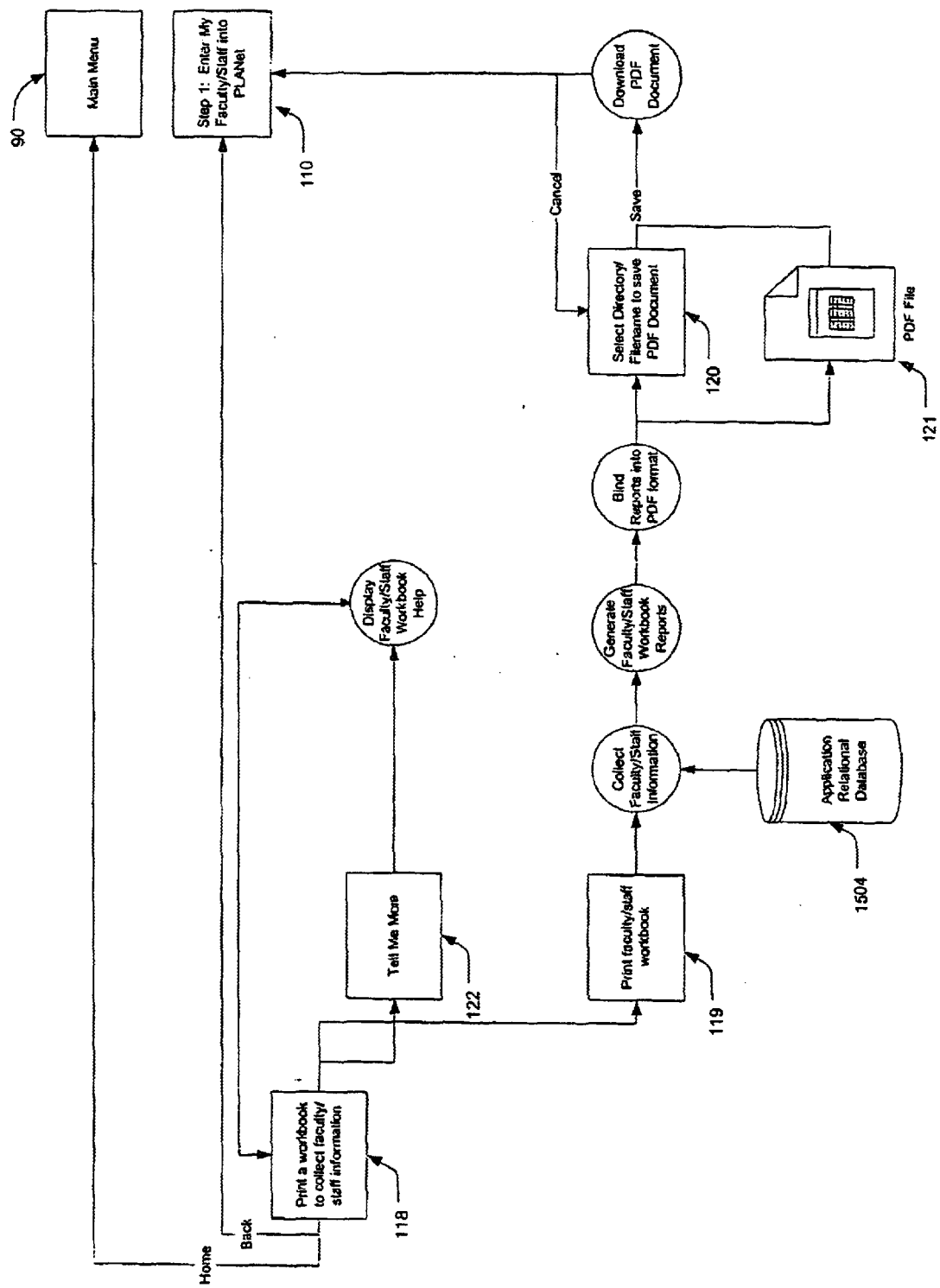
FIG. 4b is a block diagram illustrating in greater detail the step of printing a faculty/staff workbook shown in FIG. 3.

Turning now to FIG. 4b, it is a block diagram illustrating in greater detail the step of printing a faculty staff workbook 118, a second step of the Entering Faculty Staff Information process 110 shown in FIG. 3. In particular, FIG. 4b shows an exemplary process 118 for printing a workbook to collect faculty/staff data offline, for example, when an import file 115 is not available at the server 1503 user data store 1504. Again, the "Tell Me More" selection 122 causes display of context sensitive help. The "Print faculty/staff workbook" selection 123 causes request for collection of current faculty/staff data to be sent to the server 1503. Server 1503 proceeds to collect faculty/staff workbook data and whatever current faculty staff information may exist on user data store 1504. The server 1503 includes database search and maintenance software of the type known in the art to accomplish this purpose. The Server 1503 then generates workbook reports from the retrieved data in step 124 and the reports are bound (i.e., formatted) into a PDF format file 121 in step 125. Commonly known publishing software, such as Adobe Exchange, can be used for this purpose. The server next sends a notification to the client 1501 that the reports are formatted whereupon in step 129, user selects a destination/filename in which to save PDF document 121. The destination/filename is sent to the server 1503, which then commences download of PDF file 121 from server 1503 via network 1502 to client machine 1501. Finally, once downloaded, the PDF report 121 can then be printed at user station 1501 to facilitate collection of data offline. FIGS. 5a–5g show pages of an exemplary faculty/staff workbook generated in accordance with the process depicted in FIG. 4b. Apart from facilitating the collection of faculty/staff information offline, the exemplary workbook depicted includes instructions for entry of data into the system 1500.

Figure 4C:
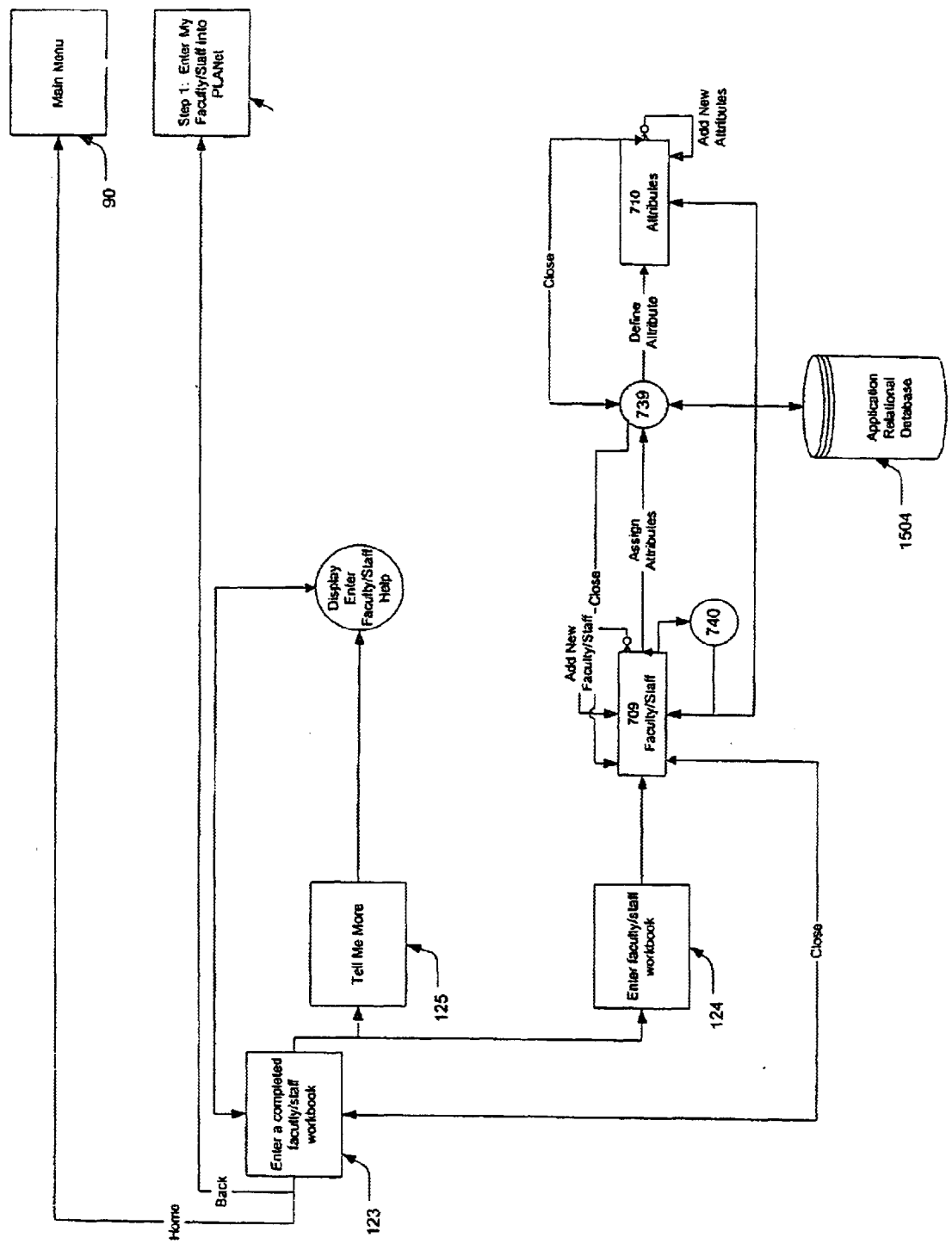
FIG. 4c is a block diagram illustrating in greater detail the step of entering a completed faculty/staff workbook shown in FIG. 3.
Figure 5A:
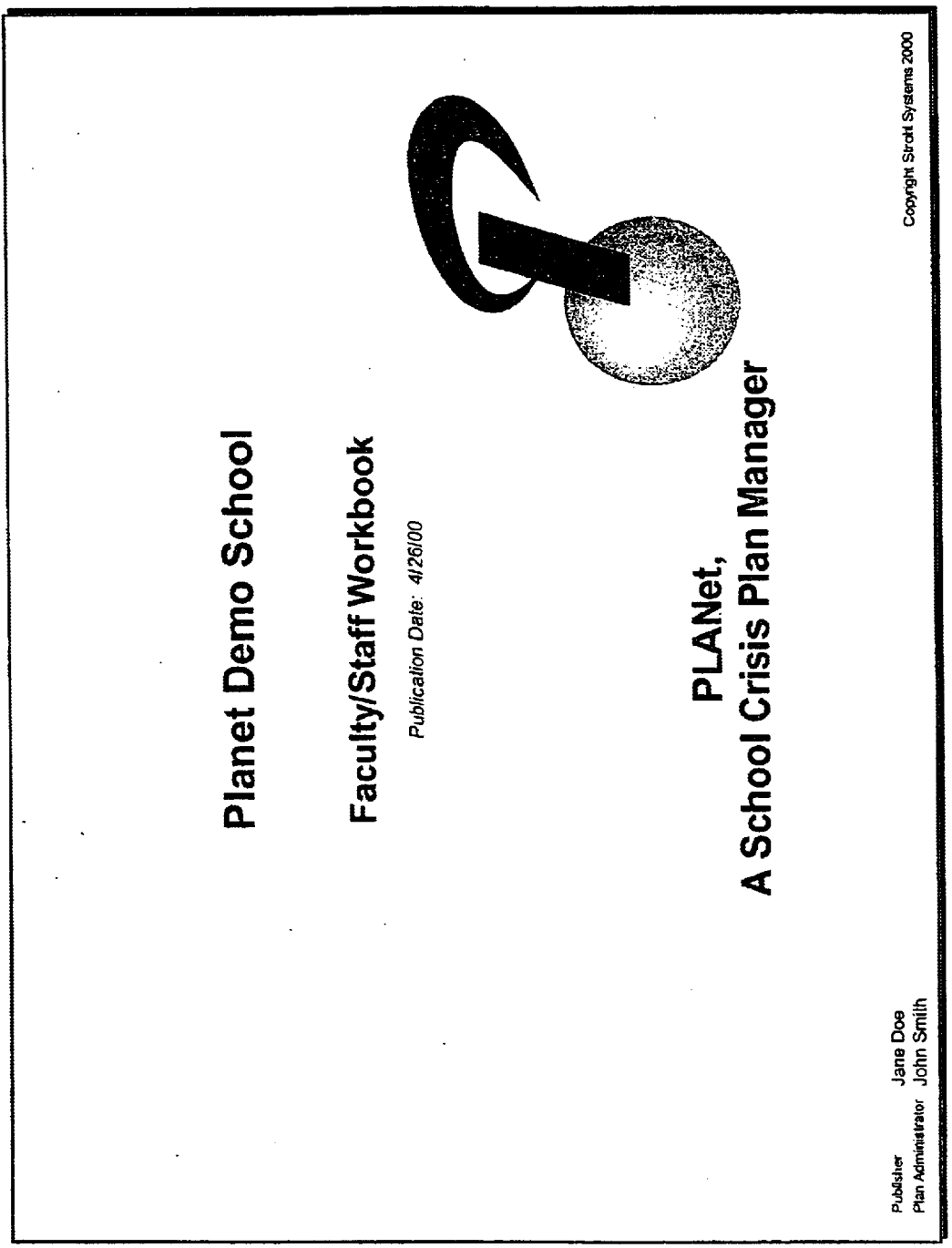

Thus, once data is collected offline, it can be entered into the system 1500. FIG. 4c is a block diagram illustrating in greater detail the step of entering a completed faculty/staff workbook 123 shown in FIG. 3. Again, the Tell Me More selection 127 causes the display of context sensitive help on the crt monitor 47 of the client station 1501. Upon selection of the Enter faculty/staff workbook 128 selection, the client station processor 20 causes display of an editing screen(s) corresponding to the fields of the Faculty/Staff data object 709, which is stored in the application database of the user data store 1504. The data for the editing screen(s) may be retrieved from a storage device 70 of the client station 1501 or, in the alternative, a request for such data may be sent to the server 1503. The editing screen(s) allows a user to enter new records, and delete and edit existing records organized in accordance with the faculty/staff data object(s) 709. Additionally, using the screen interface, a user can define a recursive relationship call chain assignment, whereupon the user station 1501 processor 20 creates corresponding relational database associations 740 which relate Faculty/Staff data objects 709 in accordance with the user defined call chain assignment. In addition, using the screen interface, a user can access another screen interface to define attributes to assign to the Faculty/Staff objects 709, whereupon the user station 1501 processor 20 creates corresponding relational a database associations 739 between the Faculty/Staff object 709 and an attributes data object 710. As noted above, the attributes data object 710 is a set of fields adapted to hold and/or organize attributes of faculty/staff in the relational application database of the presently described embodiment stored on the user data store 1504. Finally, as faculty/staff and attribute records are created at client station 1501 they are sent to server 1503 station for storage in the application relational database at user data store 1504.

Thus, turning back to the presently described embodiment, having entered faculty/staff data and faculty/staff attribute data into the relational application database at user data store 1504, the user at client station 1501 has completed the Enter Faculty/Staff Information process 110 depicted in FIG. 3.

b. System Operation and Features—Detail ("Define Critical Incident Team")

Figure 6A:
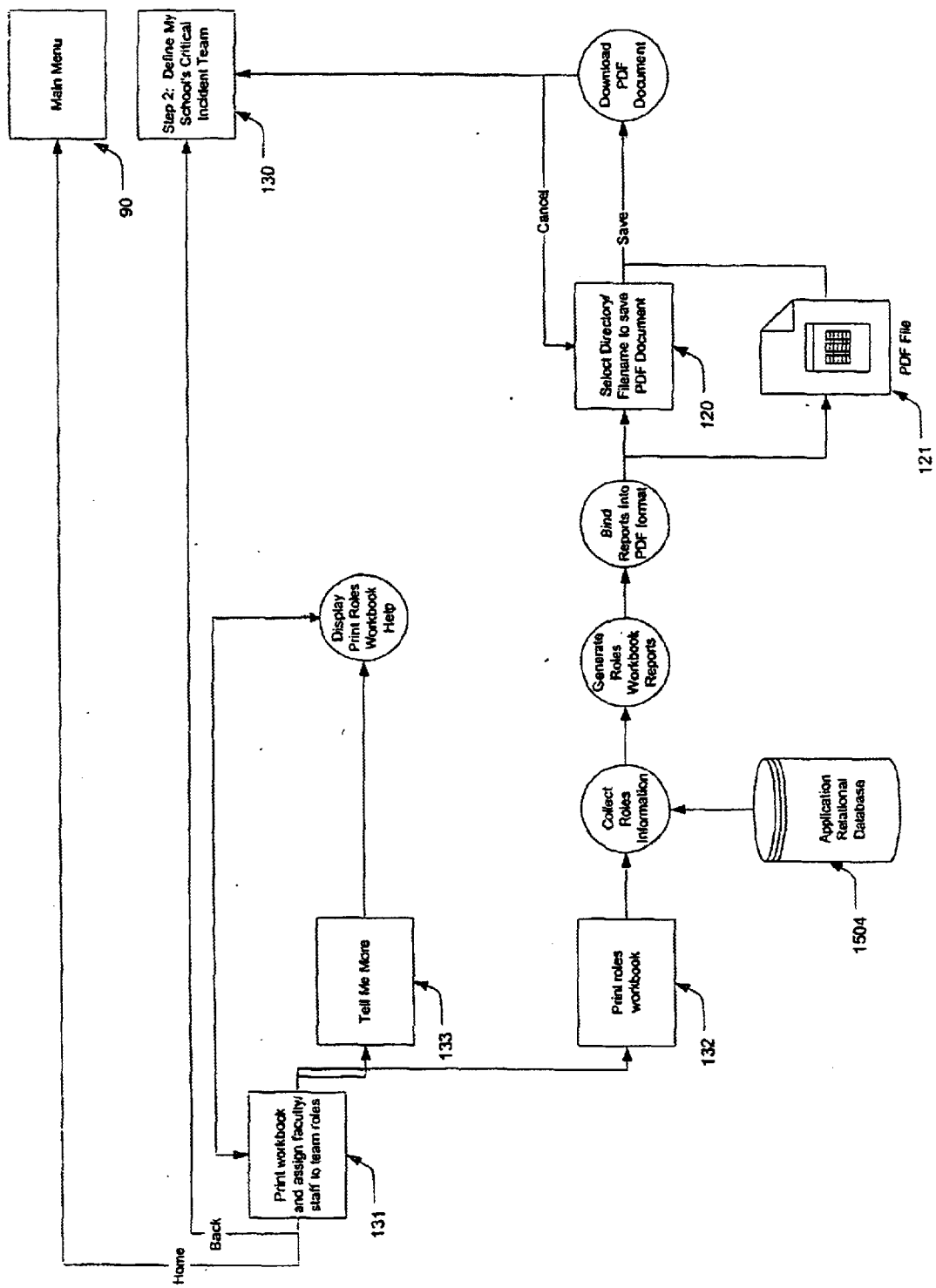
FIG. 6a is a block diagram illustrating in greater detail the step of printing a roles workbook and assigning faculty/staff team roles shown in FIG. 3.

Turning now to FIG. 6a, it is a block diagram illustrating in greater detail the step of printing a roles workbook and assigning faculty/staff team roles 131, a first step of the Defining School's Critical Incident Team 130 process shown in FIG. 3. More specifically, FIG. 6a shows an exemplary process for printing a workbook to assign Faculty/Staff team roles 131 offline. If selected, a Tell Me More selection 133 displays context sensitive help. The Print Roles Workbook selection 132 causes a request for collection of current role assignment data to be sent to the server 1503. Server 1503 proceeds to collect role assignment workbook data and whatever current role assignment data exists on the user data store 1504. The server 1503 includes database search and maintenance software of the type known in the art to accomplish this purpose. The server 1503 then generates workbook reports from the retrieved data in step 137 and the reports are bound (i.e., formatted) into a PDF format file 121a. Commonly known publishing software, such as Adobe Exchange, can be used for this purpose. The server 1503 next sends a notification to the client 1501 that the reports are formatted whereupon in step 209, the user selects a destination/filename in which to save the PDF document 121a. The destination/filename is sent to the server 1503, which then commences download of PDF file 121a from server 1503 via network 1502 to client 1501. Finally, once downloaded, the PDF report 121a can then be printed at client 1501 to facilitate collection of data offline. FIGS. 7a–7j show pages of an exemplary roles workbook generated in accordance with the process depicted in FIG. 6a. Apart from facilitating the collection of faculty/staff information offline, the exemplary workbook depicted includes instructions for entry of data into the system 1500.

Figure 6B:
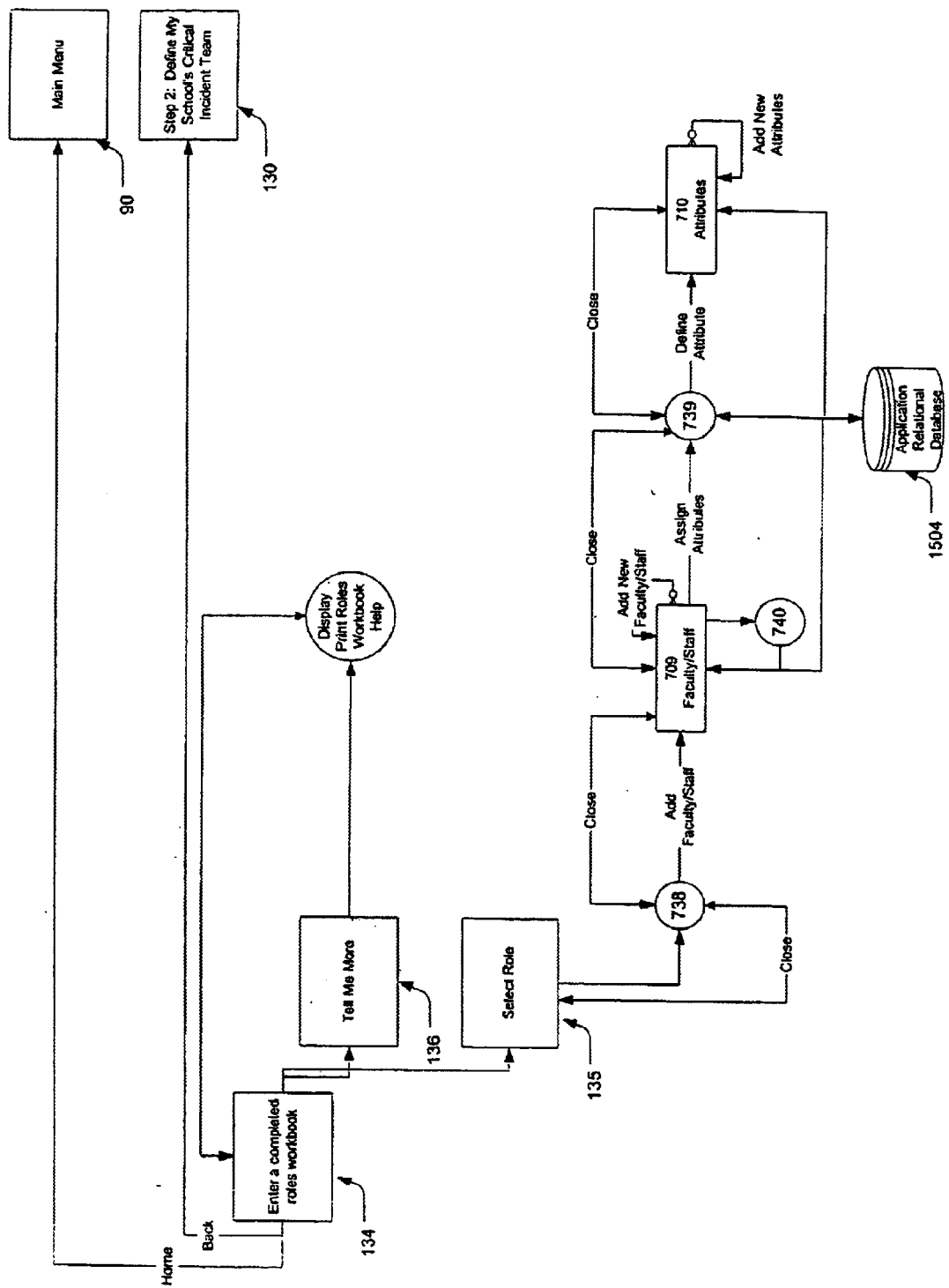
FIG. 6b is a block diagram illustrating in greater detail the step of entering a completed roles workbook shown in FIG. 3.
Figure 7A:
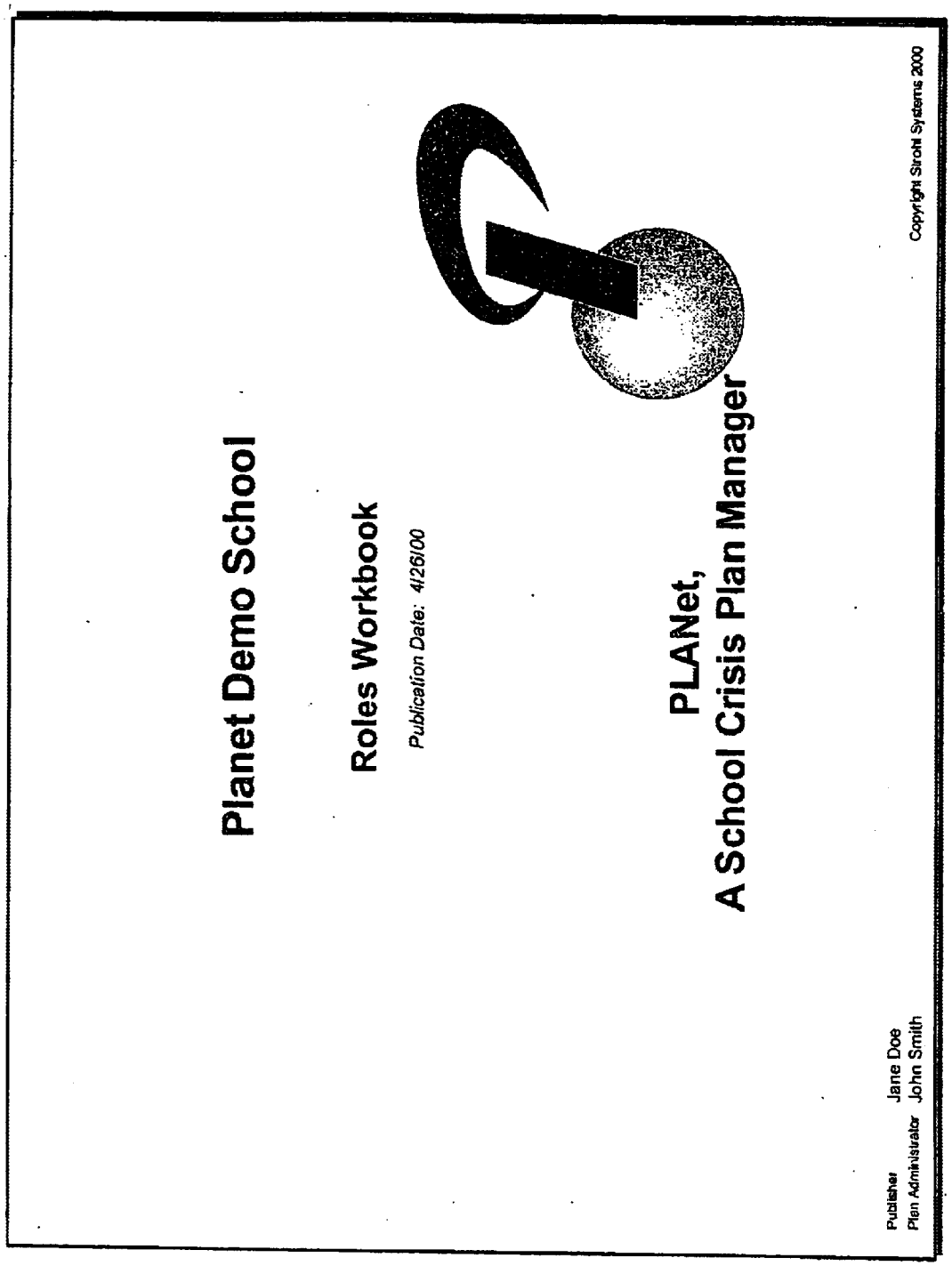
Figure 7G:
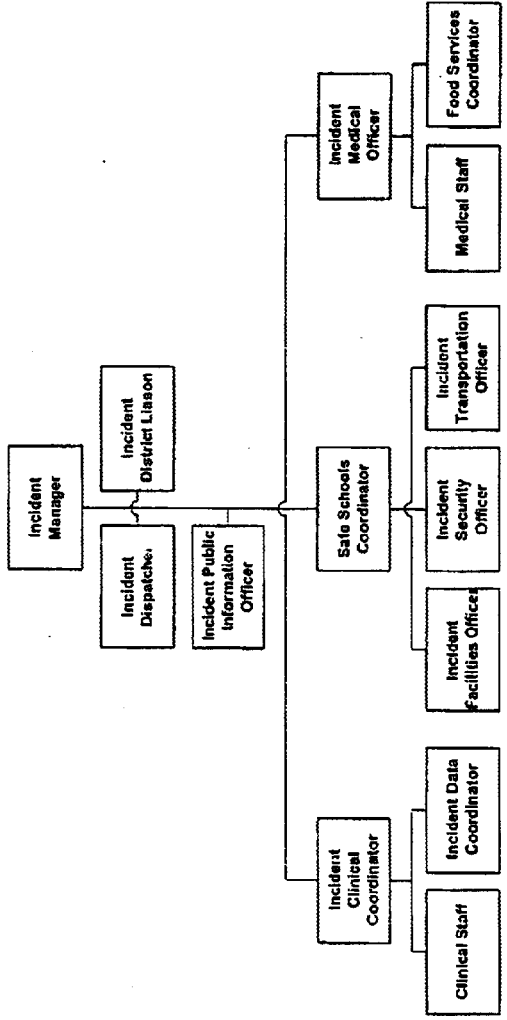

Thus, once data is collected offline, it can be entered into the system 1500. FIG. 6b is a block diagram illustrating in greater detail the step of entering completed roles workbook data 134 shown in FIG. 3. Again, the Tell Me More selection 136 causes the display of context sensitive help on the CRT monitor 47 of the client station 1501. Upon selection of the select role selection 135, the client station 1501 processor 20 causes display of an editing screen providing a role chart comprised of a list of roles which may be selected. The data for the editing screen(s) may be retrieved from a storage device 70 of the client station 1501 or, in the alternative, a request for such data may be sent to the server 1503. Once the user specifies a role via, for example, the client station 1501 keyboard 95, the client station 1510 processor 20 creates a corresponding roles record in the form of the roles data object 708 shown in FIG. 14a. The client station also issues a request to the server 1503 for current faculty staff data records in the application data base of the user data store 1504. If such records exist, upon receipt of the data, the processor 20 of the client station 1501 provides an editing screen with a list of faculty staff members to which the selected role is assigned. The list is extracted from the downloaded faculty staff records, each of which correspond to an individual faculty/staff member on a one to one basis in the presently described embodiment. Upon selection of such faculty staff members, the client station 1501 processor 20 creates corresponding relational database associations 738 between a corresponding instance of Faculty/Staff object 709 and the user specified instance of the roles data object 708.

If no faculty staff data records exist on the server 1503, then the client station 1501 processor 20 causes display of an editing screen(s) corresponding to the fields of the Faculty/Staff data object 709, which is stored in the application database of the user data store 1504. The editing screen(s) allows a user to enter new records organized in accordance with the faculty/staff data object(s) 709. Additionally, using the screen interface, a user can define a recursive relationship call chain assignment, whereupon the client station 1501 processor 20 creates corresponding relational database associations 740 which relate Faculty/Staff data object 709 instances in accordance with the user-defined call chain assignment. Also, using the screen interface, a user can access another screen interface, to define attributes to assign to the Faculty/Staff object 709 instances, whereupon the client station 1501 processor 20 creates corresponding relational database associations 739 between the Faculty/Staff object 709 instances an attribute data object 710 instance. Finally, as roles, faculty/staff and attribute records are created at client station 1501 they are sent to server 1503 station for storage in the application relational database at user data store 1504.

Thus, turning back to the presently described embodiment, having entered role data, faculty/staff data and faculty/staff attribute data into the relational application database at user data store 1504, the user at client station 1501 has completed the Define Critical Incident team process 130 depicted in FIG. 3.

c. System Operation and Features—Detail ("Add Incidents to My Plan")

Figure 8A:
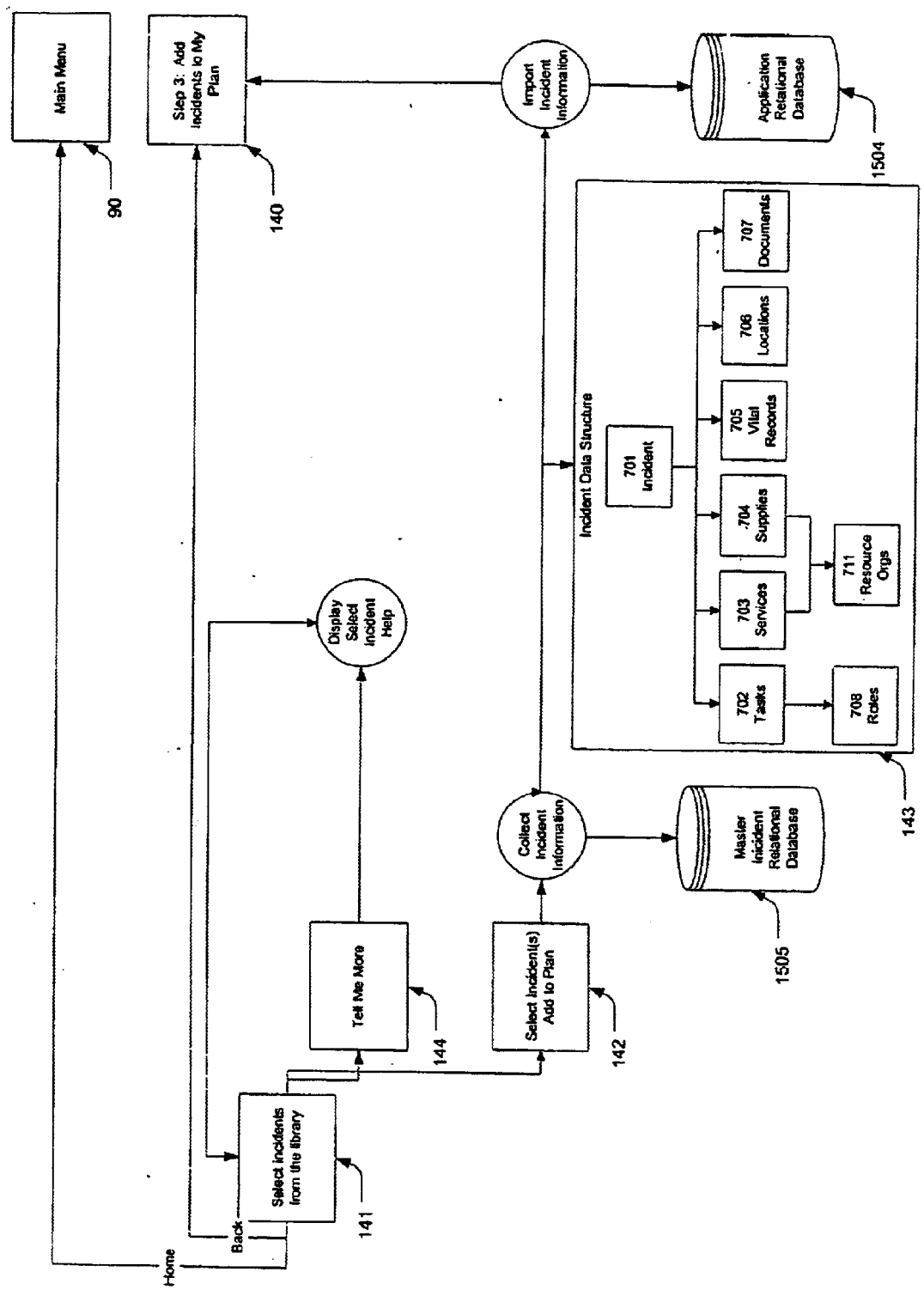
FIG. 8a is a block diagram illustrating in greater detail the step of selecting incidents from a library shown in FIG. 3.

Turning now to FIG. 8a, it is a block diagram illustrating in greater detail the step of selecting incidents from a library for addition to an incident plan 141, a first step of the Add Incidents to My Plan process 140 shown in FIG. 3. More specifically, FIG. 8a shows an exemplary process for selecting and adding incidents 141 from the expert prepared incident response template database on the master data store 1505 into the user application database on the user data store 1504. Again, if selected, a Tell Me More selection 144 displays context sensitive help. Otherwise, the Select Incident selection 142 causes the display of an editing screen providing an incident chart comprised of a list of incidents which the user may select. The data for the editing screen may be retrieved from a storage device 70 of the client station 1501 or, in the alternative, a request for such data may be sent to the server 1503. Once the user specifies an incident type (e.g., a bomb explosion) via, for example, the client station 1501 keyboard 95, the client station 1501 sends a request to the server 1503 for a corresponding incident data records pre-specified by an expert as template records. As noted above, such template data is stored in a master incident relational database stored in the master data store 1501 of the presently described embodiment. In response to the client 1501 request, the server 1503 collects the template data from the master data store 1505. The server then causes a complete incident data structure 143 collected from the master data store 1505 to be coalesced into user application database 1504 using coalescence methodology, thus completing the step of selecting incidents from a library for addition to incident plan 141.

The process of coalescing template data on master data store 1505 into the user application database on the user data store 1504 is now described in greater detail with reference to FIGS. 14b–14f. The coalescence of expert prepared template response data with base user prepared data is a beneficial feature of embodiments of the present invention. In particular, these embodiments provide customized incident response data which at the same time meet relevant, up to date expert specifications for response information. The coalescence is accomplished by various methodologies of data integration. The methodologies include the direct importation of new data, the assemblage and merger of data, and the incorporation and fusion of relational links between data.

Figure 14B:
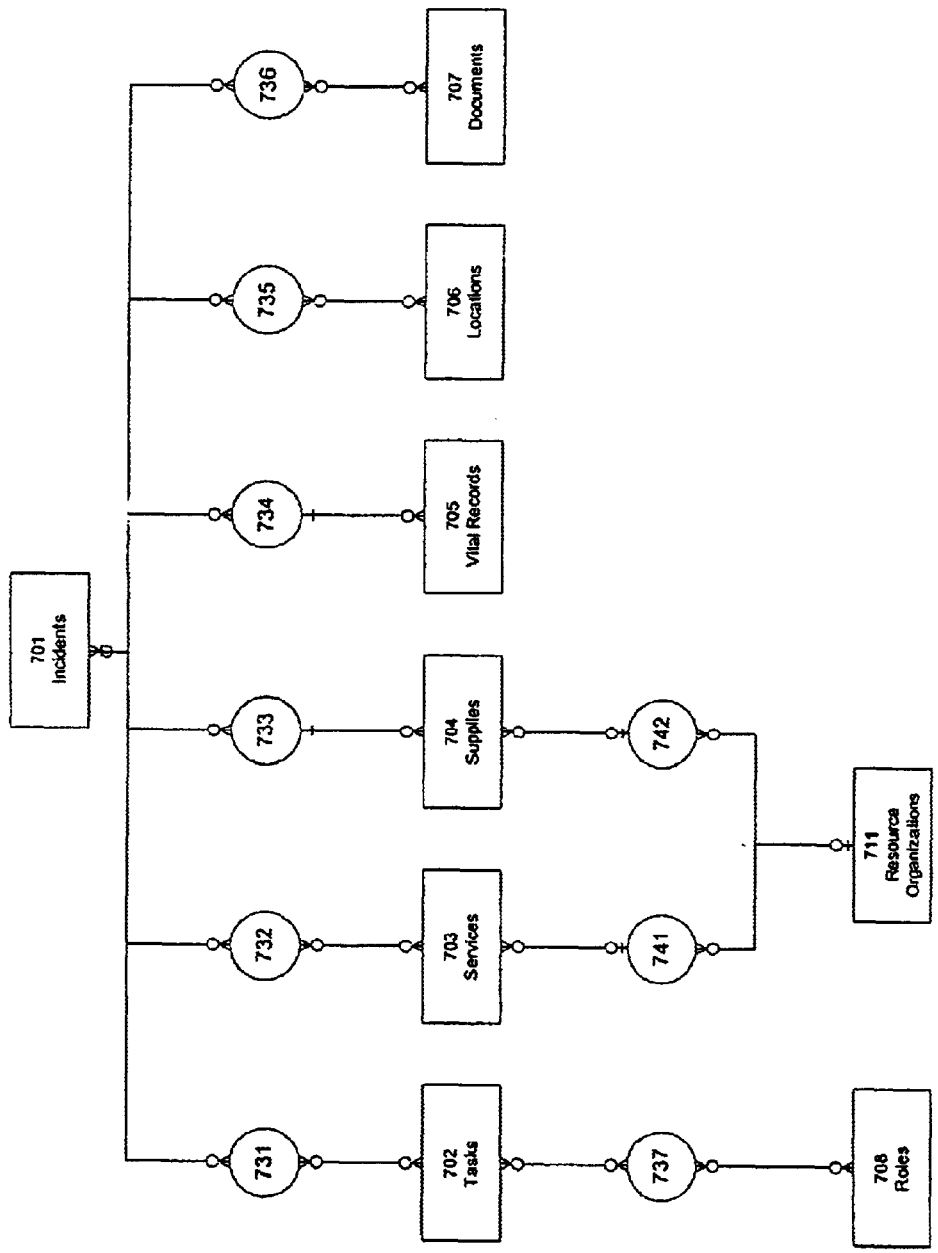
FIG. 14b shows an exemplary subset of the data objects and relationships shown in FIG. 14a used to organize a pre-specified expert designed template of data records for the creation of complete sets of data records having incident response data in accordance with an embodiment of the present invention.

Turning now to FIG. 14b, it shows an exemplary subset of the data objects and relationship rules among data objects shown in FIG. 14a. This subset describes an exemplary organization of a pre-specified expert designed template of data records which are used to create complete sets of data records having incident response data in the application database at the user data store 1504. The template specifies a core of information which incident response plans must maintain to meet state of the art safety and preparedness specifications.

Figure 14C:
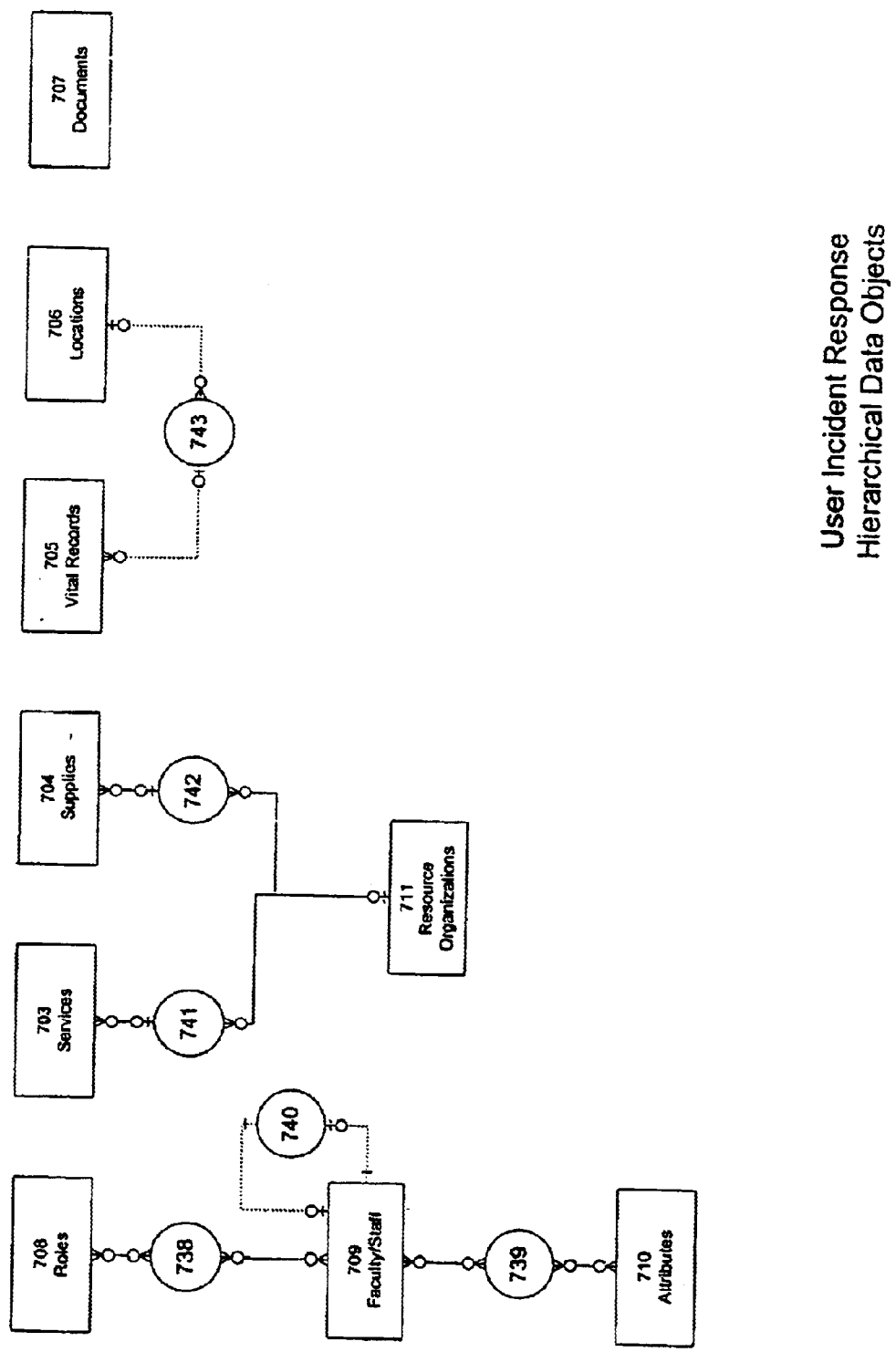
FIG. 14c shows an exemplary subset of the data objects and relationships shown in FIG. 14a used to organize user specified data records for the creation of complete sets of data records having incident response data in accordance with an embodiment of the present invention.

FIG. 14c also shows an exemplary subset of the data objects and relationship rules among data object shown in FIG. 14a. However, this subset describes an exemplary organization of a user specified data set of data records. The data objects in FIG. 14c are of type that hold information that could typically be specified by school administrators and officials, while the data objects of FIG. 14b are of the type that hold information that typically should involve expert assistance. Thus, the data object structure of FIG. 14b complements the data object structure of FIG. 14c, such that when the two structures are combined the result is a more complete set of data records having incident response data in the application database on the user data store 1504.

Figure 14D:
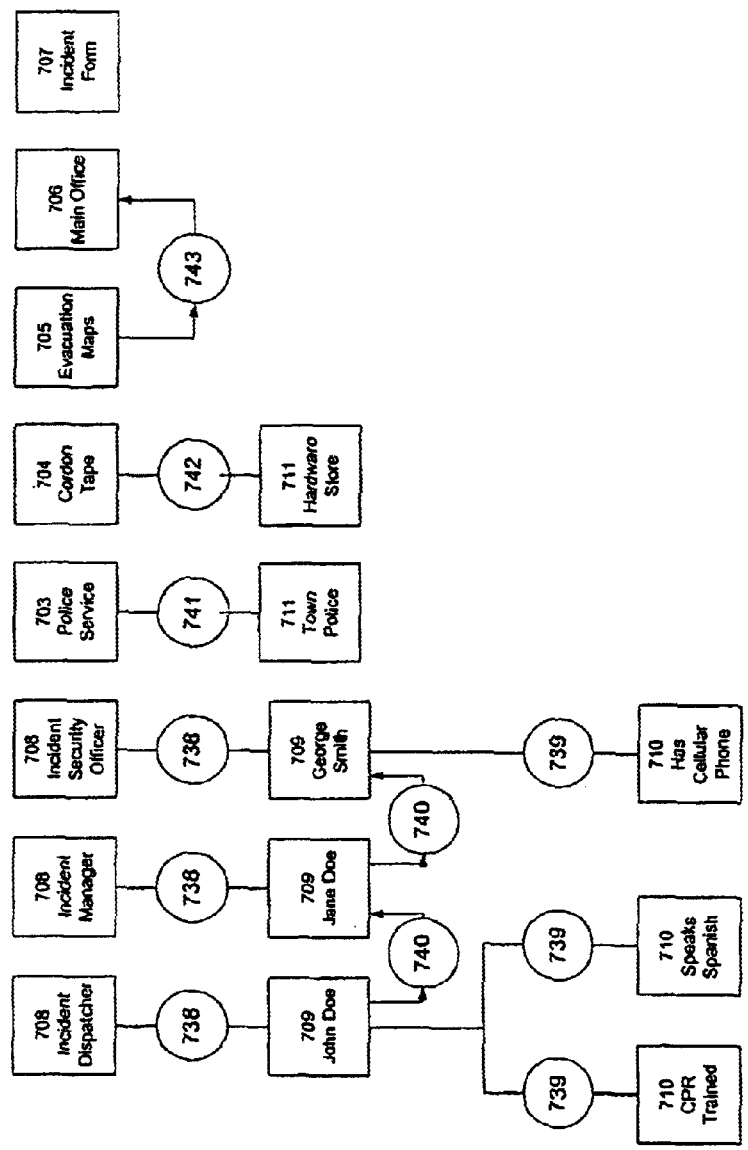
FIG. 14d illustrates interrelated user specified data records used for the creation of a complete set of data records having incident response data relating to a bomb incident in accordance with an embodiment of the present invention.

The process of coalescing specific instances of the structures depicted in FIG. 14b and 14c is now illustrated with reference to FIGS. 14d–14f. In particular, FIG. 14d illustrates user specified data records and relationships amongst records holding user-specified response-related information for bomb explosion incidents. In particular, three faculty/staff records with assigned attributes and linked in a call chain have been assigned in accordance with user-specified information to three roles. The Police Service resource organization link has been modified to Town Police. The supply Cordon Tape resource organization link has been modified to Hardware store. The vital record Evacuation Maps has been assigned to a Main Office location. The document incident form has been modified.

Thus, the data consists of three faculty/staff records conforming to the faculty/staff data object 709 shown in FIG. 14a, three defined attribute assignment relationships 739 (i.e., relation database links), three role assignment relationships 738 to record instances of the role data 708, and call chain relationships 740 between the faculty staff records conforming to the faculty/staff object 709. Additionally, the data includes one service record instance of the services data object 703 show in FIG. 14a, with a resource organization relationship 741 to a record instance of the resource organization data object 711; an instance of the supply record data object 704 with a resource organization relationship 742 to a record instance of the resource organization data object 711; a record instance of the vital record data object 705 with a local relationship 743 to a record instance of the location data object 706, and a record instance of the document data object 707.

Figure 14E:
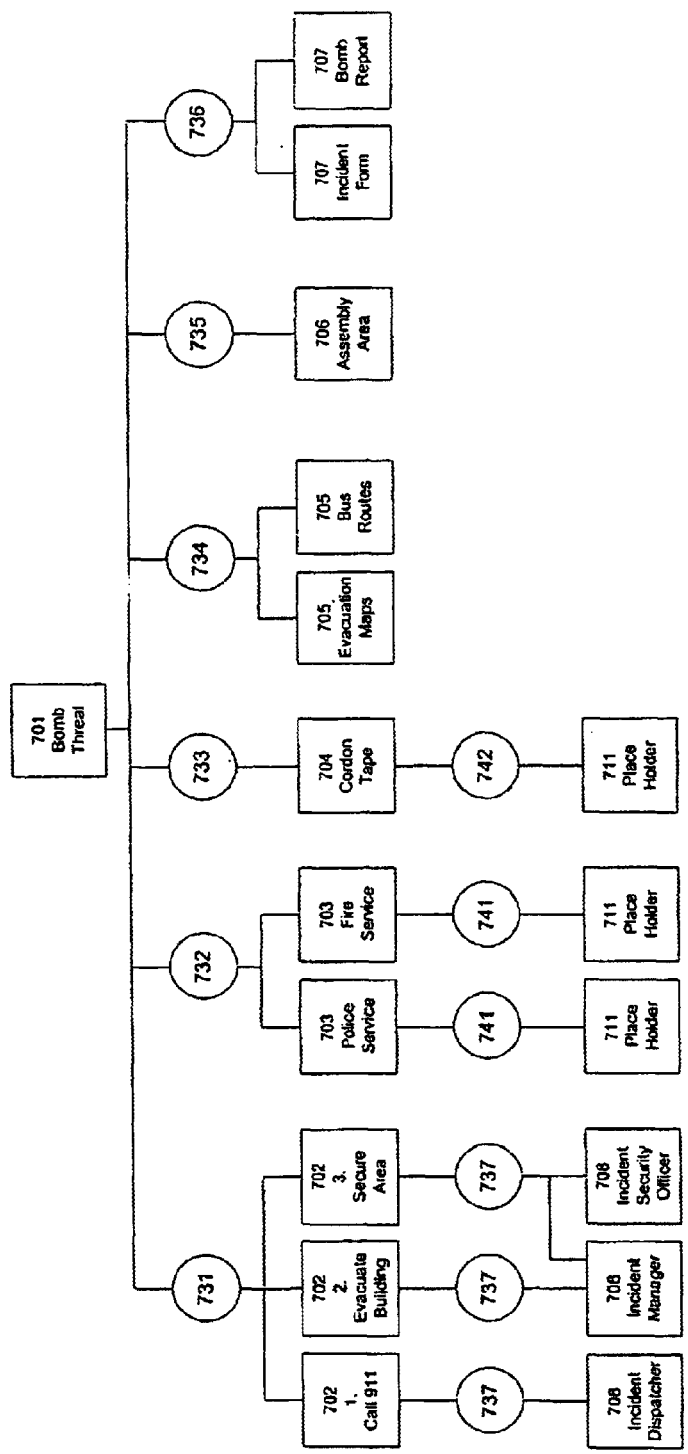
FIG. 14e illustrates interrelated data records pre-specified by an expert as template records used for the creation of a complete set of data records having incident response data relating to a bomb incident in accordance with an embodiment of the present invention.

Turning now to FIG. 14e, it illustrates data records and relational links amongst those records holding expert pre-specified response-related information for bomb explosion incidents. In particular, the template instance consists of consists of three sequenced tasks with assigned roles in accordance with expert-specified information, two services each with a place holder for resource organization information, two vital records, one location and two expert prepared, bomb incident specific documents.

Thus, the data consists of a record instance of the incident data object 701 shown in FIG. 14a, the "Bomb Threat" record instance, in turn, has: (a) an associated task assignment relationship 731 to record instances of the sequenced task data object 702 with assigned role relationships 737 to corresponding record instances of the role data object 708; (b) a service assignment relationship 732 to record instances of the service data object 703 with resource organization relationships 741 to record instances of the resource organization data object 711 holding place holder indicators; (c) a supply assignment relationship 733 to record instances of the supplies data object 704 with resource organization assignment relationship 742 to a record instance of the resource organization data object 711 having only a place holder indicator; (d) a vital record assignment relationship 734 to record instances of the vital record data object 705; (e) a location assignment relationship 735 to a record instance of the location data object 706; (f) and a document assignment relationship 736 to record instances of document data objects 707.

Figure 14F:
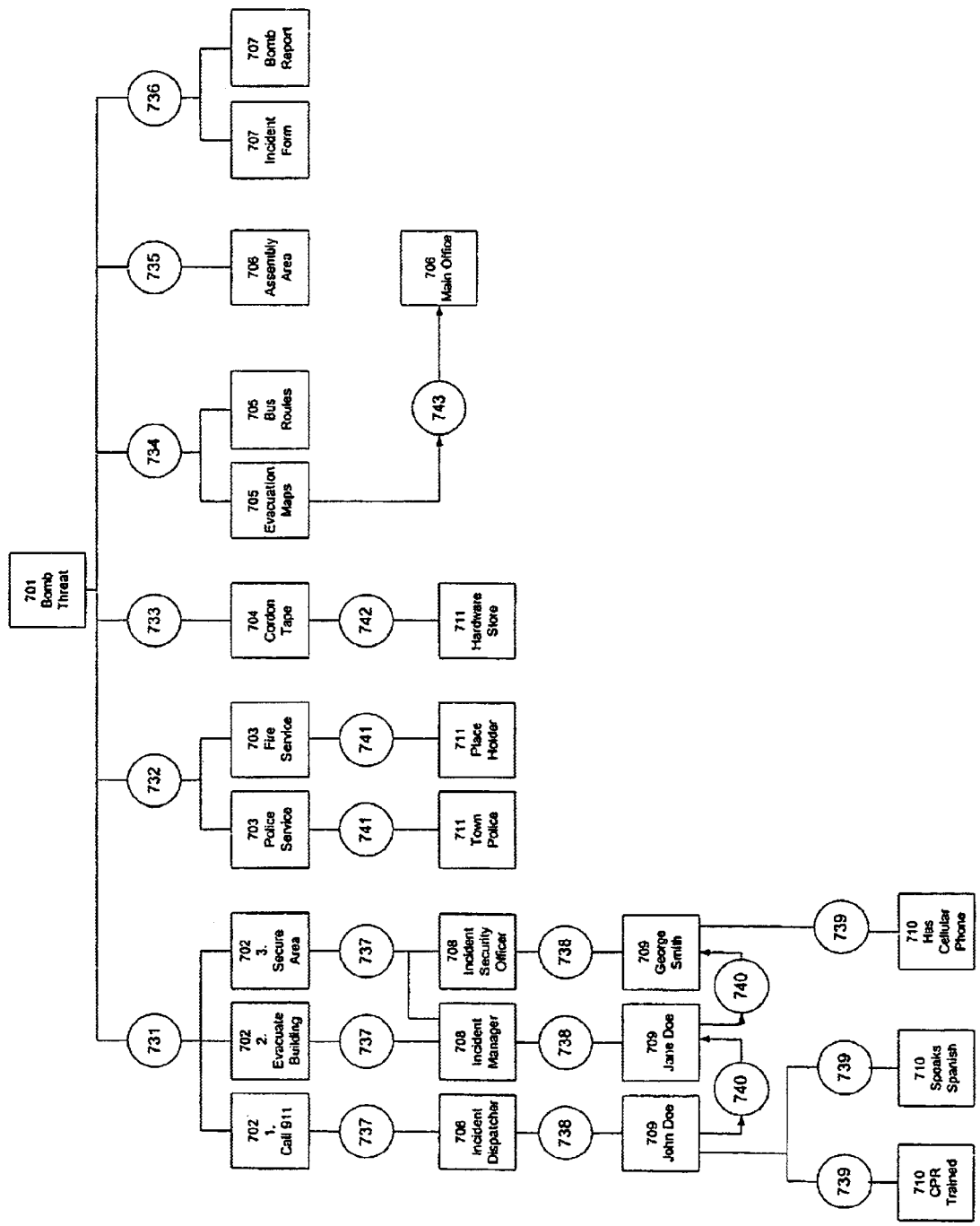
FIG. 14f illustrates an complete set of bomb incident related records created from user specified data records shown in FIG. 14d and the pre-specified data records shown in FIG. 14e.

Finally, FIG. 14f illustrates an complete set of related records with bomb-incident information created from the coalescing of data records having user-specified response-related information show in FIG. 14d and the data records holding expert pre-specified response-related information for bomb explosion incidents shown in FIG. 14e. As the figure shows, the records relating to bomb-incident response report are now include expert-specified and user-specified information. Thus, data for the bomb explosion incident is complete.

Figure 8B:
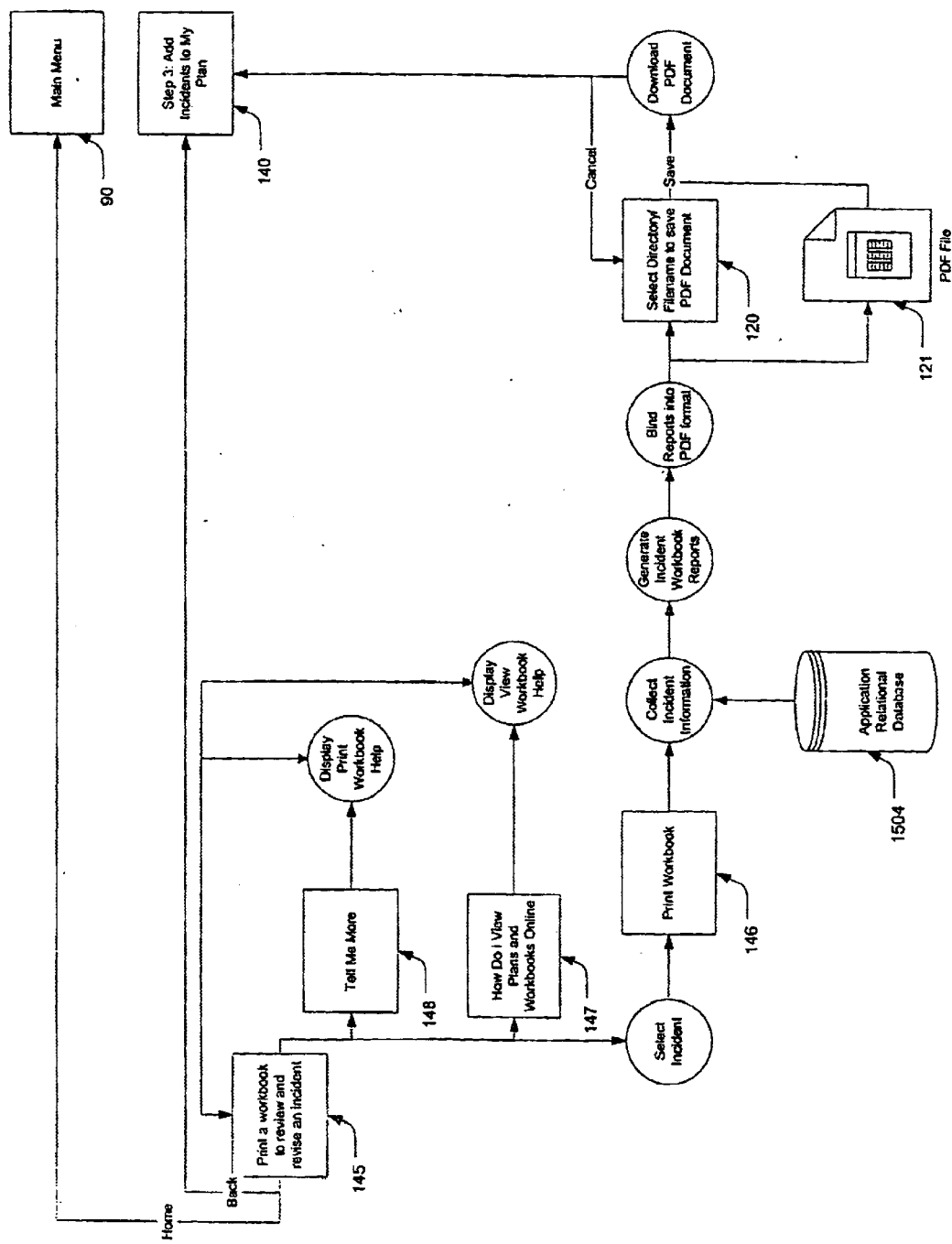
FIG. 8b is a block diagram illustrating in greater detail the step of printing an incident workbook to review and revise an incident shown in FIG. 3.

Upon completion of the data required for the explosion incident report of the presently described embodiment of the invention, it may be prudent to review and, if necessary, revise the completed incident. FIG. 8b is a block diagram illustrating in greater detail the step of printing an incident workbook to review and revise an incident 145 shown in FIG. 3. Again, the Tell Me More Selection 148 causes the display of context sensitive help on the CRT monitor 47 of the client station 1501. The How Do I View Plans selection 147 also causes additional help screens to be shown from data in PDF format.

Figure 9A:
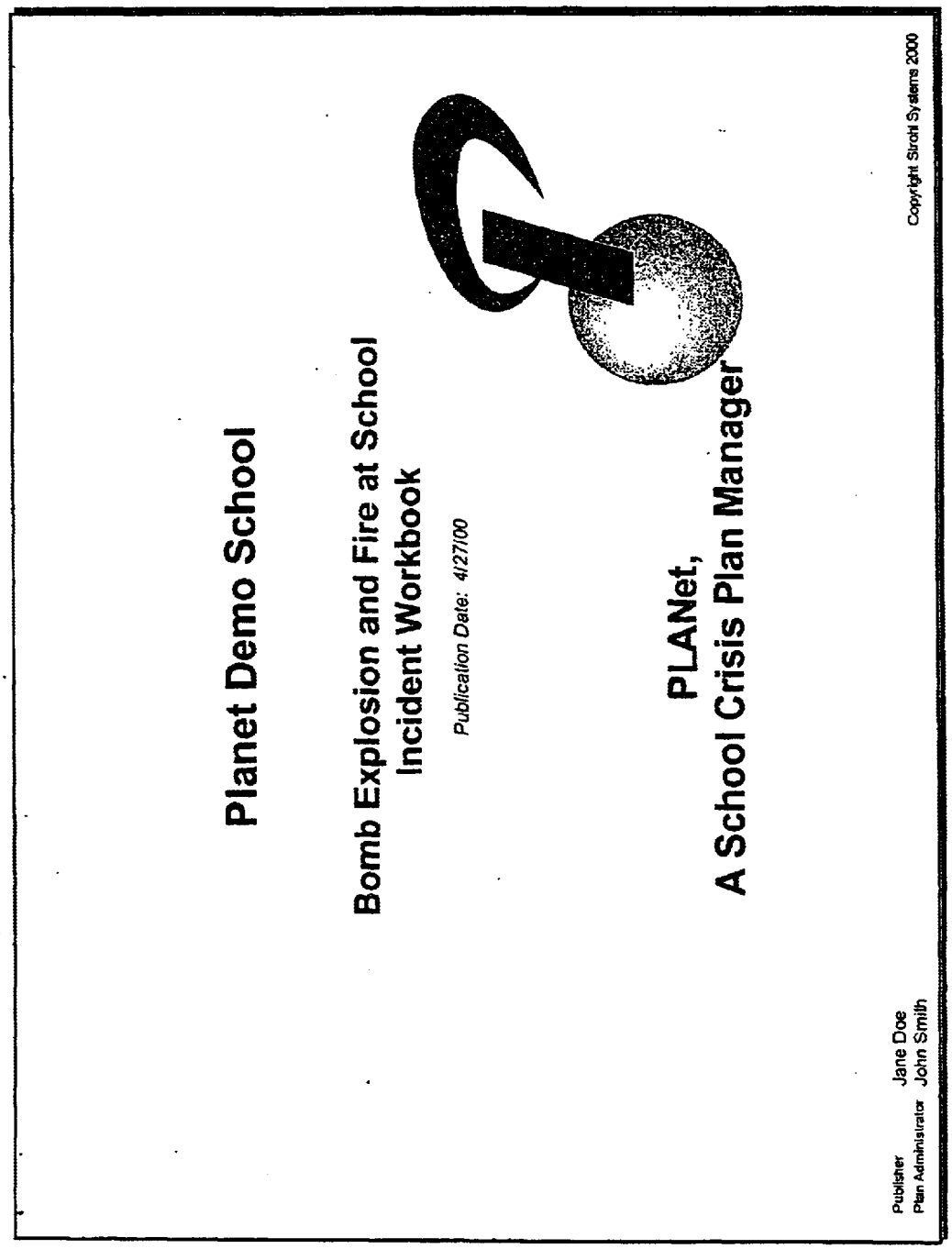
Figure 9F:
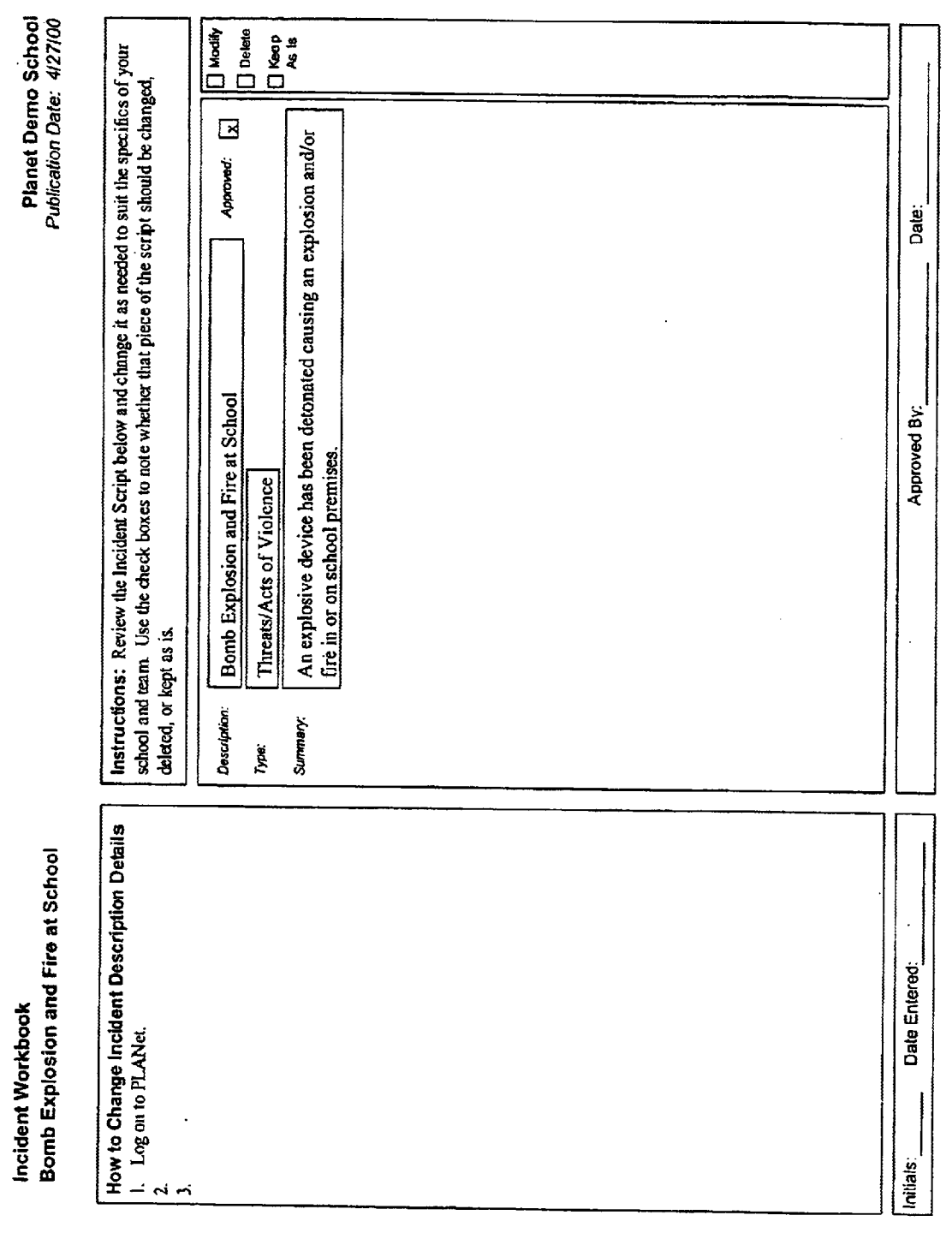
Figure 9H:
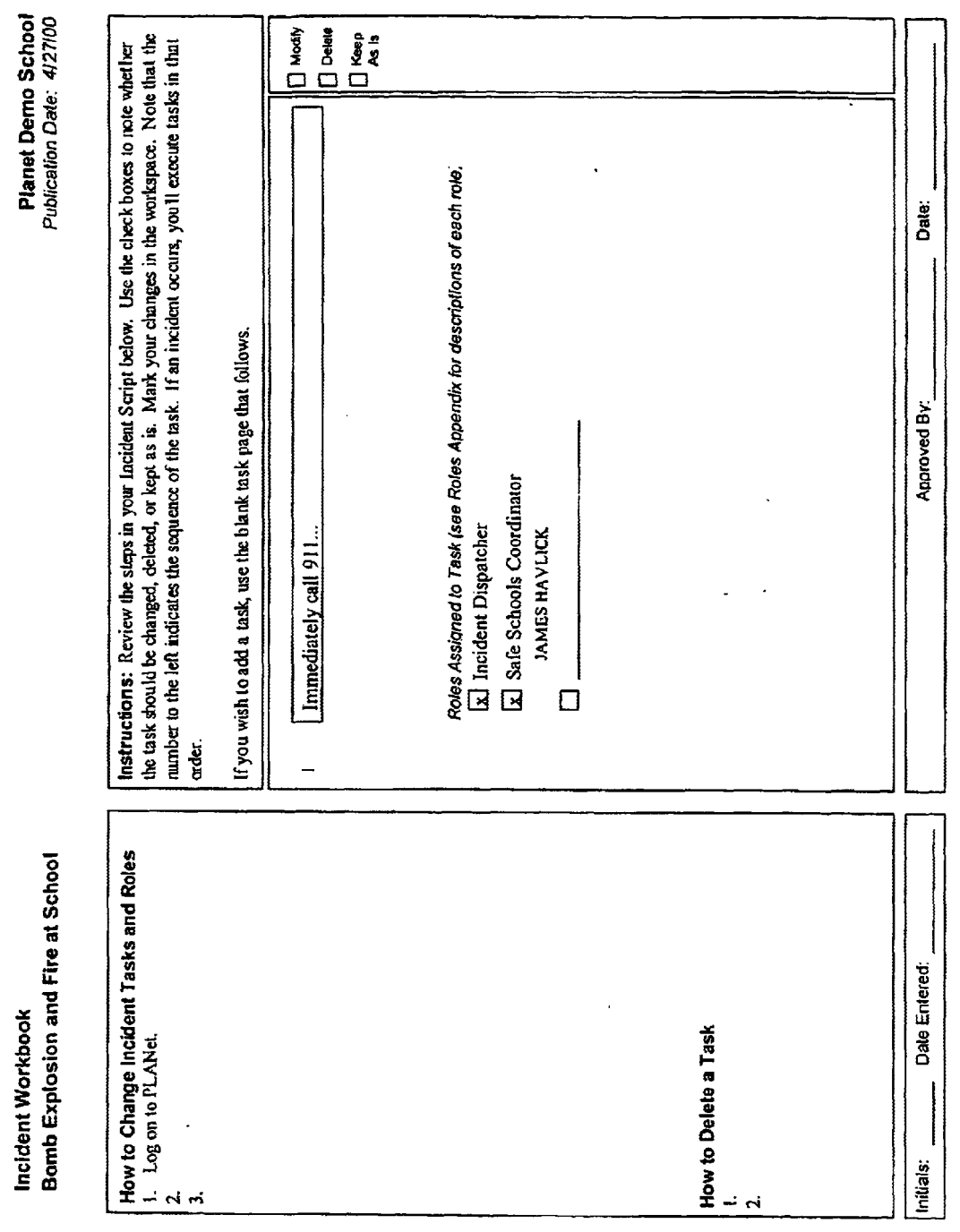
Figure 9J:
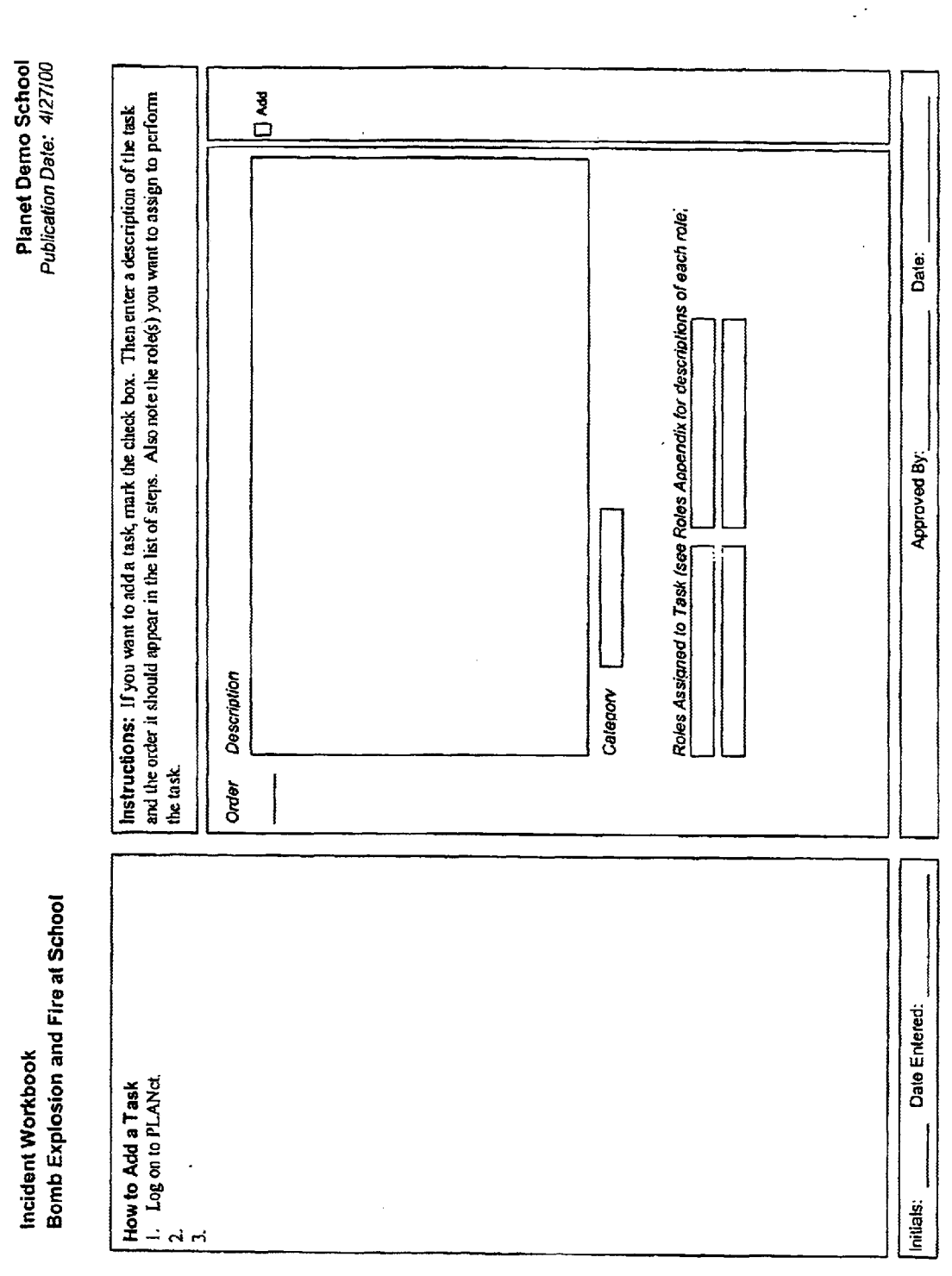
Figure 9O:
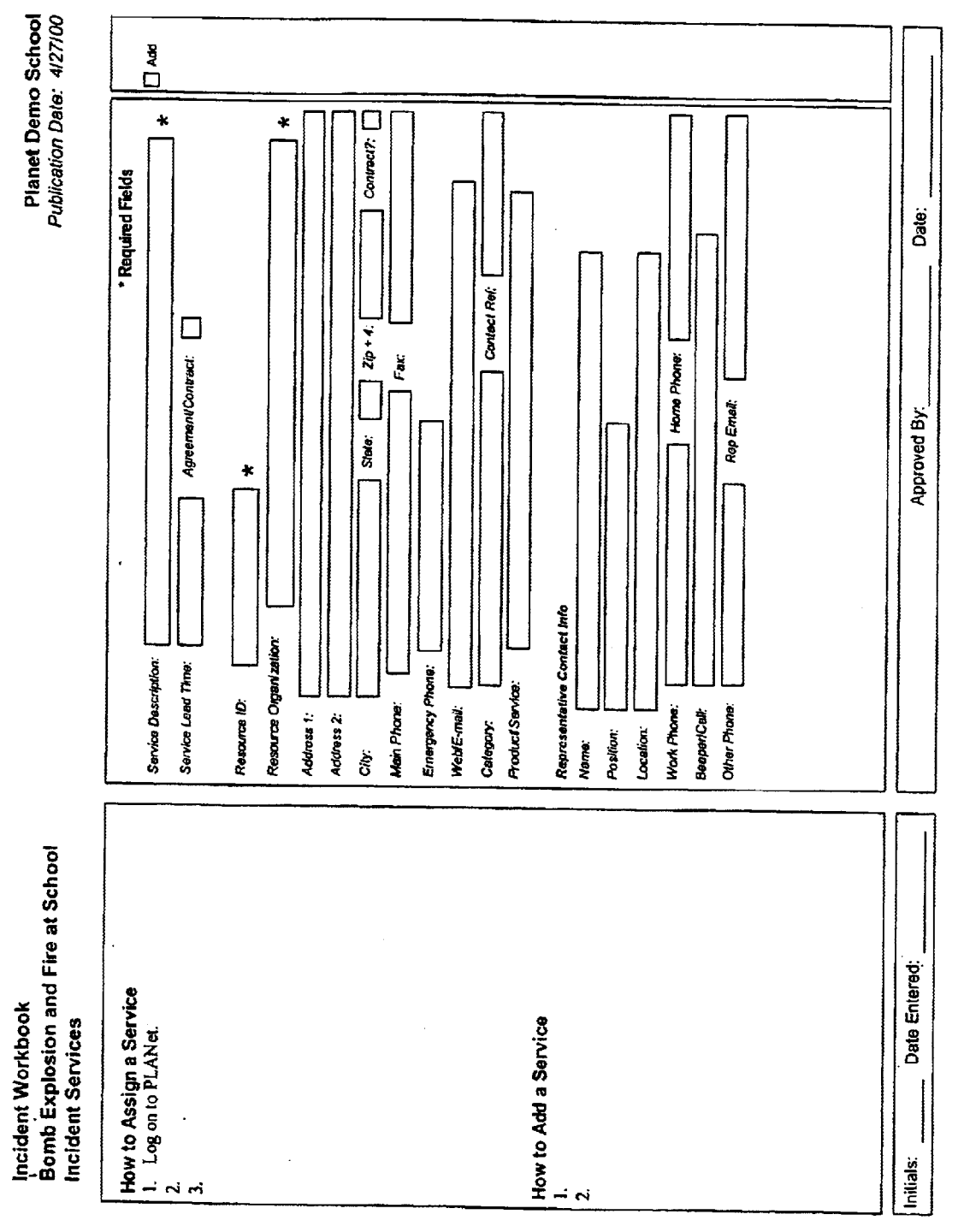
Figure 9Q:
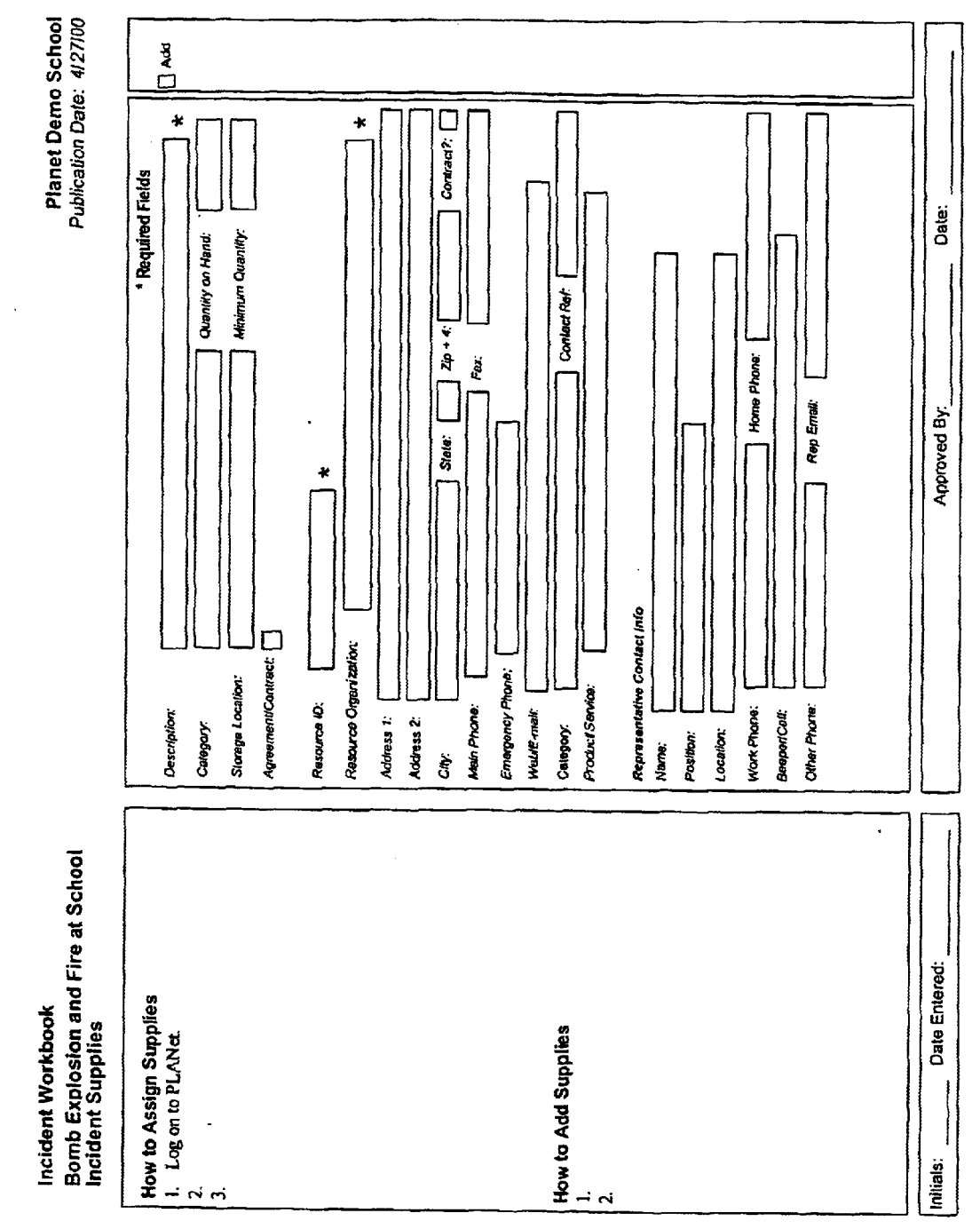
Figure 9S:
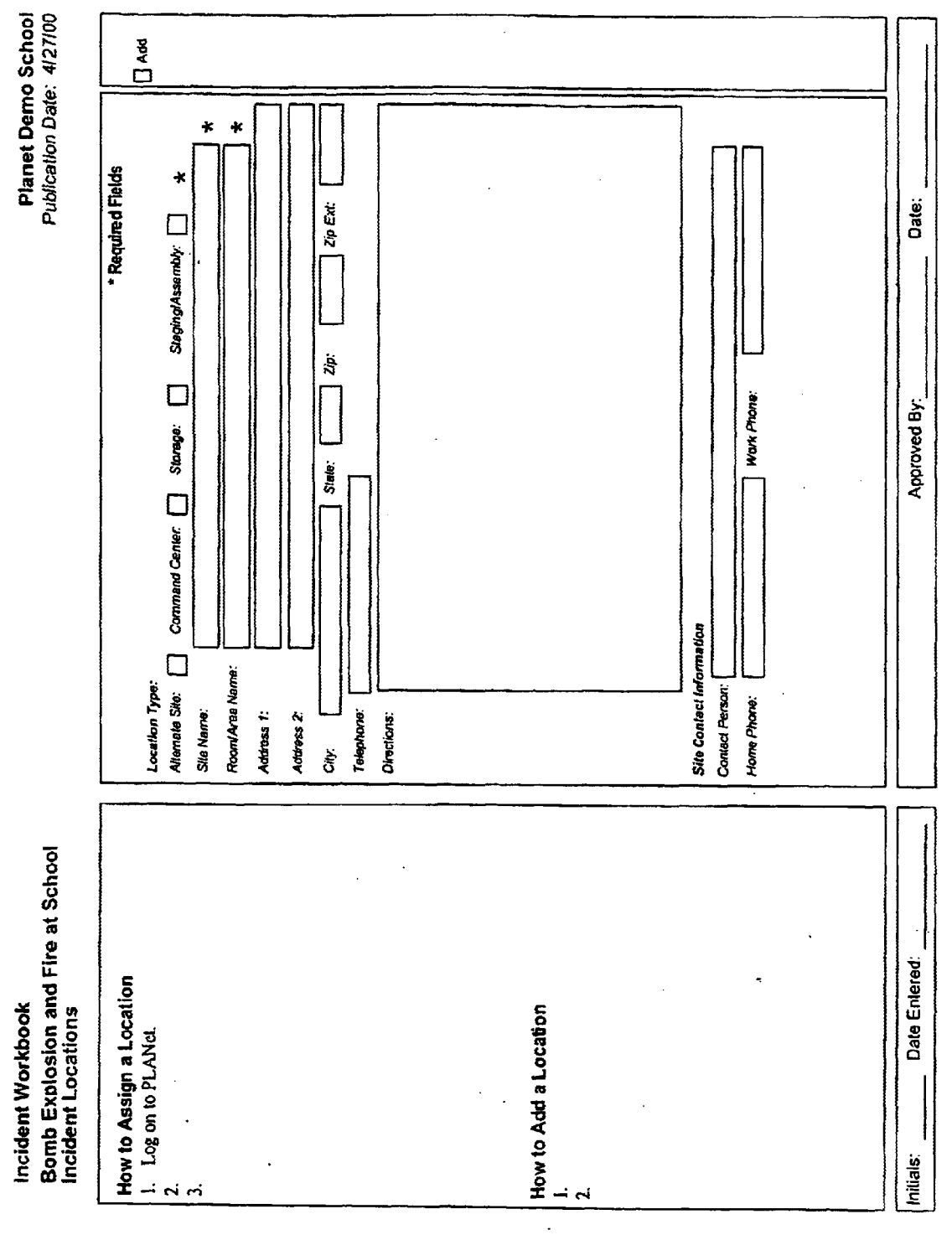
Figure 9U:
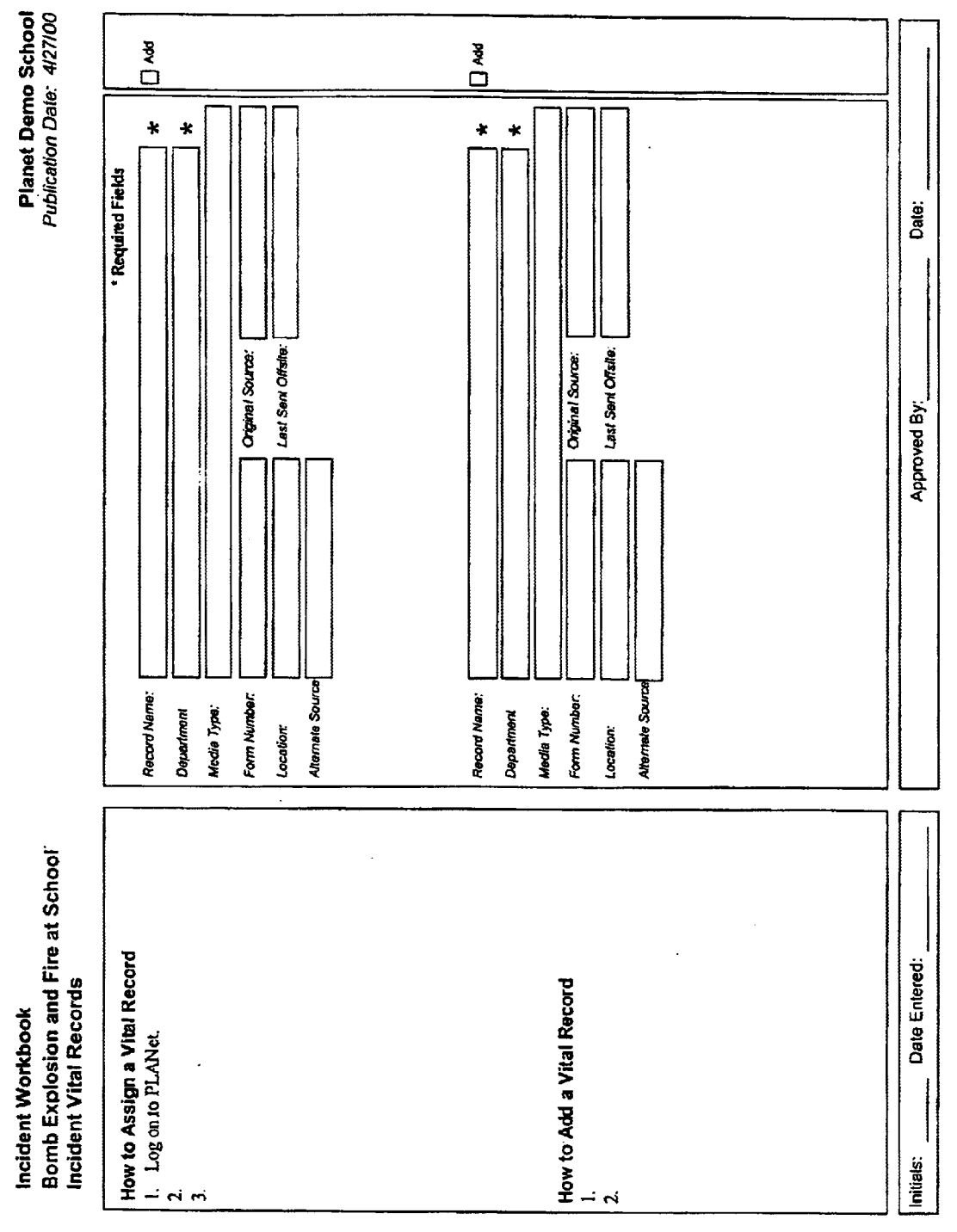

After use of help screens, a user in the presently described embodiment selects an incident to print. In particular, the client station 1501 causes the display of an editing screen providing an incident chart comprised of a list of incidents which the user may select. The data for the editing screen may be retrieved from a storage device 70 of the client station 1501 or, in the alternative, a request for such data may be sent to the server 1503. Once the user specifies an incident type (e.g., a bomb explosion) via, for example, the client station 1501 keyboard 95, the client station 1501 sends a request to the server 1503 to collect current incident assignment data from the application database on the user data store 1504 for printing in step 146. The server 1503 includes database search and maintenance software of the type known in the art to accomplish this purpose. The server 1503 collects and then generates incident workbook reports from the retrieved data and the reports are bound (i.e., formatted) into a PDF format file 121*b*. The server 1503 next sends a notification to the client 1501 that the reports are formatted whereupon in step 120*b*, the user selects a destination/filename in which to save the PDF document 121*b*. The destination/filename is sent to the server 1503, which then commences download of PDF file 121*b* from server 1503 via network 1502 to client 1501. Finally, once downloaded, the PDF report 121*b* can then be printed at client 1501 to facilitate review and revision of incident data. FIGS. 9*a*–9*w* show pages of an exemplary incident workbook generated in accordance with the process depicted in FIG. 8*b*. Apart from facilitating the review and revision of indent data, the exemplary workbook depicted includes instructions for entry of revised data into the system.

Figure 8C:
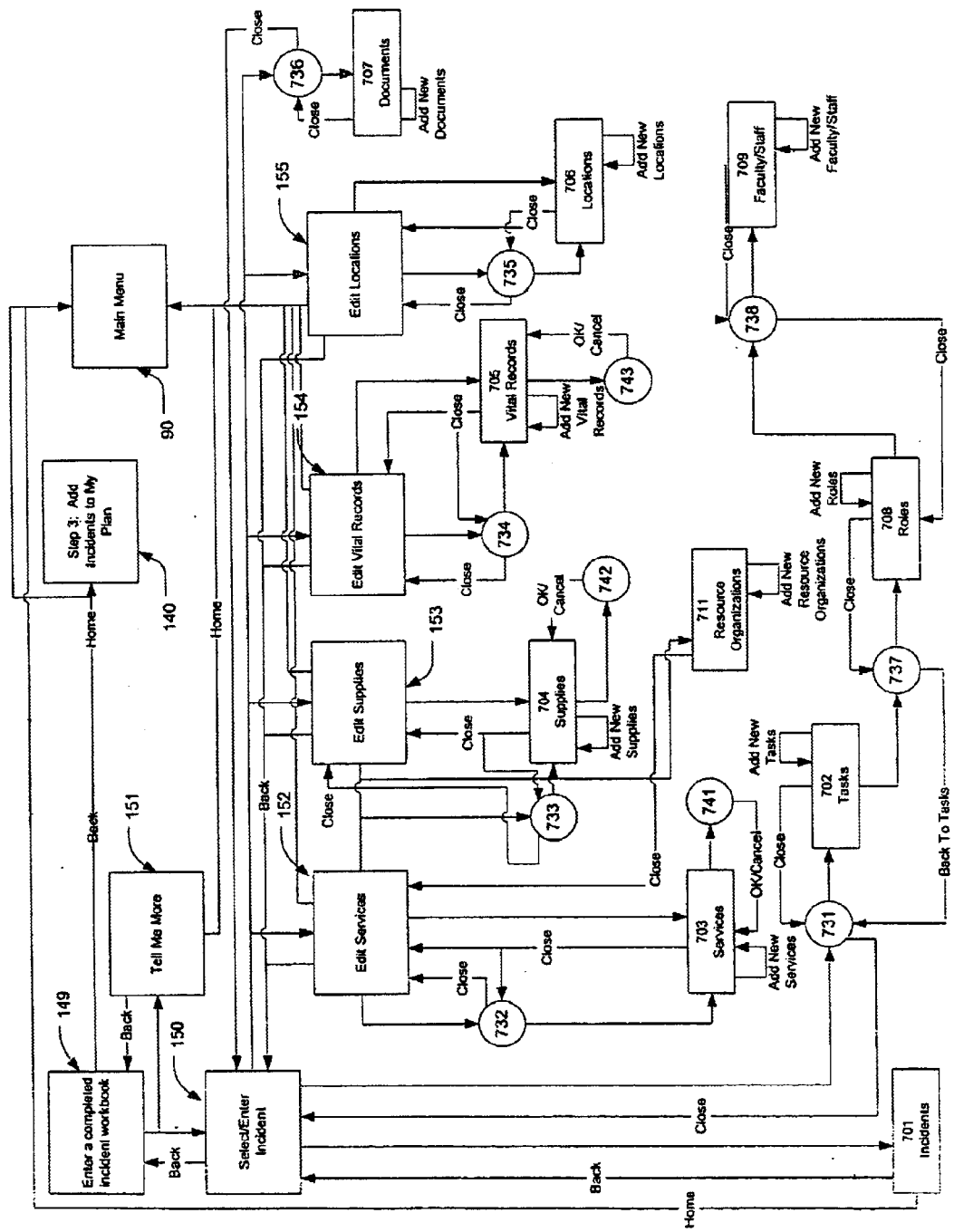
FIG. 8c is a block diagram illustrating in greater detail the step of entering a completed incident workbook shown in FIG. 3.

Once the data is reviewed offline, revised data can be entered into the system 1500. FIG. 8*c* is a block diagram illustrating in greater detail the step of entering a completed incident workbook 149 shown in FIG. 3. The Select/Enter Incident selection 150 causes the display of an editing screen providing an incident chart comprised of a list of incidents which the user may select. The data for the editing screen may be retrieved from a storage device 70 of the client station 1501 or, in the alternative, a request for such data may be sent to the server 1503. Once the user specifies an incident type (e.g., a bomb explosion) via, for example, the client station 1501 keyboard 95, the server returns an editing screen(s) that is displayed and allows editing of a record instances of the incident data object 701 corresponding to the incident specified. Thus, screen prompts provided by the editing screens correspond to incident data object 701 fields. The editing screen(s) also allow for additions, deletions and revisions of record instances of other data objects in the application database associate with the specified incident. Thus, the screen(s) display prompts corresponding to relation links and record instances of data objects associated with the specified incident, including, as depicted in FIG. 72*a*: tasks assignment link 731 and task data object 702, roles assignment link 737 and roles data object 708, faculty/staff role assignment link 738 and faculty/staff data object 709; services assignment link 732 and services data object 703, service resource organizations assignment link (services) 741; supplies assignment link 733 and supplies data object 704, supply resource organizations assignment link (supplies) 742; vital records assignment link 734 and vital records data object 705, vital record location assignment link 743; locations assignment link 735 and locations data object 706; documents assignment link 736 and documents data object 707.

Figure 8D:
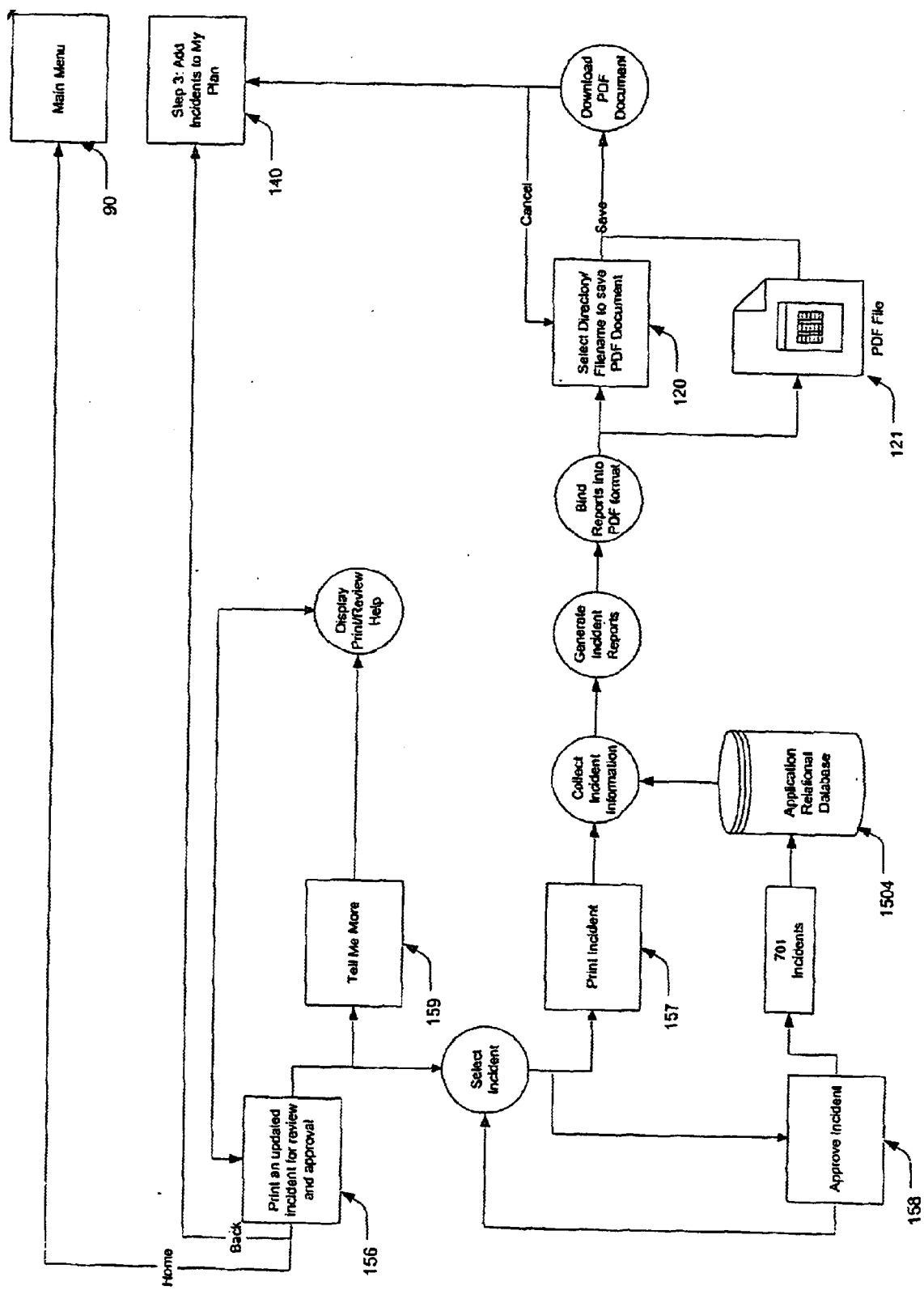
FIG. 8d is a block diagram illustrating in greater detail the step of printing an updated incident for review and approval shown in FIG. 3.

Once revised incident data has been entered into the system 1500, an updated incident report may be printed. FIG. 8*d* is a block diagram illustrating in greater detail the step of printing an updated incident for review and approval 156 shown in FIG. 3. Again, the "Tell Me More" selection 159 causes display of context sensitive help. The Select Incident selection causes the display of an editing screen providing an incident chart comprised of a list of incidents which the user may select. A request is sent to the server 1503 to collect incident information in step 157. Server 1503 proceeds to collect incident information from application database on user data store 1504. The Server 1503 then generates reports from the retrieved data and the reports are bound (I.e., formatted) into a PDF format file 121*c*. The server next sends a notification to the client 1501 that the reports are formatted whereupon in step 120*c*, the user selects a destination/filename in which to save PDF document 121*c*. The destination/filename is sent to the server 1503, which then commences download of PDF file 121*c* from server 1503 via network 1502 to client machine 1501. Finally, once downloaded, the PDF report 121*c* can then be printed at user station 1501 to facilitate review and approval offline.

Once a supervisor or other individual responsible for incident report and incident response plan approves the incident report, the report can be approved on line. That is, a user can choose Select Incident selection, which again causes the display of an editing screen providing an incident chart comprised of a list of incidents which the user may select. Once the user specifies an incident type (e.g., a bomb explosion) via, for example, the client station 1501 keyboard 95, a request is sent to the server 1503, which returns an editing screen with prompts corresponding to approval fields of records associated with the incident specified (i.e., associated with record instances of incident data object 701 specified). The user can then specify approval in the editing screen provided and another request is sent to the server 1503, which alters approval fields of records on the user data store 1504 associated with specified incident to indicate approval.

Thus, turning back to the presently described embodiment, having printed and approved an incident report, the user(s) at client station have completed the Add Incidents to My Plan process 140 depicted in FIG. 3. The user(s) has the option of printing the incident response report or complete response plan via the Review My Plan to Date process 170 depicted in FIG. 3. The particulars of these processes are discussed in detail below in connection with the discussion of the "Print My Plan" option depicted in FIG. 2*a*.

d. System Operation and Features—Detail ("Add Other Details")

Figure 10A:
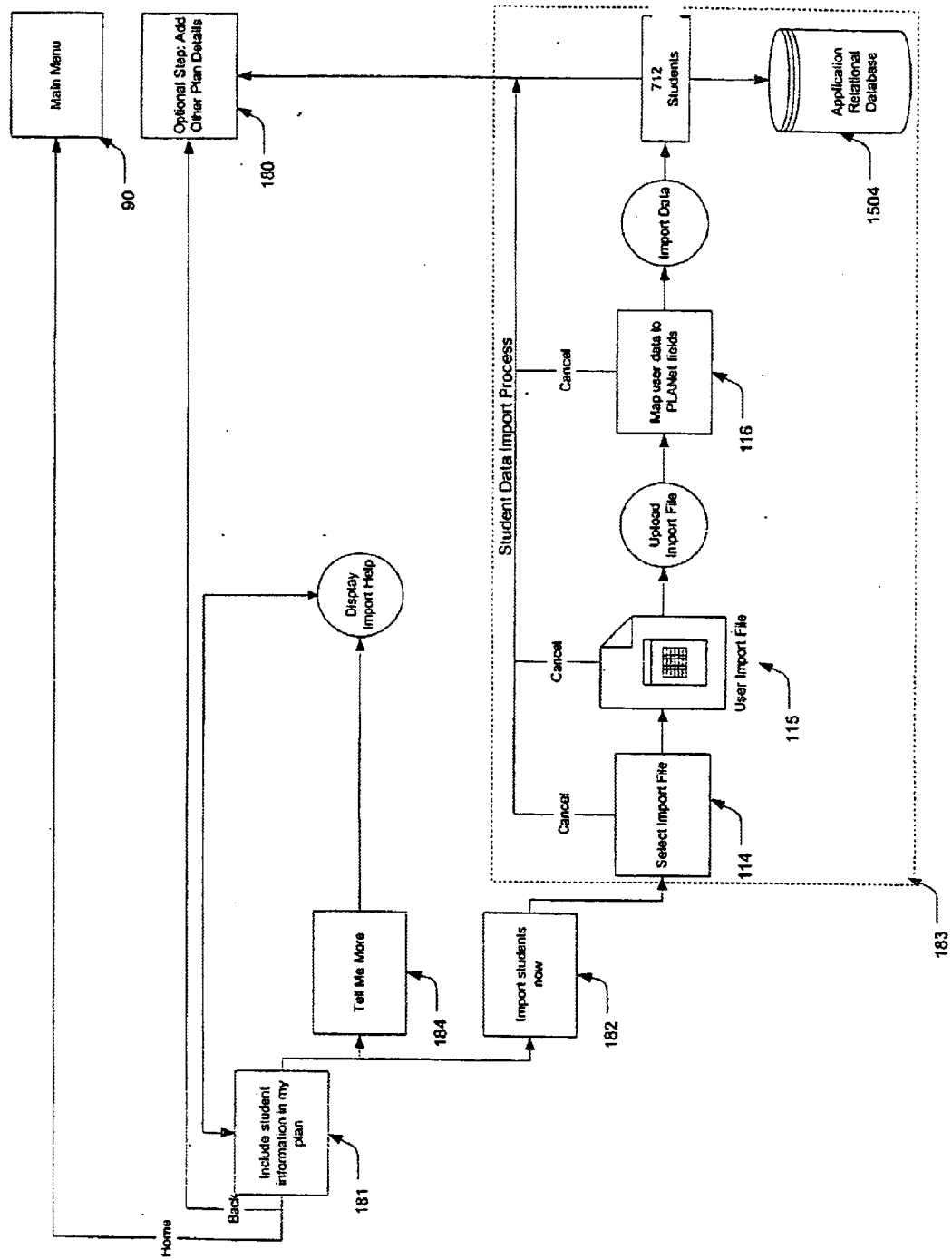
FIG. 10a is a block diagram illustrating in greater detail the step of including student information in an incident response plan shown in FIG. 3.

Once a response plan is completed and approved, additional optional may be included in the plan data as well. For example, turning now to FIG. 10*a*, it is a block diagram illustrating in greater detail the step of including student information in an incident response plan 181, a first step of the Add Other Plan Details 180 process shown in FIG. 3. In particular, FIG. 10*a* illustrates an exemplary process for entering student information into a user data store 1504 database utilizing a data import methodology. If selected, a "Tell Me More" selection 184 displays context sensitive help. If the "Import Students Now" selection 182 is selected, processing continues and a user import file is selected in step 114*a* at user machine 1501 (i.e., a user import file stored on the user data store 1504 or elsewhere on the server 1503 is specified and a request for same is sent to server 1503 using browser element or other network protocol interface). The selected file 115*a* is then downloaded in step 116*a* from server 1503 via network 1502 to user machine 1501. The user station 1501 then maps the fields from file 115 to Student data object 712 fields via, for example, a GUI if the mapping is performed manually. In the presently described embodiment, the student data object is a set of fields adapted to hold and/or organize student data in a relational application database stored on the user data store 1504. Once the data mapping is completed, the mapped data is sent to server 1503 and is there imported into a student data object 712 and stored into the application relational database at the user data store 1504.

In the alternative, if no import file is available, student data may be entered into the system 1500 manually after gathering of such data offline using a printed workbook, in accordance with the workbook data gathering and entry methods noted above. FIGS. 11*a*–11*g* show pages of an exemplary student workbook which may be used to perform the step of including student information in an incident response plan 181 shown in FIG. 3.

In the presently described embodiment, once student data has been entered, other optional information may be included in the response plan. For example, faculty/staff call chain relational links 740 depicted in FIG. 14a may be defined and included in the plan data.

Figure 10B:
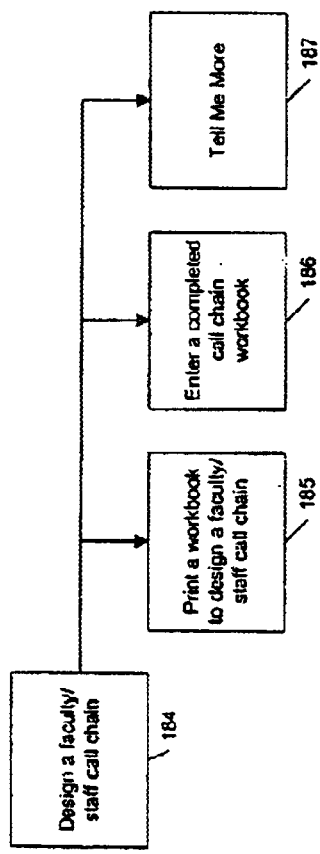
FIG. 10b is a block diagram illustrating in greater detail the step of designing a faculty/staff call chain shown in FIG. 3.

Turning now to FIG. 10b, it is a block diagram illustrating in greater detail the step of designing a faculty/staff call chain 185 shown in FIG. 3. In particular, in accordance with similar methods described earlier, a "Print faculty/staff call chain workbook" selection 190 causes request for collection of current faculty/staff call chain data for workbook to be sent to the server 1503. Server 1503 proceeds to collect faculty/staff call chain workbook data and whatever current faculty staff call chain information may exist on user data store 1504. The Server 1503 then generates workbook reports from the retrieved data and the reports are bound (i.e., formatted) into a PDF format file. The server next sends a notification to the client 1501 that the reports are formatted whereupon the user selects a destination/filename in which to save PDF document. The destination/filename is sent to the server 1503, which then commences download of PDF file from server 1503 via network 1502 to client machine 1501. The PDF report can then be printed at user station 1501 to facilitate collection of data offline. FIGS. 12a–12i show pages of an exemplary faculty/staff chain workbook which may be used to perform the step of designing a faculty/staff call chain shown in FIG. 3.

Once data is collected offline, it can be entered into the system 1500 (step 191, FIG. 10b.) Upon selection of the Enter Call Chain Workbook 191 selection, the client station processor 20 causes display of an editing screen(s) corresponding to the fields of the Faculty/Staff data object 709, which is stored in the application database of the user data store 1504. The editing screen(s) allows a user to enter new records, and delete and edit existing records organized in accordance with the faculty/staff data object(s) 709. Additionally, using the screen interface, a user can define a recursive relationship call chain assignment, whereupon the user station 1501 processor 20 creates corresponding relational database associations 740 which relate Faculty/Staff data objects 709 in accordance with the user defined call chain assignment. As faculty/staff records and cll chain relationships are created at client station 1501 they are sent to server 1503 station for storage in the application relational database at user data store 1504.

Thus, turning back to the presently described embodiment, having entered faculty/staff data and specified call chain relationships among faculty/staff the user at client station 1501 has completed the Design Faculty/Staff Call Chain process 185 depicted in FIG. 3.

In the presently described embodiment, once call chain data has been entered, other optional information may be included in the response plan. For example, record instances of resource organization data object 711 depicted in FIG. 14a may be defined and included in the plan data.

Figure 10C:
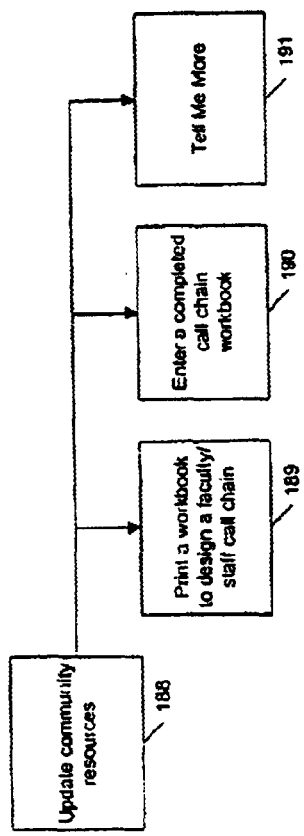
FIG. 10c is a block diagram illustrating in greater detail the step of updating community resources shown in FIG. 3.
Figure 11A:
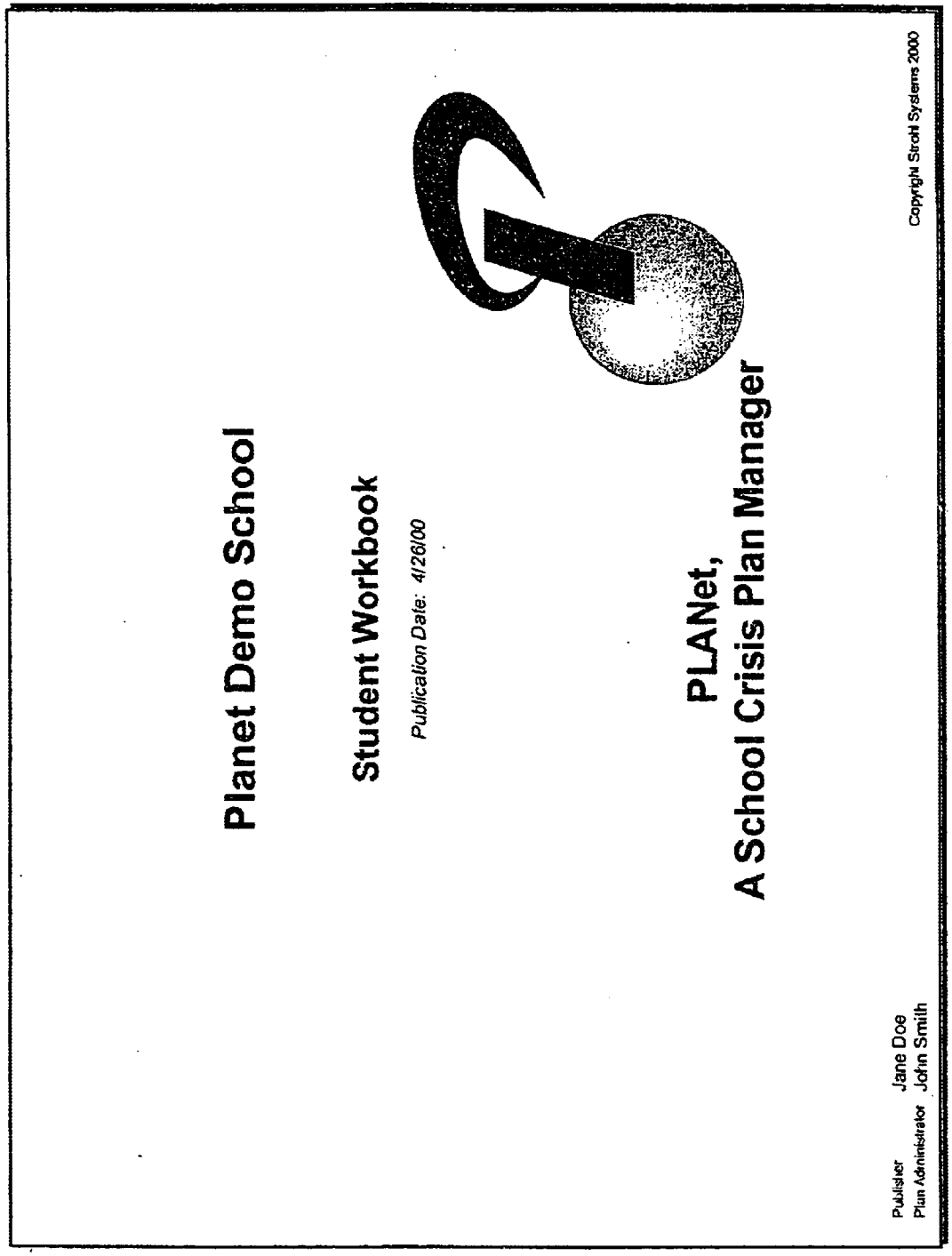
Figure 12A:
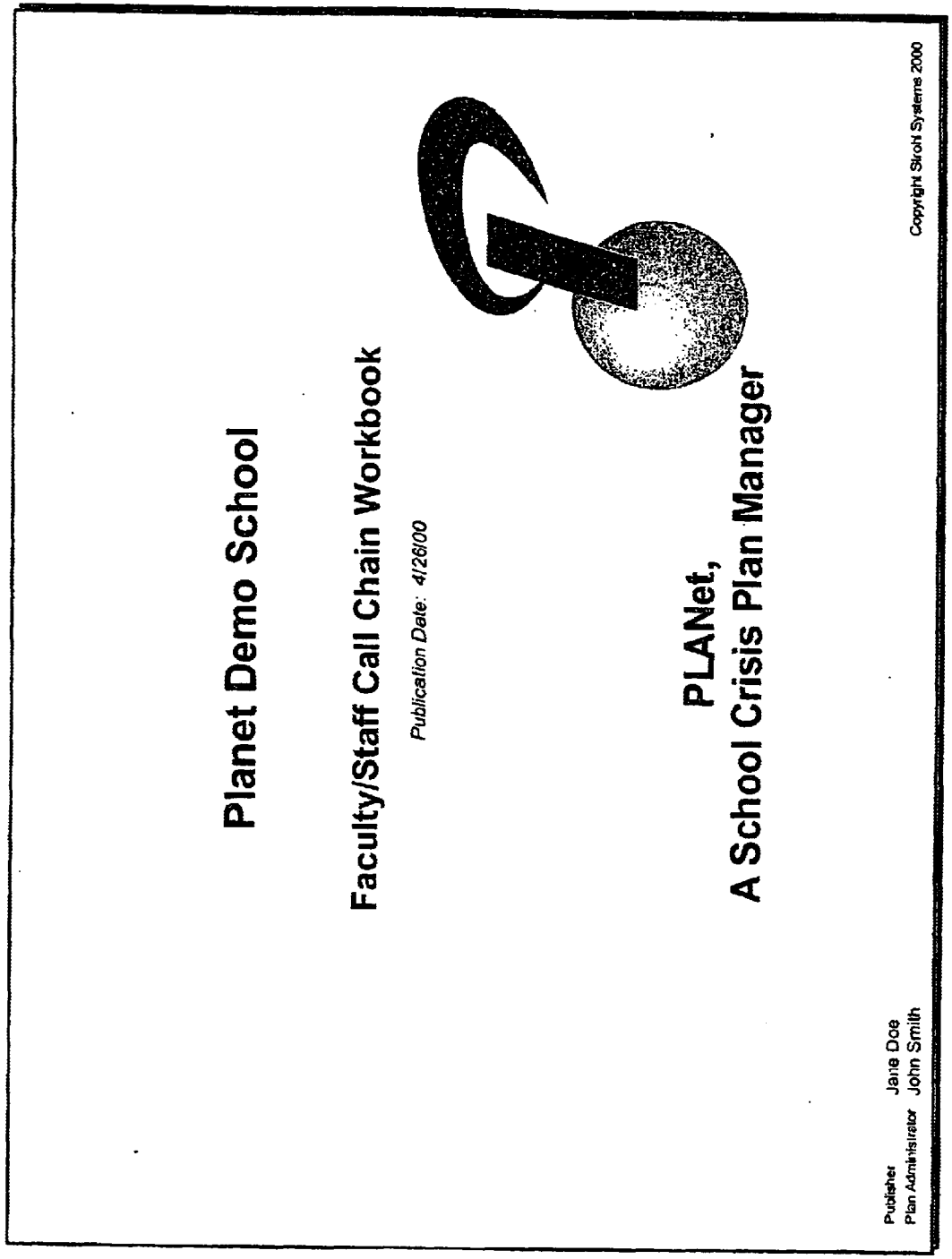
Figure 13A:
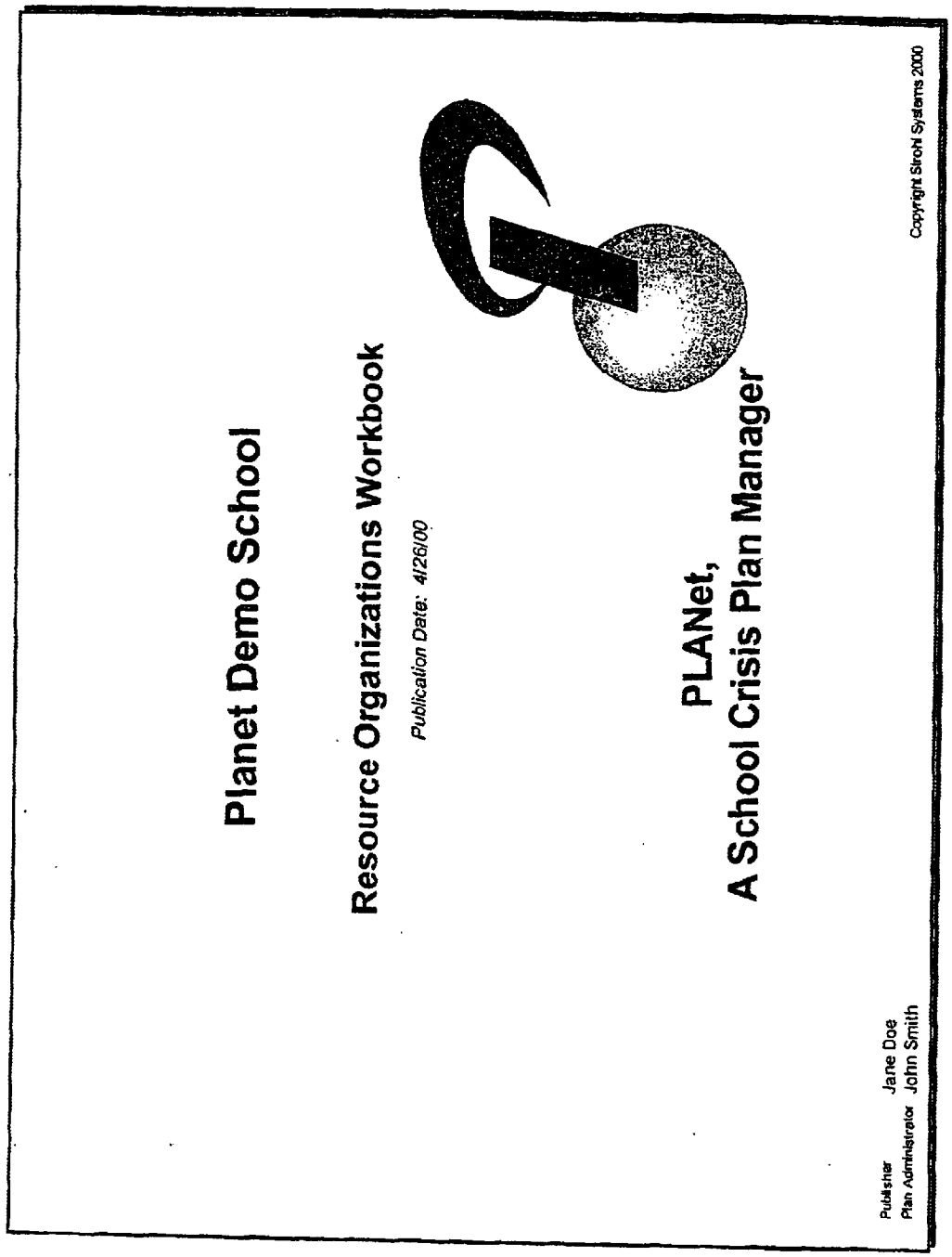
Figure 13H:
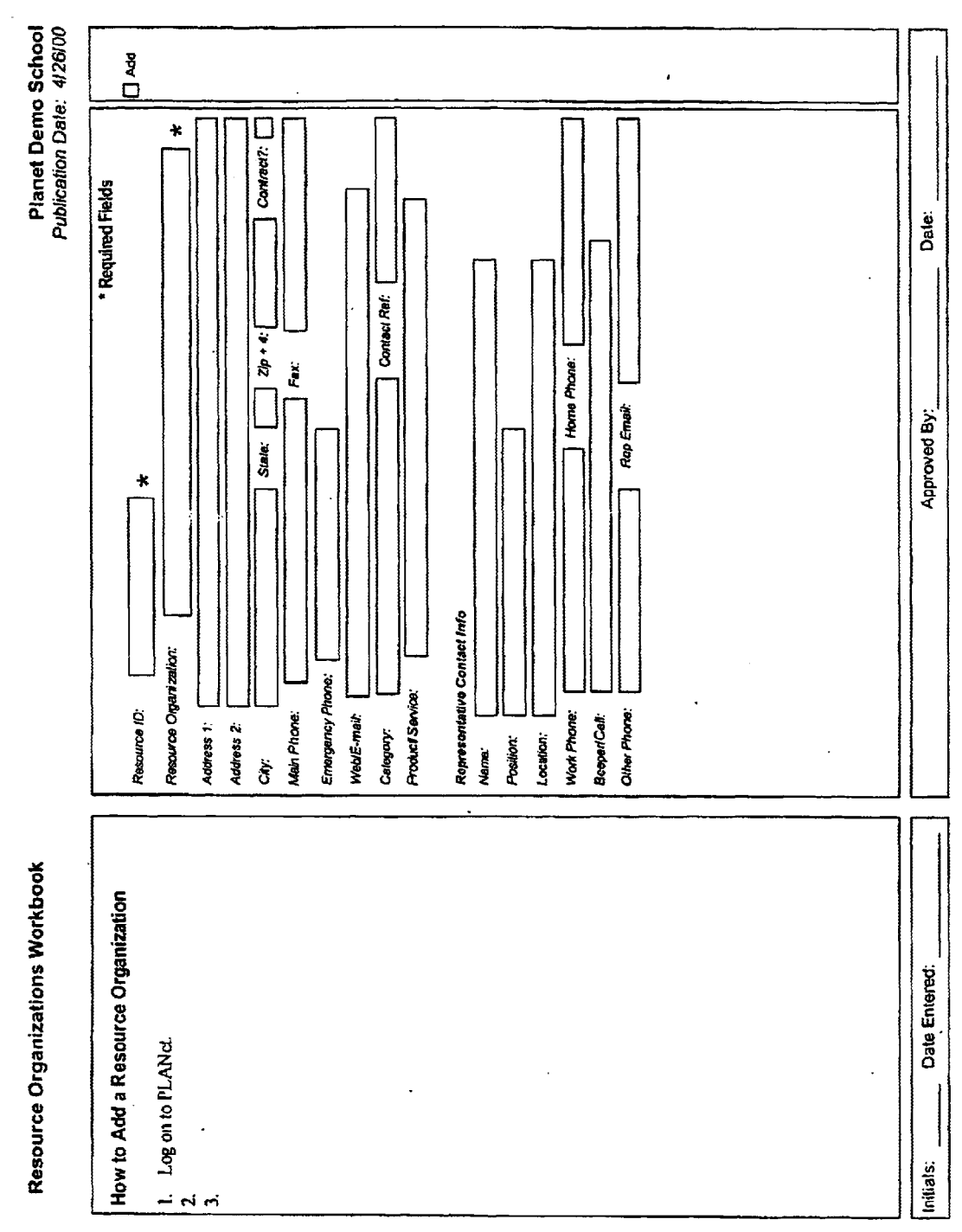

Turning now to FIG. 10c, it is a block diagram illustrating in greater detail the step of updating community resources 186 shown in FIG. 3. In particular, in accordance with similar methods described earlier, a "Print Community Resource Organization Workbook" selection 194 causes a request for collection of current resource organization data for a workbook to be sent to the server 1503. Server 1503 proceeds to collect resource organization workbook data and whatever current resource organization information may exist on the user data store 1504. The Server 1503 then generates workbook reports from the retrieved data and the reports are bound (i.e., formatted) into a PDF format file. The server next sends a notification to the client 1501 that the reports are formatted whereupon the user selects a destination/filename in which to save PDF document. The destination/filename is sent to the server 1503, which then commences download of PDF file from server 1503 via network 1502 to client machine 1501. Finally, once downloaded, the PDF report can then be printed at user station 1501 to facilitate collection of data offline. FIGS. 13a–13h show pages of an exemplary resource organizations workbook which may be used to perform the step of updating community resources 186 shown in FIG. 3.

Once data is collected offline, it can be entered into the system 1500 (step 195, FIG. 10). Upon selection of the Enter Resource Organization Workbook 195 selection, the client station processor 20 causes display of an editing screen(s) corresponding to the fields of the resource organization data object 711, which is stored in the application database of the user data store 1504. The editing screen(s) allows a user to enter new records, and delete and edit existing records organized in accordance with the resource organization data object 711. As resource organization records are created at client station 1501 they are sent to server 1503 station for storage in the application relational database at user data store 1504.

Thus, turning back to the presently described embodiment, having entered resource organization data, the user at client station 1501 has completed the Update Community Resources process 186 depicted in FIG. 3. Furthermore, having utilized the-sub options depicted in FIG. 3 relating to the "Build My Plan" option shown in FIG. 2a, the user has completed work on building a bomb explosion incident response plan in the presently described embodiment.

2. System Operation and Features—Detail ("Print My Plan")

Having completed an incident response plan of the presently described embodiment, the user(s) can at any time print the plan via the "Print My Plan" menu option depicted in FIG. 2a. The Print My Plan option of the presently described embodiment allows the printing of an incident report and the complete incident response plan, steps which are represented by Blocks 210 and 220 of FIG. 2a, respectively.

The printing of a plan may be accomplished via process similar to that described in connection with FIG. 8b. In particular, in the presently described embodiment, the client station 1501 causes the display of an editing screen providing an incident chart comprised of a list of incidents which the user may select. Once the user specifies an incident type (e.g., a bomb explosion) via, for example, the client station 1501 keyboard 95, the client station 1501 sends a request to the server 1503 to collect current incident data from the application database on the user data store 1504 for printing. Server 1503 proceeds to collect information on all record instances of data object corresponding to specified incident from the user data store 1504. The server 1503 then generates incident response plan from the retrieved data and the reports are bound (i.e., formatted) into a PDF format file. The server 1503 next sends a notification to the client 1501 that the reports are formatted whereupon the user selects a destination/filename in which to save the PDF document. The destination/filename is sent to the server 1503, which then commences download of PDF file from server 1503 via network 1502 to client 1501. Finally, once downloaded, the PDF report can then be printed at client 1501 to facilitate review incident response plan. FIGS. 16–73 show pages of an exemplary School Incident Response Plan which, in accordance with an embodiment of the present invention, is generated upon user selection of the "Print My Plan" sub-option under the "Print My Plan" option shown in FIG. 2a.

Figure 74:
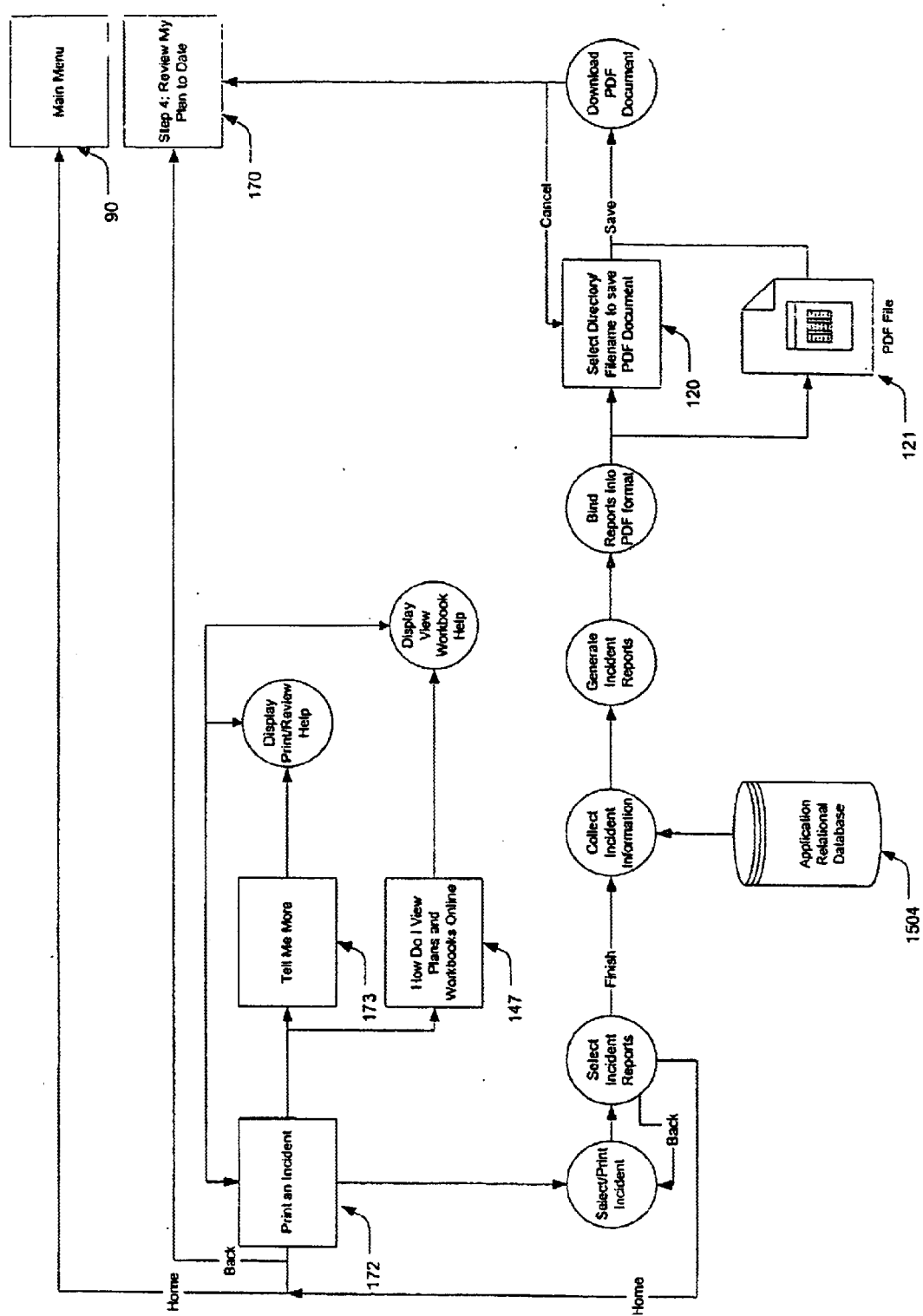

Turning now to FIG. 74, it is a block diagram depicting a high level overview of an exemplary process which may be performed upon user selection of the "Print an Incident" sub-option 220 under the "Print My Plan" option shown in FIG. 2a. In particular, in the presently described embodiment, the client station 1501 causes the display of an editing screen providing an incident chart comprised of a list of incidents which the user may select. Once the user specifies an incident type (e.g., a bomb explosion) via, for example, the client station 1501 keyboard 95, the client station 1501 sends a request to the server 1503 to collect current incident data from the application database on the user data store 1504 for printing. Server 1503 proceeds to collect appropriate data and generates incident report from the retrieved data. The reports are then bound (i.e., formatted) into a PDF format file. The server 1503 next sends a notification to the client 1501 that the reports are formatted whereupon the user selects a destination/filename in which to save the PDF document. The destination/filename is sent to the server 1503, which then commences download of PDF file from server 1503 via network 1502 to client 1501. Finally, once downloaded, the PDF reports can then be printed at client 1501 to facilitate review of incident reports. FIGS. 75a–75f show pages of an exemplary incident report which, in accordance with an embodiment of the present invention, is generated upon user selection of the "Print an Incident" sub-option 220 under the "Print My Plan" option shown in FIG. 2a.

3. System Operation and Features—Detail ("Update My Plan")

Having completed and printed an incident response plan of the presently described embodiment, the user(s) can also at any time update the plan via the "Update My Plan" menu option depicted in FIG. 2a. Update My Plan allows editing of data records holding information the accuracy of which is likely to change often. The Blocks 310, 320 and 330 represent processes which may be performed upon user selection of corresponding sub-options of the "Update My Plan" menu option depicted in FIG. 2a. These sub-options include: (1) Managing Incidents, (2) Managing Resources; and (3) Showing Status.

Figure 15A:
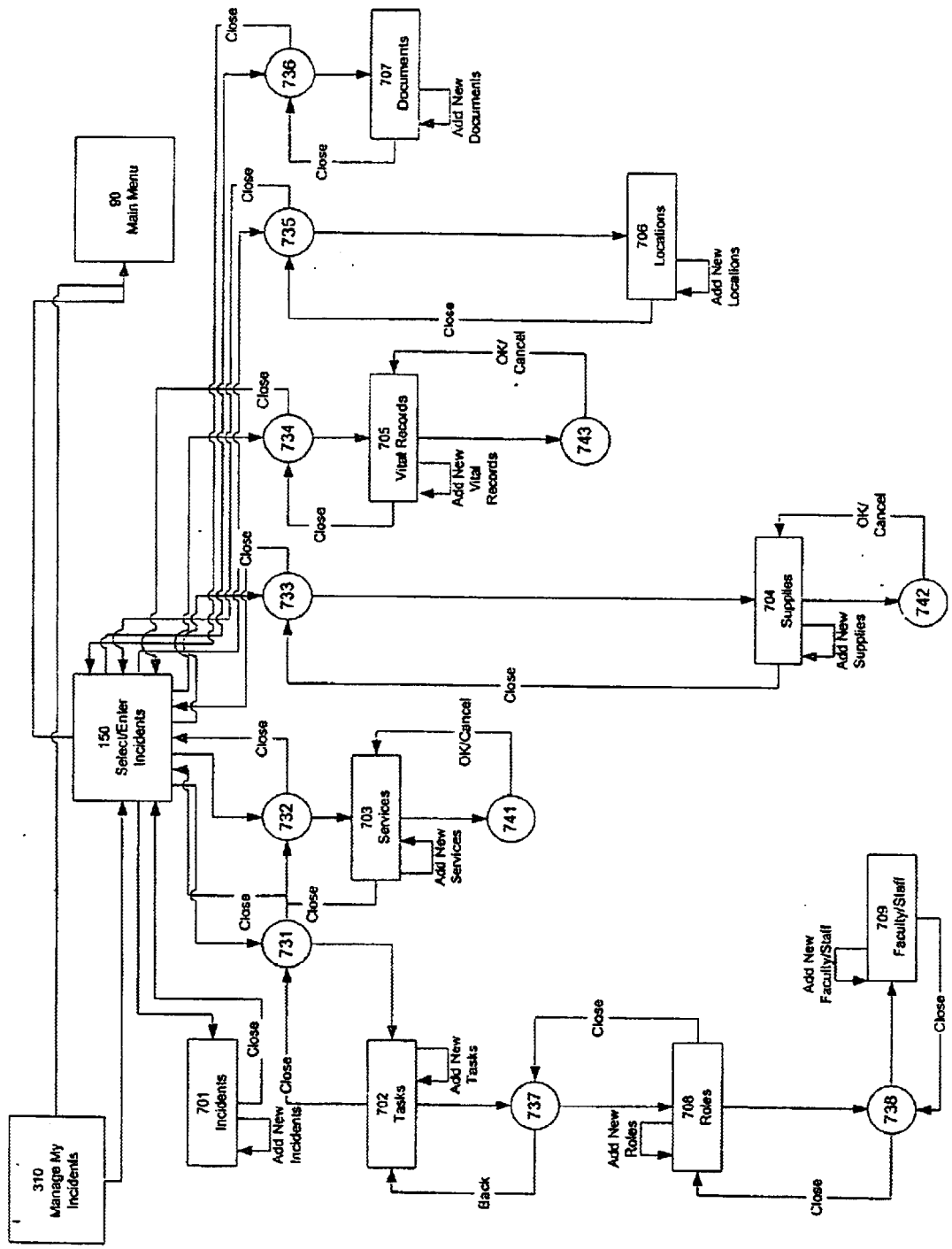

FIG. 15a is a block diagram depicting a high level overview of an exemplary process(es) which may be performed upon user selection of the "Manage My Incidents" sub-option 310 under the "Update My Plan" 300 option shown in FIG. 2a. The Select/Enter Incident selection 150a causes the display of an editing screen providing an incident chart comprised of a list of incidents which the user may select. The data for the editing screen may be retrieved from a storage device 70 of the client station 1501 or, in the alternative, a request for such data may be sent to the server 1503. Once the user specifies an incident type (e.g., a bomb explosion) via, for example, the client station 1501 keyboard 95, the server returns an editing screen(s) that is displayed and allows editing of a record instances of the incident data object 701 corresponding to the incident specified. Thus, screen prompts provided by editing screens correspond to incident data object 701 fields. The editing screen(s) also allow for additions, deletions and revisions of relational links between the specified record instances of the incident data object 701 and other data objects in the application database. Thus, the screen(s) includes display prompts corresponding to relation links associated with the specified incident, including, as depicted in FIG. 15a: task assignment link 731, services assignment link 732, supplies assignment link 733, vital records assignment link 734, locations assignment link 735 and documents assignment link 736.

Preferably, an editing screen is provided for each relation link in the application database specifying the relationship of record instances of incident data object 701. In the presently described embodiment, from each of the assignment screens, drill down capability exists at the client station 501 for adding of new records, and deleting and editing of data objects and assignment relationships lower in the hierarchy depicted in FIG. 72a. These include tasks data object 702 and role assignment link 737; roles data object 708 and faculty staff assignment link 738; faculty/staff data object 709; services data object 703; service resource organization assignment link 741; supplies data object 704 and supplies resource organizations assignment link 742; vital records data object 705 and vital record location assignment link 743; locations data object 706; and documents data object 707.

Figure 15B:
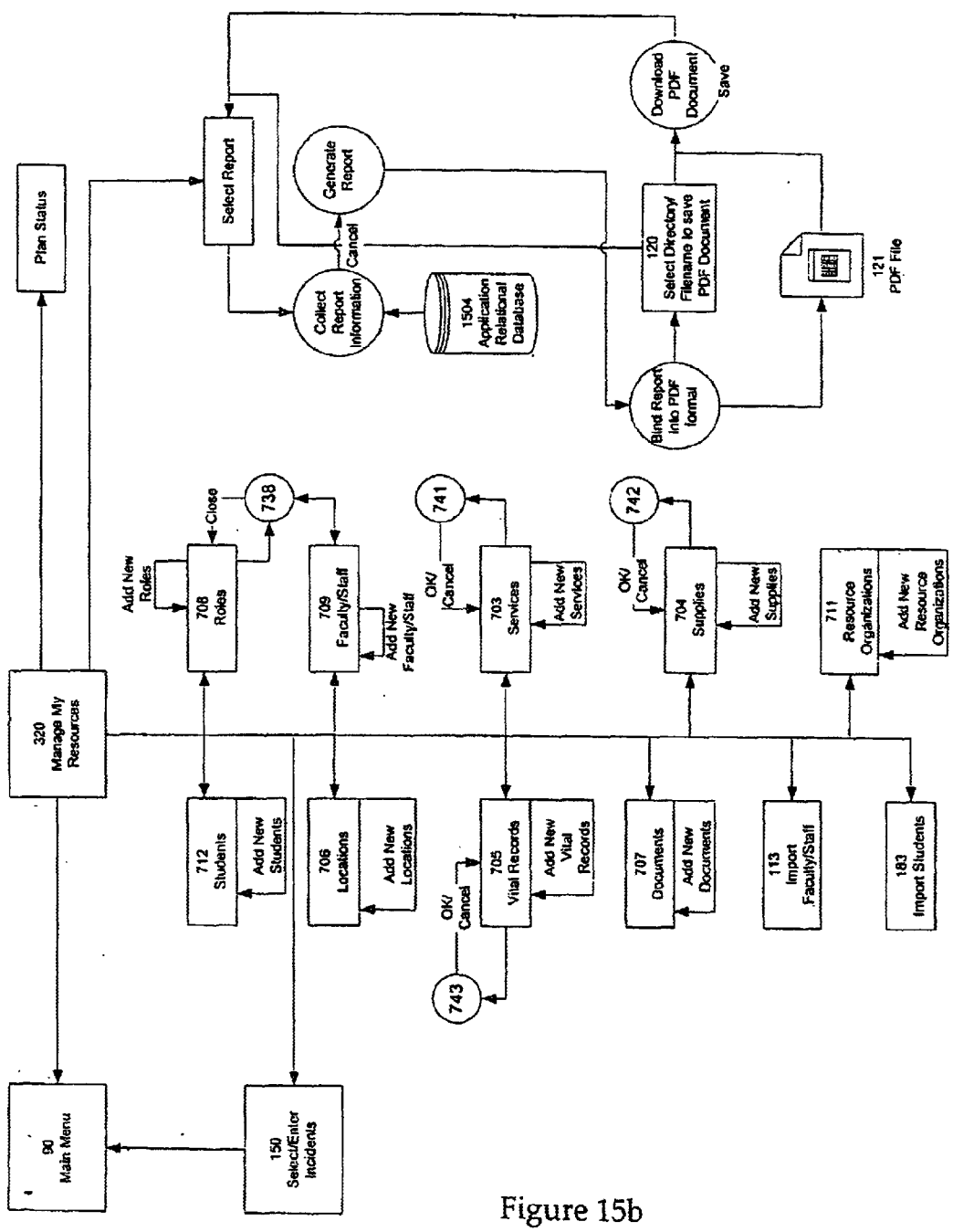

In addition to updating plan data using an incident specification (e.g., bomb explosion) as a reference, the system 1500 of the presently described embodiment also allows direct access and editing of data records corresponding to data objects below the incident data object 701 in the hierarchy depicted in FIG. 14a. Turning now to FIG. 15b, it is a block diagram depicting a high level overview of an exemplary process which may be performed upon user selection of the "Manage My Resources" sub-option 320 under the "Update My Plan" option shown in FIG. 2a. Here, a user accesses and edits data records corresponding to data objects in the user application database using the editing screens and database searches as in the methods described earlier. However, search and selection of records corresponding to data objects lower it the date object hierarchy is performed directly, rather than via drill down from incident data object 701 editing Conclusion Thus, an integrated user-friendly automated system and process customized to aid in the creation, maintenance and distribution of crisis response plans has been described. Those with skill in the art will recognize that, while the preceding specification has described particular embodiments of the present invention with reference to the specific details described above, various modifications to these embodiments would be made without departing from the scope of the invention. For example, while a system and process for creating, maintaining and distributing incident crisis response plans has been discussed using a response plan customized for a typical school district as an exemplar, it is clear that the system and process of the invention may be used in any organization in need of, or desiring, a crisis response plan. Thus, the scope of the invention should understood with reference to the following claims and their equivalents.

What is claimed is:

1. A computerized method for creating a crisis incident response plan, the method comprising:

a. sending a request for data representative of editing screens from a client station, the editing screens having screen prompts, the screen prompts corresponding to fields of data records in a database having crisis response information;

b. receiving the data representative of the editing screens at the client station;

c. displaying the editing screens at the client station;

d. accepting data specified by a user in the screen prompts and gathered by using at least one data entry workbook generated at the client station; and e. causing the user specified data and template crisis response data determined in accordance with expert specified standards to be integrated into the database having crisis response information.

2. The computerized method for creating a crisis incident response plan of claim 1 wherein the database of crisis response information includes information relating to at least one crisis incident including tasks to follow, required supplies, persons to contact and resource organizations to contact in the event of an occurrence of the at least one crisis incident.

3. A computerized method for creating a crisis incident response plan, the method comprising:

a. generating at least one editing screen at a client station from data representative of the at least one editing screen, the at least one editing screen having screen prompts, the screen prompts corresponding to fields of data records in a database having crisis response information;

b. displaying the at least one editing screen at the client station;

c. accepting data specified by a user in the screen prompts and gathered using at least one data entry workbook generated at the client station, and d. causing the user specified data and template crisis response data determined in accordance with expert specified standards to be integrated into the database having crisis response information.

4. The computerized method for creating a crisis incident response plan of 3 wherein the database of crisis response information includes information relating to at least one crisis incident including tasks to follow, required supplies, persons to contact and resource organizations to contact in the event of an occurrence of the at least one crisis incident.

5. A computerized method for creating a crisis incident response plan and generating a report corresponding to the crisis incident response plan, the method comprising:

a. generating at least one editing screen at a client station from data representative of the at least one editing screen, the at least one editing screen having screen prompts, the screen prompts corresponding to fields of data records in a database having crisis response information;

b. displaying the at least one editing screen at the client station;

c. accepting data specified by a user in the screen prompts and gathered using at least one data entry workbook generated at the client station;

d. causing the user specified data and template crisis response data determined in accordance with expert specified standards to be integrated into the database having crisis response information; and e. after the user specified data and template crisis response data are integrated into the database having crisis response information, generating at the client station a report from the crisis response information in the database having crisis response information.

6. The computerized method for creating a crisis incident response plan of claim 5 wherein the database of crisis response information includes information relating to at least one crisis incident including tasks to follow, required supplies, persons to contact and resource organizations to contact in the event of an occurrence of the at least one crisis incident.

7. A computer based method for facilitating the creation of a crisis incident response plan by a user at a client station, the client station coupled to a server station, the server station coupled to at least one data store, the method comprising:

a. receiving at the server station a request for data representative of editing screens, the editing screens having screen prompts, the screen prompts corresponding to fields of data records in a database having crisis response information, the database having crisis response information stored on the data store;

b. sending the data representative of the editing screens to the client station;

c. receiving at the server station data specified by the user in the screen prompts and gathered using at least one data entry workbook generated at the client station; and d. at the server station, causing the user specified data and template crisis response data determined in accordance with expert specified standards to be integrated into the database having crisis response information.

8. The computer based method for facilitating the creating of a crisis incident response plan of claim 7 wherein the database of crisis response information includes information relating to at least one crisis incident including tasks to follow, required supplies, persons to contact and resource organizations to contact in the event of an occurrence of the at least one crisis incident.

9. A computer based method for facilitating the creation and printing of a crisis incident response plan by a user at a client station, the client station coupled to a server station, the server station coupled to a least one data store, the method comprising:

a. receiving at the server data specified by a user in a set of screen prompts at the client station and gathered using at least one data entry workbook generated at the client station, the screen prompts corresponding to fields of data records in a database having crisis response information, the database having crisis response information stored on the data store;

b. at the server station, causing the user specified data and template crisis response data determined in accordance with expert specified standards to be integrated into the database having crisis response information; and c. after the user specified data and template crisis response data are integrated into the database having crisis response information, sending to the client station formatted report data generated at the server station from the crisis response information in the database having crisis response information, the formatted report data adapted for printing a report containing portions of the crisis response information at the client station.

10. The computer based method for facilitating the creation and printing of a crisis incident response plan of claim 9 wherein the database of crisis response information includes information relating to at least one crisis incident including tasks to follow, required supplies, persons to contact and resource organizations to contact in the event of an occurrence of the at least one crisis incident.

11. The computer based method for facilitating the creation and printing of a crisis incident response plan of claim 9 wherein the formatted report data is PDF file data.

12. A server station coupled to at least one client station and first and second data stores each having storage devices, the storage device of the first data store having records storing incident crisis response information, the storage device of the second data store having records storing template crisis response data prepared in accordance with pre-specified standards, the server station comprising:

a. a central processing unit with associated memory;

b. a database software element comprising instructions residing in the memory which, when executed by the central processing unit, causes user specified data received from the client station and gathered using at least one data entry workbook generated at the client station to be incorporated into the records storing incident crisis response information on the first data store; and c. a template integration software element, comprising instructions residing in the memory, which when executed by the central processing unit in response to a request from the client station, causes the template crisis response data prepared in accordance with pre-specified standards stored on the second data store to be integrated with the user specified data received from the client station into the records storing incident crisis response information on the first data sore.

13. The server station of claim 12 wherein the records storing incident crisis response information on the first data store include information relating to at least one crisis incident including tasks to follow, required supplies, persons to contact and resource organizations to contact in the event of an occurrence of the at least one crisis incident.

14. A server station coupled to at least one client station and first and second data stores each having storage devices, the storage device of the first data store having records storing incident crisis response information, the storage device of the second data store having records storing template crisis response data prepared in accordance with pre-specified standards, the server station comprising:

a. a central processing unit with associated memory;

b. a database software element comprising instructions residing in the memory which, when executed by the central processing unit, causes user specified data received from the client station and gathered using at least one data entry workbook generated at the client station to be incorporated into the records storing incident crisis response information on the first data store;

c. a template integration software element, comprising instructions residing in the memory, which when executed by the central processing unit in response to a request from the client station, causes the template crisis response data prepared in accordance with pre-specified standards stored on the second data store to be integrated with the user specified data received from the client station into the records storing incident crisis response information on the first data store; and d. a report binding software element, comprising instructions residing in the memory, which when executed by the central processing unit in response to a request from the client station, causes a formatted report file to be generated from the records storing incident crisis response information on the first data store.

15. The server station of claim 14 wherein the records storing incident crisis response information on the first data store include information relating to at least one crisis incident including tasks to follow, required supplies, persons to contact and resource organizations to contact in the event of an occurrence of the at least one crisis incidents.

16. The server station of claim 14 wherein the formatted report file is a PDF file.

* * * * *